(12) United States Patent
Weems et al.

(10) Patent No.: US 6,195,892 B1
(45) Date of Patent: Mar. 6, 2001

(54) METHOD FOR REPLACING CRACKED CORE SPRAY SUPPLY PIPING IN A BOILING WATER REACTOR

(75) Inventors: Sterling J. Weems, Saint Petersburg; William E. Sylvester, Vero Beach, both of FL (US)

(73) Assignee: MPR Associates, Inc., Alexandria, VA (US)

( * ) Notice: Subject to any disclaimer, the term of this patent is extended or adjusted under 35 U.S.C. 154(b) by 0 days.

(21) Appl. No.: 09/321,376

(22) Filed: May 27, 1999

Related U.S. Application Data

(60) Provisional application No. 60/087,343, filed on May 29, 1998, and provisional application No. 60/115,383, filed on Jan. 11, 1999.

(51) Int. Cl.[7] .................................................. B23P 15/26
(52) U.S. Cl. .................................. 29/890.031; 29/890.03; 29/402.11
(58) Field of Search .................... 29/890.031, 890.03, 29/890.051, 402.08, 402.1, 402.11; 376/260

(56) References Cited

U.S. PATENT DOCUMENTS

| | | |
|---|---|---|
| 5,392,322 | 2/1995 | Whitling et al. . |
| 5,402,570 | 4/1995 | Weems et al. . |
| 5,502,754 | 3/1996 | Erbes . |
| 5,521,951 | 5/1996 | Charney et al. . |
| 5,577,082 | 11/1996 | Weems et al. . |
| 5,600,689 | 2/1997 | Weems et al. . |
| 5,600,690 | 2/1997 | Weems et al. . |
| 5,623,526 | 4/1997 | Wivagg . |
| 5,675,619 | 10/1997 | Erbes et al. . |
| 5,729,581 | 3/1998 | Loock et al. . |
| 5,737,379 | 4/1998 | Erbes . |
| 5,781,603 | 7/1998 | Wivagg . |
| 5,793,828 | 8/1998 | Wivagg et al. . |
| 5,803,686 | 9/1998 | Erbes et al. . |
| 5,839,192 | * 11/1998 | Weems et al. ............... 29/402.14 |
| 5,905,771 | 5/1999 | Erbes et al. . |
| 5,964,029 | * 10/1999 | Weems et al. .............. 29/890.031 |
| 5,992,019 | * 11/1999 | May et al. .................. 29/890.031 |

* cited by examiner

*Primary Examiner*—I Cuda Rosenbaum

(57) ABSTRACT

A method for replacing cracked core spray supply piping in a boiling water reactor vessel includes removal of all or part of the core spray supply piping inside the reactor vessel and replacement of the piping with new piping components configured to couple with one another or any remaining core spray supply piping without being welded. In accordance with one aspect of the invention, a lower elbow of the core spray supply piping is removed and replaced with an elbow assembly configured to mechanically couple with an existing feed-through assembly at the core shroud, for example by use of friction fit, bias members, and/or bolts. A vertical section of the core spray supply piping feeding into the elbow can also be removed and replaced with a new piping section configured to mechanically couple with the replacement lower elbow assembly, for example using pins, clamps and sealing members such as piston rings. In accordance with another aspect of the invention, the vertical piping section is removed along with an upper elbow, horizontal core spray supply arms and the flow divider or T-box and replaced with a new T-box assembly and piping. The T-box assembly can be connected to the piping using any of the disclosed joints and can carry replacement thermal sleeves which fully replace or supplement existing thermal sleeves. Various biasing and detent mechanisms are disclosed for mechanically coupling the new T-box assembly with the existing safe end assembly.

20 Claims, 33 Drawing Sheets

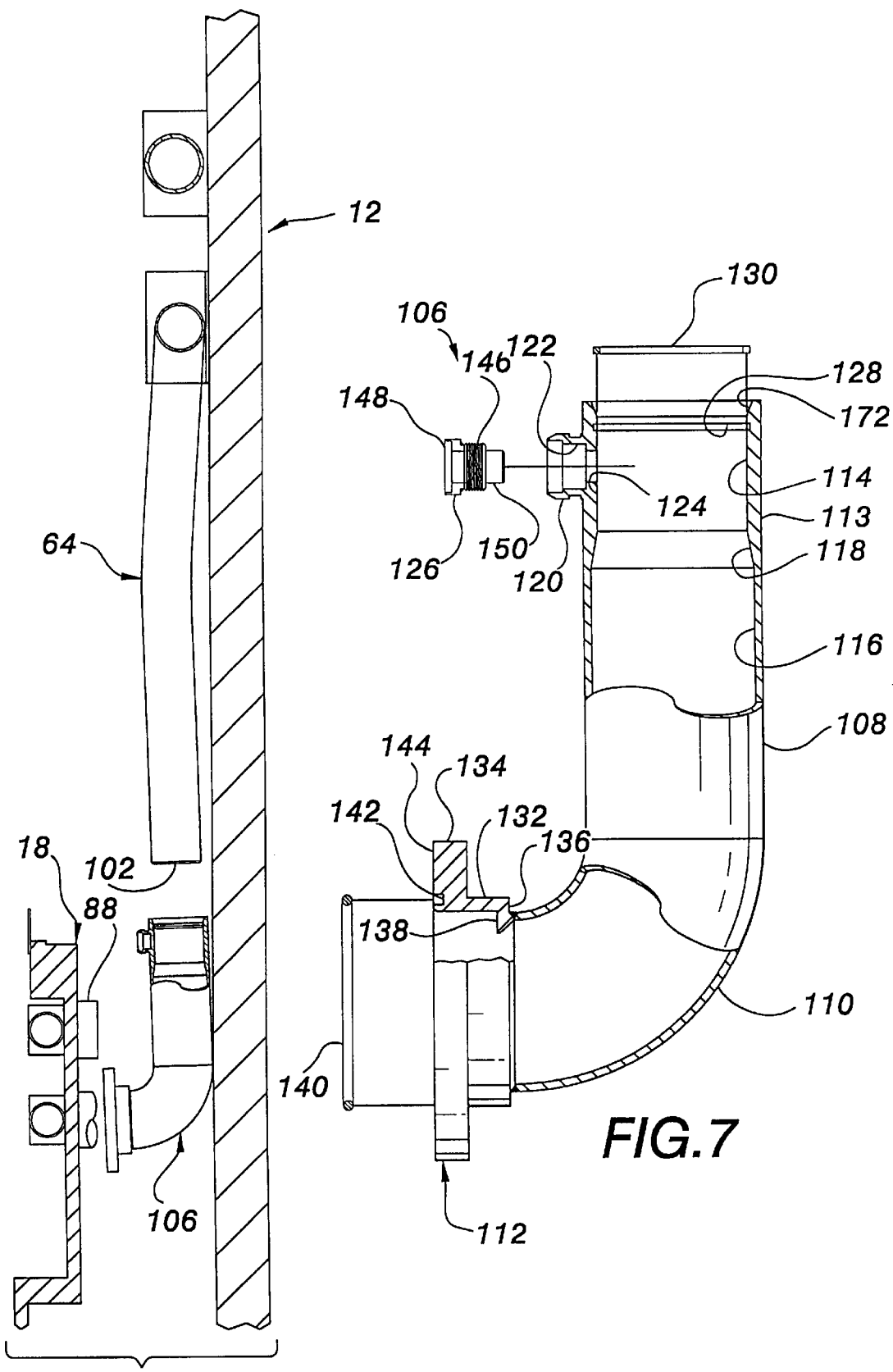

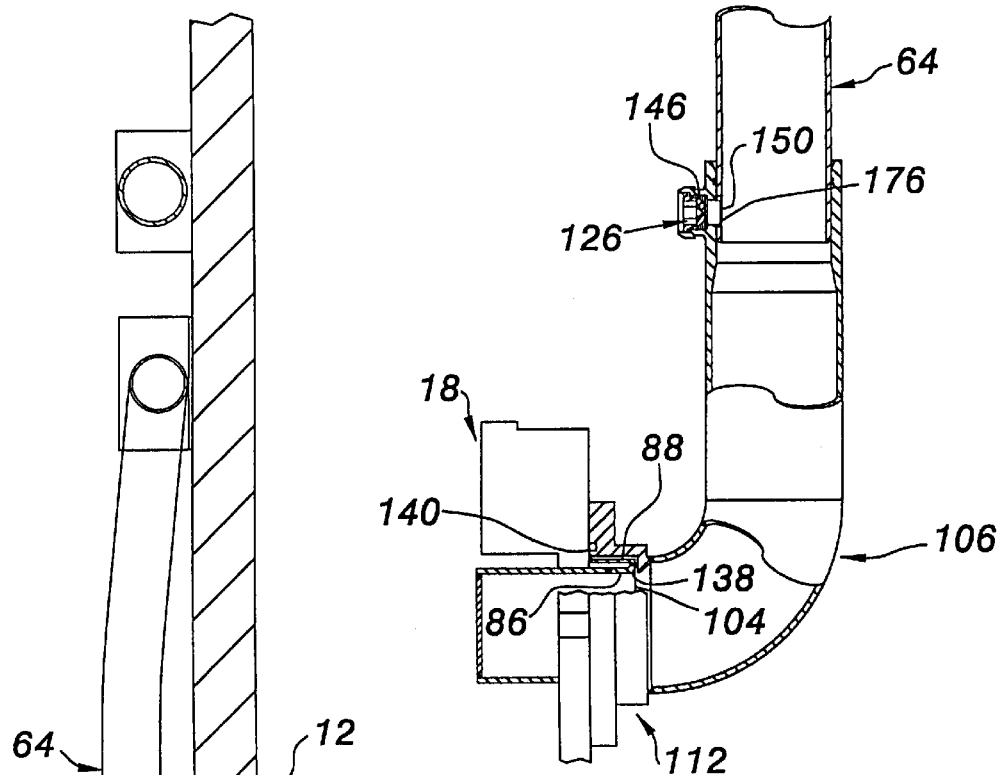
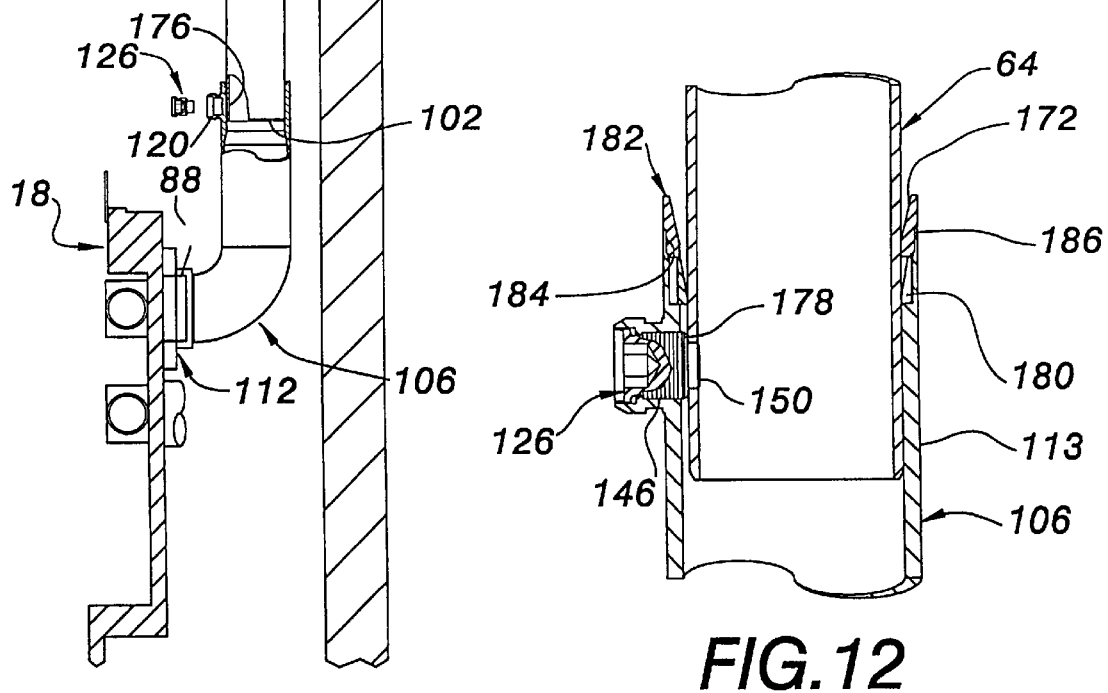
FIG.10  FIG.11  FIG.12

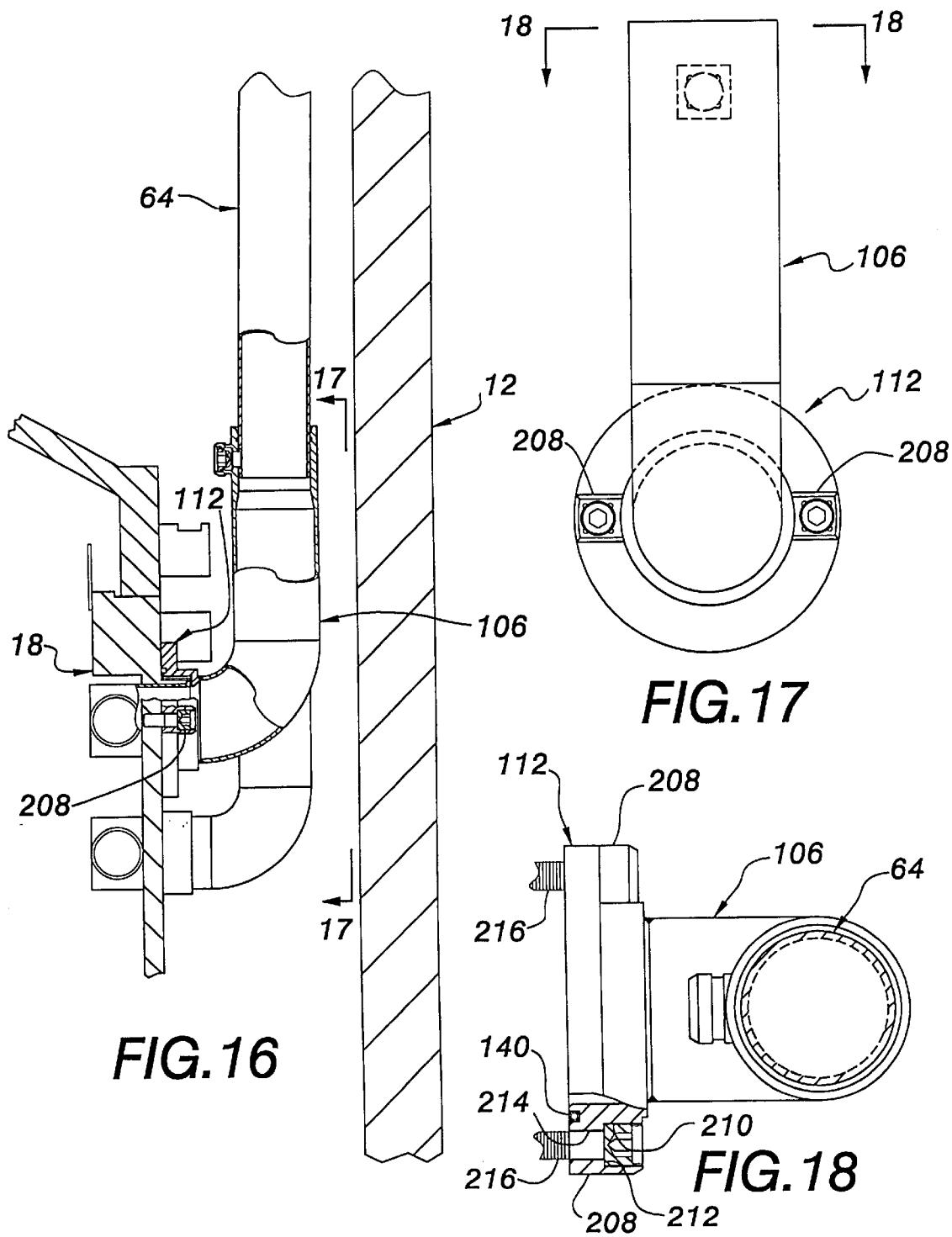

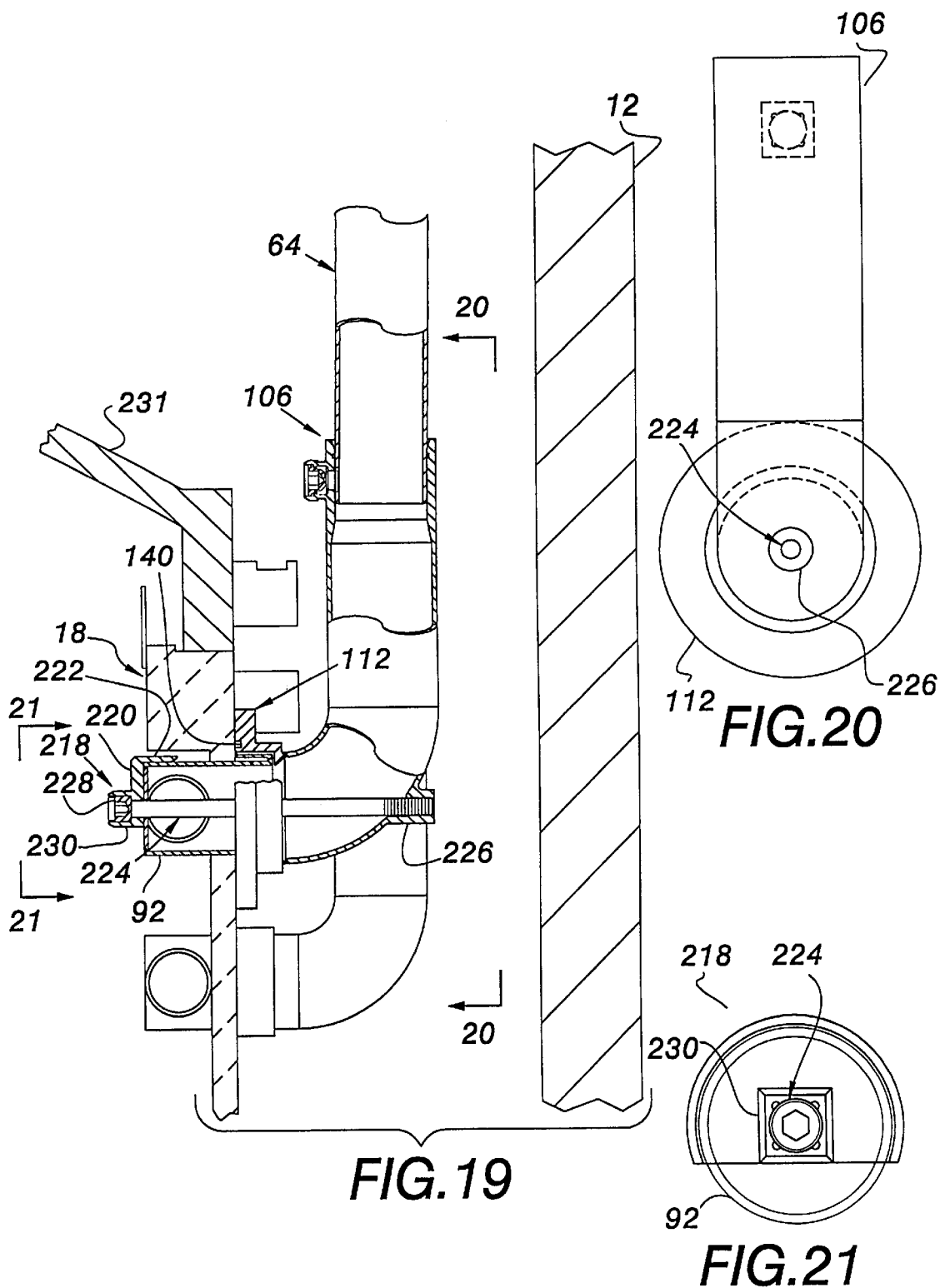

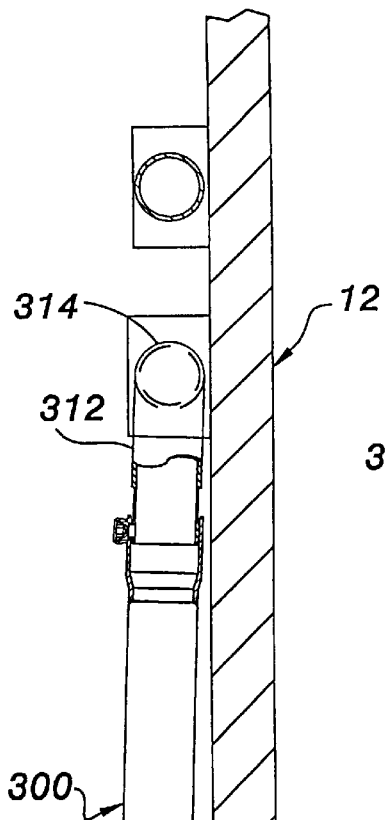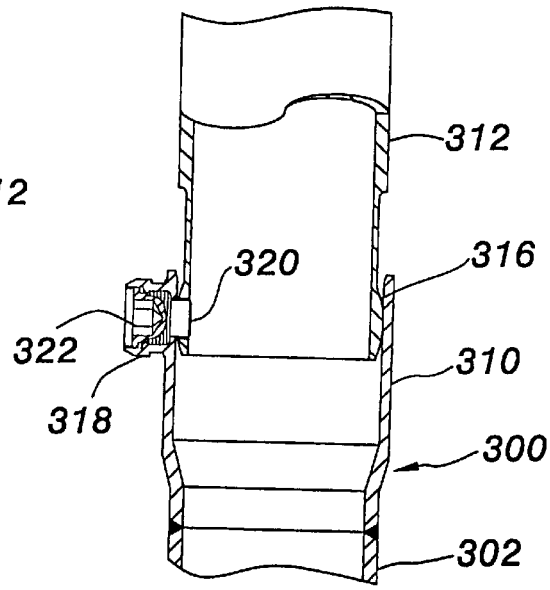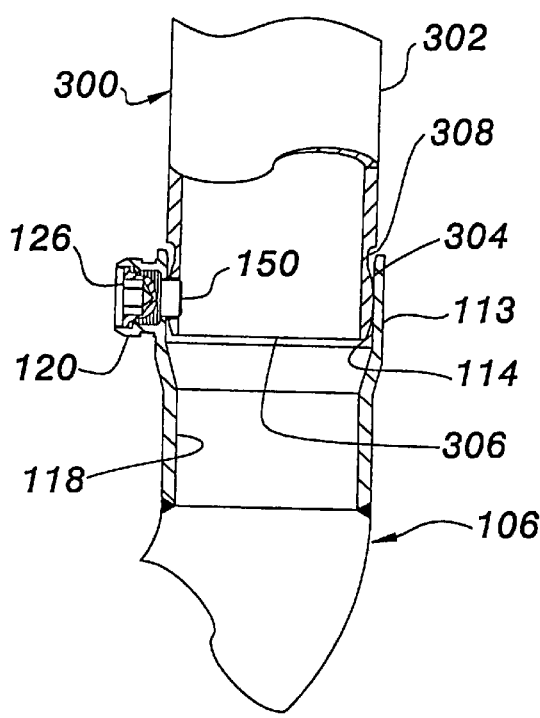
FIG.25
FIG.26
FIG.27

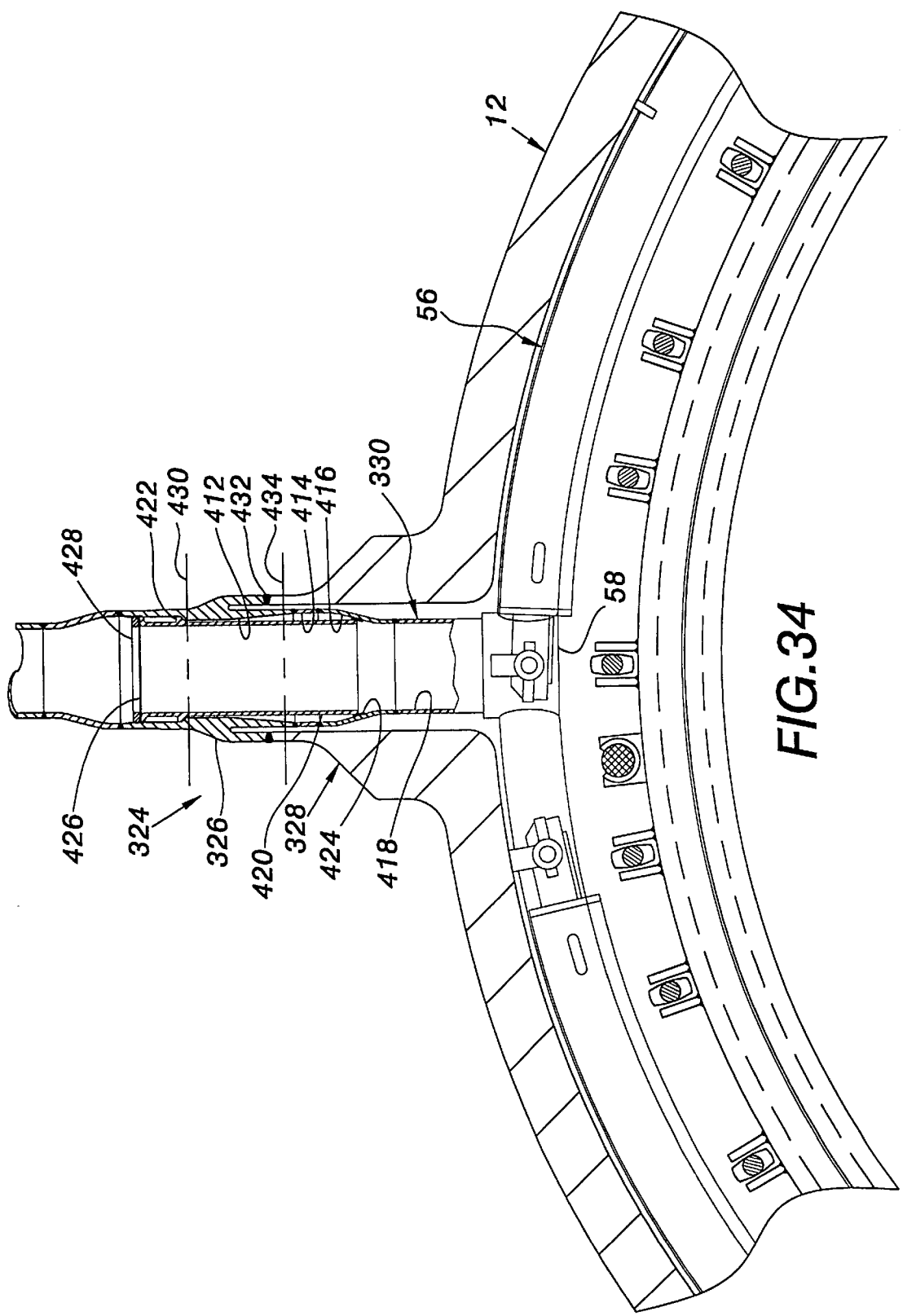

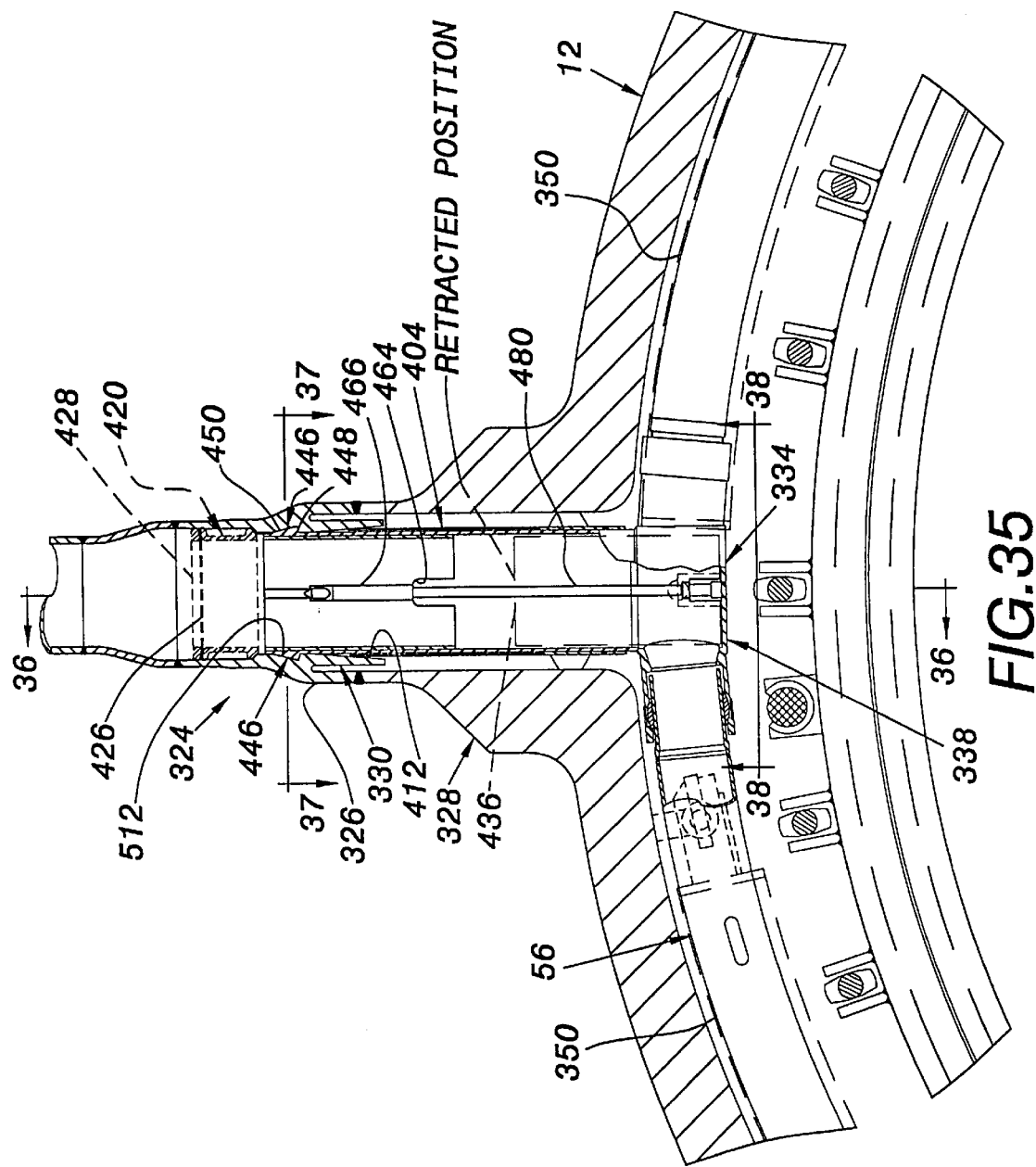

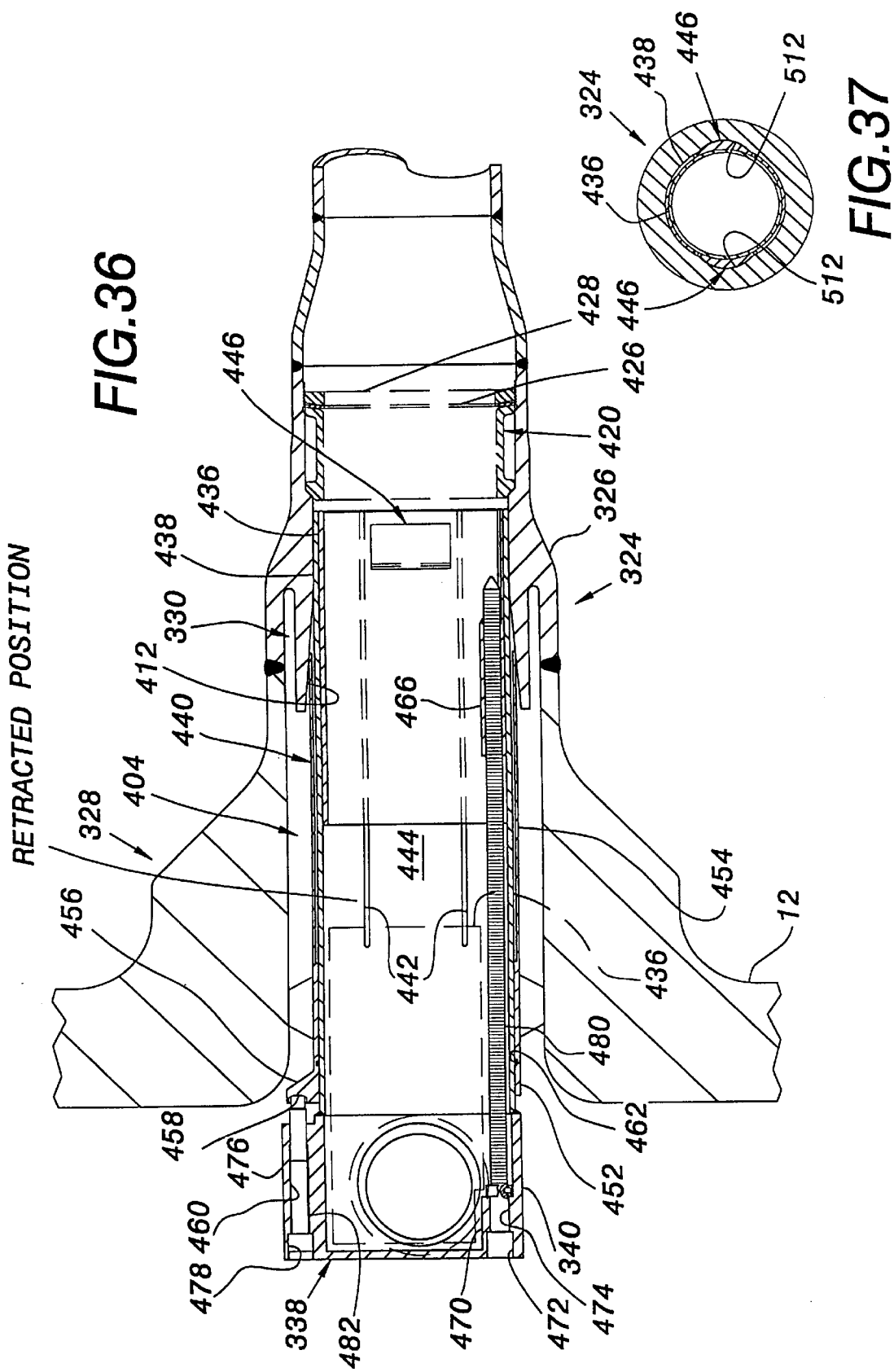

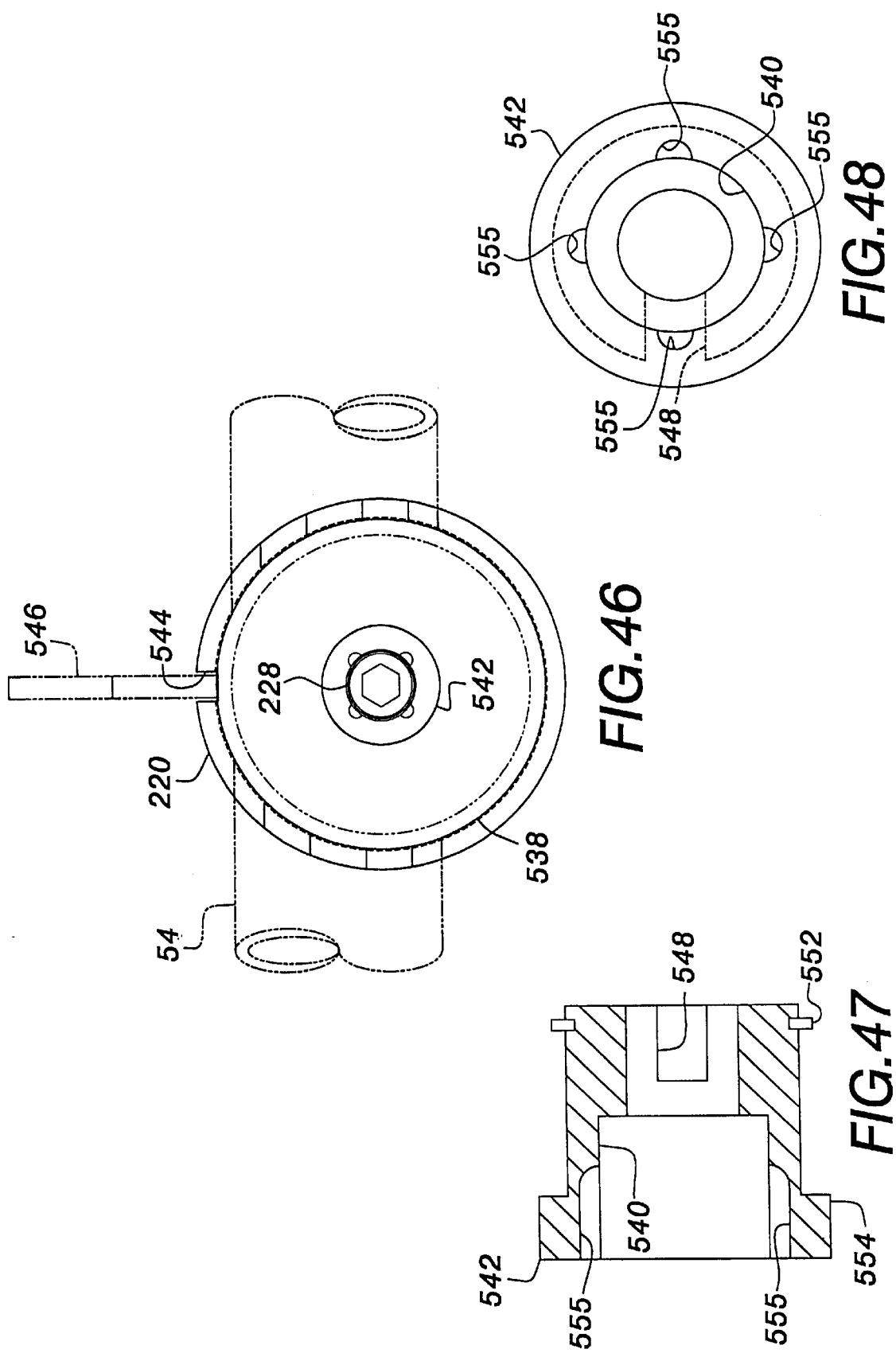

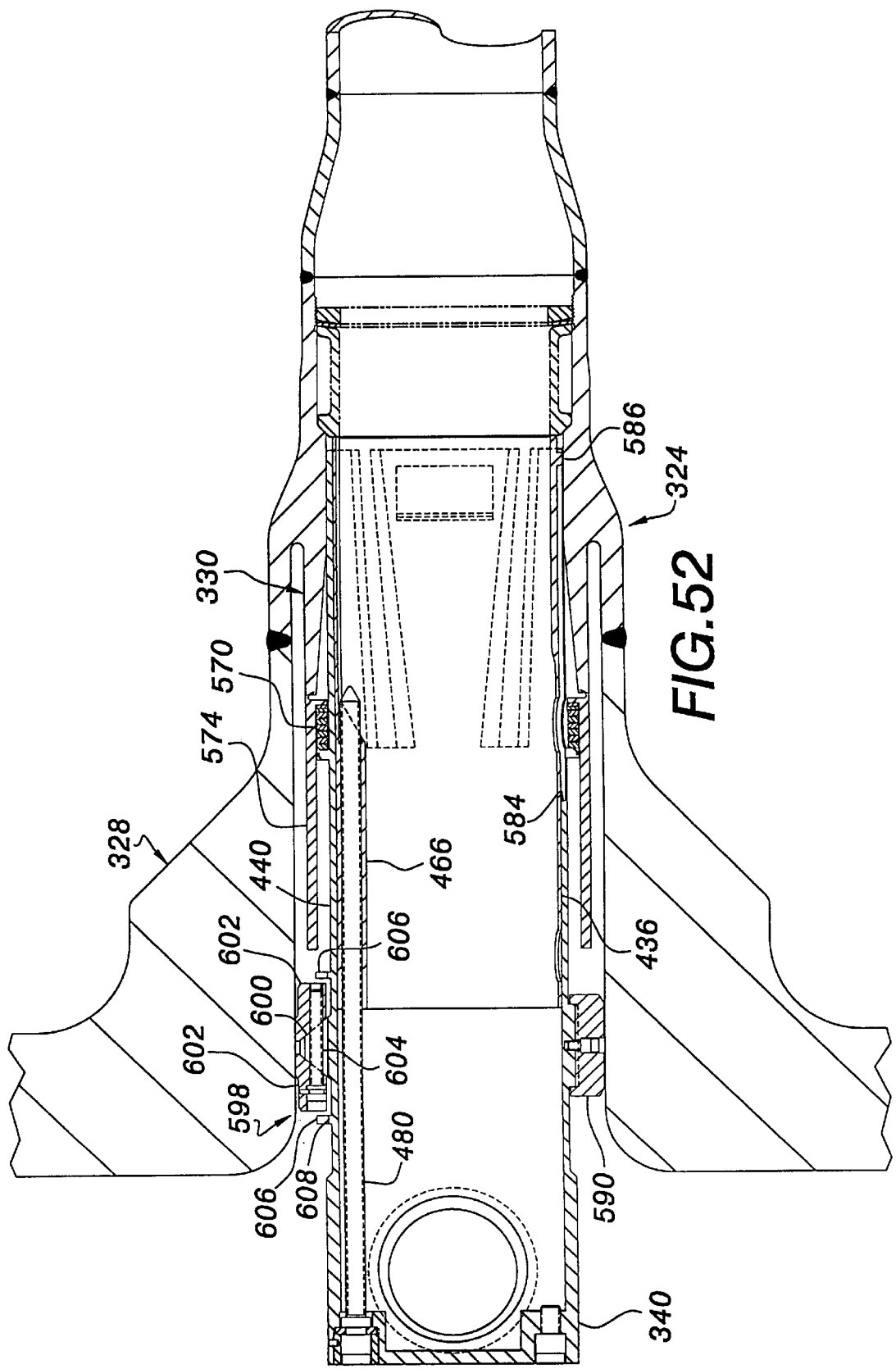

METHOD FOR REPLACING CRACKED CORE SPRAY SUPPLY PIPING IN A BOILING WATER REACTOR

CROSS-REFERENCE TO RELATED APPLICATIONS

This application claims the benefit of U.S. Provisional Applications Ser. No. 60/087,343, filed May 29, 1998, and Ser. No. 60/115,383, filed Jan. 11, 1999, the disclosures of which are incorporated herein by reference.

BACKGROUND OF THE INVENTION

1. Field of the Invention

The present invention relates generally to boiling water reactors and, more particularly, to a method and apparatus for replacing cracked core spray supply piping in a boiling water reactor.

2. Discussion of the Related Art

A typical boiling water nuclear reactor 10, as illustrated in FIG. 1, includes a reactor vessel 12, a core 14 made up of a plurality of fuel assemblies 16, and a core shroud 18 disposed concentrically within the reactor vessel around the core. Core shroud 18 includes upper and lower cylindrical sections 20 and 22 connected by a horizontal plate 24 extending radially inward from a bottom edge of the upper cylindrical section to a top edge of the lower cylindrical section. A shroud head flange is welded to the top edge of the upper cylindrical shroud section and extends radially inward to support a shroud head or lid 26 of generally hemispherical configuration, the lid being secured to the top of the shroud with bolts threadedly or otherwise engaged by lugs mounted in angularly spaced relation about the shroud periphery adjacent the top edge of the shroud.

Fuel assemblies 16 are supported at the bottom by a core plate 28 mounted on a core plate support ring extending radially inward from the bottom edge of the lower cylindrical shroud section and at the top by a top guide 30 mounted on horizontal plate 24. Control rod guide tubes 32 are provided within vessel 12 at locations above a control rod driving mechanism extending through nozzles located at the bottom of the reactor vessel beneath the shroud. Lower ends of corresponding control rods are detachably connected to the driving mechanism and are arranged to move up and down within the guide tubes.

Feedwater enters the reactor vessel via a feedwater inlet 34 and is distributed circumferentially within the reactor vessel by a ring-shaped pipe 36 disposed above the shroud and known as a feedwater sparger. The feedwater mixes with other water coming from the steam separators and flows downwardly from feedwater sparger 36 through the downcomer annulus 38, that is, the annular region between the reactor vessel and the core shroud, and ultimately enters the core lower plenum 40. A portion of the other downcomer water and feedwater is withdrawn from the reactor vessel via a recirculation water outlet 42 and is fed under pressure into a plurality of jet pump assemblies 44 distributed circumferentially about the core shroud to produce a forced convection flow through the core. Boiling is produced in the core creating a mixture of water and steam which enters the core upper plenum, that is, the space under the shroud sealing lid, and is directed into steam plenum heads or stand pipes 46 mounted vertically on the shroud sealing lid in fluid communication with the core upper plenum. The mixture of water and steam flows through stand pipes 46 and enters a respective plurality of steam separators 48, which are shown as being of the axial-flow centrifugal type. The separated liquid water then mixes with incoming feedwater and flows downwardly to the core via the downcomer annulus. The steam, on the other hand, passes through a steam drying assembly or dryer 50 disposed above the steam separators and is withdrawn from the reactor vessel via a steam outlet 52.

In a loss-of-coolant accident, or LOCA, rupturing of the recirculation duct system or the steam duct system during operation can cause coolant water to flow out of the reactor vessel thereby lowering the water level in the reactor vessel and exposing the core such that the fuel assemblies may become overheated and damaged. In order to prevent overheating of the reactor core during a LOCA, tubular core spray spargers 54 of semi-circular configuration are oriented horizontally within the upper cylindrical section of shroud 18 above top guide 30 and are apertured at multiple locations to supply water to the core. These semi-circular core spray spargers are arranged in opposed pairs to form circular rings at two elevations, with core spray inlet or supply piping 56 connecting upper and lower pairs of core spray spargers with nozzles formed in the reactor vessel above shroud 18 at respective azimuthal locations. The connection at the core spray nozzle is made with a safe end assembly having a hollow, cylindrical safe end welded to the nozzle externally of the reactor vessel and a thermal sleeve which extends from the safe end in an inboard direction, i.e., toward the interior of the reactor vessel, to a flow divider or T-box 58 disposed in the reactor vessel above the shroud. As best seen in FIG. 2, core spay supply piping 56 includes a pair of horizontal sections or arms 60 which extend circumferentially, in opposite directions, from T-box 58 to a pair of upper elbows 62 where the piping turns downwardly to connect with a pair of vertical sections 64. Each vertical section 64 of the piping extends downwardly from one of the upper elbows to a lower elbow 66 where the piping turns inwardly, or in the inboard direction, to penetrate through the shroud and connect with respective core spray spargers 54 disposed therein.

After periods of use, intergranular stress corrosion cracking of the core spray spargers and other sections of the core spray supply piping tends to occur as a result of corrosion, radiation and stress. The cracks usually occur in the heat-affected zones of the welds that join the typically austenitic stainless steel piping and associated components of the core spray supply system and are predominantly circumferential, with axial cracks occurring less frequently. Such cracking can lead to crack opening widths which permit significant leakage from the core spray spargers and the core spray supply piping. Leakage from the core spray spargers inside the shroud is typically not considered to be a major problem; however, when significant leakage from the core spray supply piping occurs outside the shroud, the piping must either be replaced or repaired.

A first type of repair involves welding the cracked piping to close the crack; however, weld repairs below the field welds connecting the vertical piping sections with the lower elbows are typically not practical due to inaccessibility, radiation exposure, and helium cracking due to radiation damage. U.S. patent application Ser. No. 08/758,056, the disclosure of which is incorporated herein by reference, discloses another method of repairing cracked core spray supply piping in a boiling water reactor wherein clamps are secured to lengths of core spray supply piping on opposites sides of a crack and are urged together to apply an axially compressive force or preload on the piping to close the crack. While this second type of repair is satisfactory for most locations, it is generally more complicated and expensive for pipe cracking which occurs below the field weld due to the complex geometry and relatively inaccessible nature of this joint and the possibility of pipe leakage due to large seismic displacements of the shroud.

SUMMARY OF THE INVENTION

Accordingly, it is a primary object of the present invention to overcome the above-mentioned disadvantages of the prior art and to provide a method and apparatus for replacing cracked core spray supply piping in a boiling water reactor to ensure an adequate supply of water to the reactor core in the event of a loss-of-coolant accident.

Some of the advantages of the present invention over the prior art are that the replacement is relatively inexpensive, that reactor shut-down time due to the replacement is minimized, that radiation exposure is negligible for personnel, that design basis core spray delivery flow can be met without licensing basis changes, and that the replacement can be accomplished remotely with minimum reactor water drainage and little or no in-vessel welding.

The present invention is generally characterized in a method for replacing cracked core spray supply piping in a boiling water reactor vessel including removal of all or part of the core spray supply piping inside the reactor vessel and replacement thereof with new piping components configured to couple with one another or any remaining core spray supply piping without welding. In accordance with one aspect of the invention, a lower elbow of the core spray supply piping is removed and replaced with an elbow assembly configured to mechanically couple with a feed-through assembly at the core shroud, for example by use of friction, bias members, or bolts and sealing members such as gaskets. A vertical section of the core spray supply piping feeding into the lower elbow can also be removed and replaced with a new piping section configured to mechanically couple with the replacement lower elbow assembly, for example using pins, clamps and sealing members such as piston rings. In accordance with another aspect of the invention, the vertical piping section is removed along with an upper elbow, horizontal core spray supply arms and the flow divider or T-box and replaced with a new T-box assembly and piping. The T-box assembly can be connected to the piping using any of the disclosed joints and can carry replacement thermal sleeves which fully replace or couple with existing thermal sleeves. Various mechanisms are disclosed for mechanically coupling the new T-box assembly with the existing safe end assembly.

Other objects and advantages of the present invention will become apparent from the following description of the preferred embodiments taken with the accompanying drawings, wherein like parts in each of the several figures are identified by the same reference numerals.

BRIEF DESCRIPTION OF THE DRAWINGS

FIG. 7 is a side view, partly in section, of a replacement lower elbow assembly according to the present invention.

FIG. 9 is a fragmentary side view, partly in section, of a lower portion of the core spray supply piping in a boiling water reactor illustrating installation of a replacement lower elbow assembly in accordance with the present invention.

FIG. 10 is a fragmentary side view, partly in section, of a lower portion of the core spray supply piping in a boiling water reactor illustrating placement of a pin as part of the installation of the replacement lower elbow assembly according to the present invention.

FIG. 11 is an enlarged fragmentary side view, partly in section, of the replacement lower elbow assembly after it has been installed in accordance with the present invention.

FIG. 12 is a fragmentary side view, partly in section, of a modification of a replacement lower elbow assembly installed in accordance with the present invention.

FIG. 16 is a fragmentary side view, partly in section, of yet another modification of a replacement lower elbow assembly installed in accordance with the present invention.

FIG. 17 is a view of the replacement lower elbow assembly of FIG. 16 taken through line 17—17.

FIG. 18 is a vie of the replacement lower elbow assembly of FIG. 17 taken through line 18—18.

FIG. 19 is a fragmentary side view, partly in section, of still another modification of a replacement lower elbow assembly installed in accordance with the present invention.

FIG. 20 is a view of the replacement lower elbow assembly of FIG. 19 taken through line 20—20.

FIG. 21 is a view of a clamping plate for the replacement lower elbow assembly of FIG. 19 taken through line 21—21.

FIG. 25 is a fragmentary side view, partly in section, of a lower portion of the core spray supply piping in a boiling water reactor illustrating a replacement vertical piping section installed in accordance with the present invention.

FIG. 26 is an enlarged fragmentary side view, partly in section, of the lower end of the replacement vertical piping section shown in FIG. 25.

FIG. 27 is an enlarged fragmentary side view, partly in section, of the upper end of the replacement vertical piping section shown in FIG. 25.

FIG. 34 is a fragmentary top view, partly in section, of a reactor vessel illustrating the location of cuts made in another type of existing safe end assembly in accordance with the method of the present invention.

FIG. 35 is a fragmentary top view, partly in section, of a reactor vessel illustrating another modification of a replacement T-box assembly and core spray supply piping particularly useful in replacing a safe end assembly of the type shown in FIG. 34.

FIG. 36 is a sectional view of the replacement T-box assembly of FIG. 35 taken through line 36—36.

FIG. 37 is a sectional view of the replacement T-box assembly of FIG. 35 taken through line 37—37.

FIG. 46 is an outboard view of the replacement lower elbow assembly of FIG. 45.

FIG. 47 is an enlarged sectional side view of a spool piece for use with the replacement lower elbow assembly of FIG. 45.

FIG. 48 is an end view of the spool piece shown in FIG. 47.

FIG. 52 is a fragmentary side view, partly in section, of yet another replacement safe end assembly installed in accordance with the present invention.

FIG. 53 is an outboard view of the T-box assembly at the outboard end of the replacement safe end assembly of FIG. 52.

DESCRIPTION OF THE PREFERRED EMBODIMENTS

The method and apparatus of the present invention are described hereinafter for use in partial or complete replacement of cracked piping connecting the core spray nozzles with core spray spargers in a boiling water reactor. It will be appreciated, however, that the method and apparatus according to the present invention can be used to replace other piping components of the core spray supply system such as, for example, the core spray spargers inside the core shroud as well as other in-vessel piping including, but not limited to, the feedwater spargers disposed above the core shroud and the jet pump recirculation system piping in the annular space between the core shroud and the reactor vessel.

Figures 3, 5, 6:
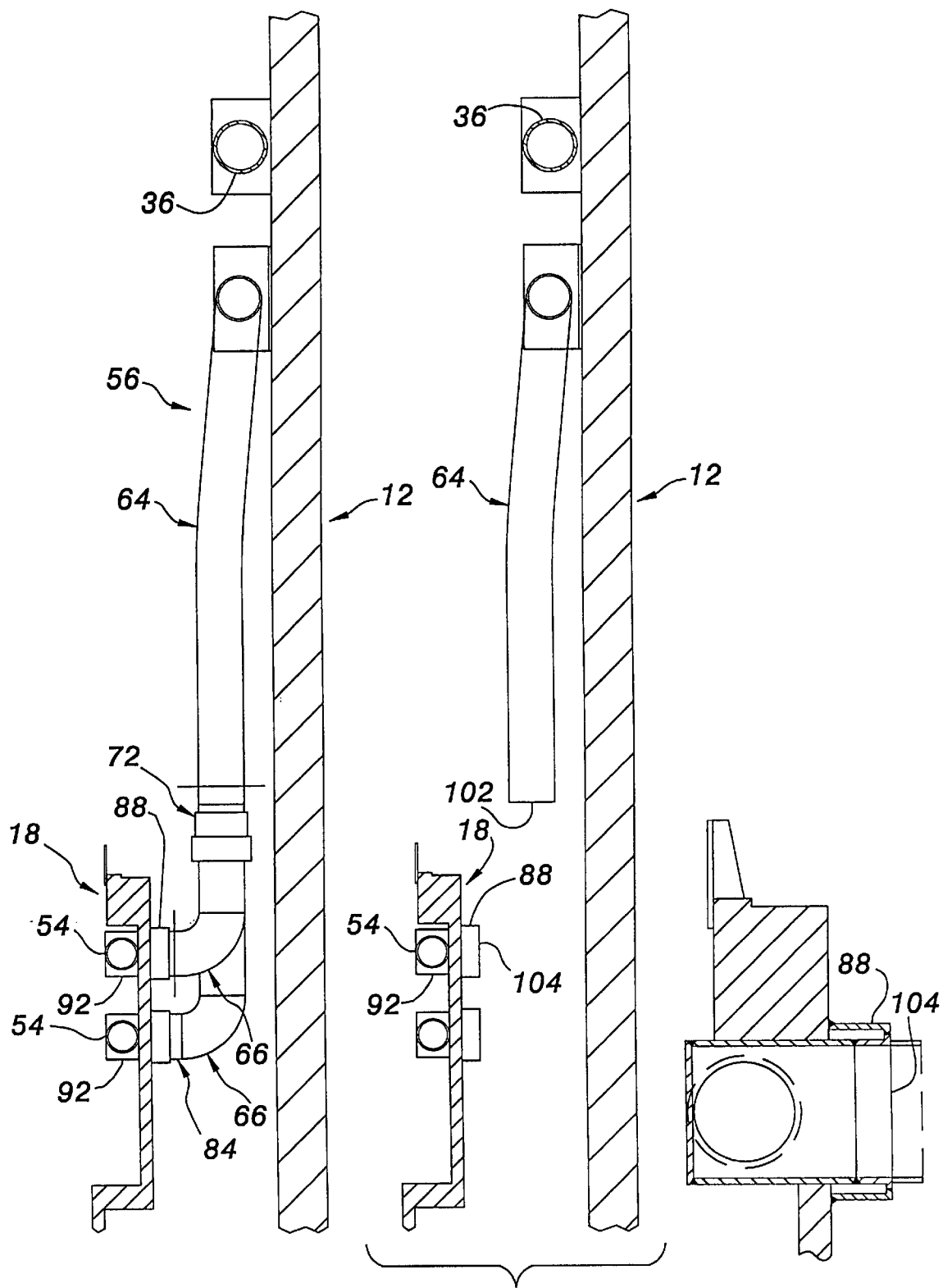
FIG. 3 is a fragmentary side view, partly in section, of a lower portion of the core spray supply piping in a boiling water reactor illustrating cuts made on opposite sides of the existing lower elbow in accordance with the method of the present invention.
FIG. 5 is a fragmentary side view, partly in section, of a lower portion of the core spray supply piping in a boiling water reactor illustrating removal of the lower elbow in accordance with the method of the present invention.
FIG. 6 is an enlarged fragmentary side view, partly in section, of the feed-through assembly after the existing lower elbow has been removed.
Figure 4:
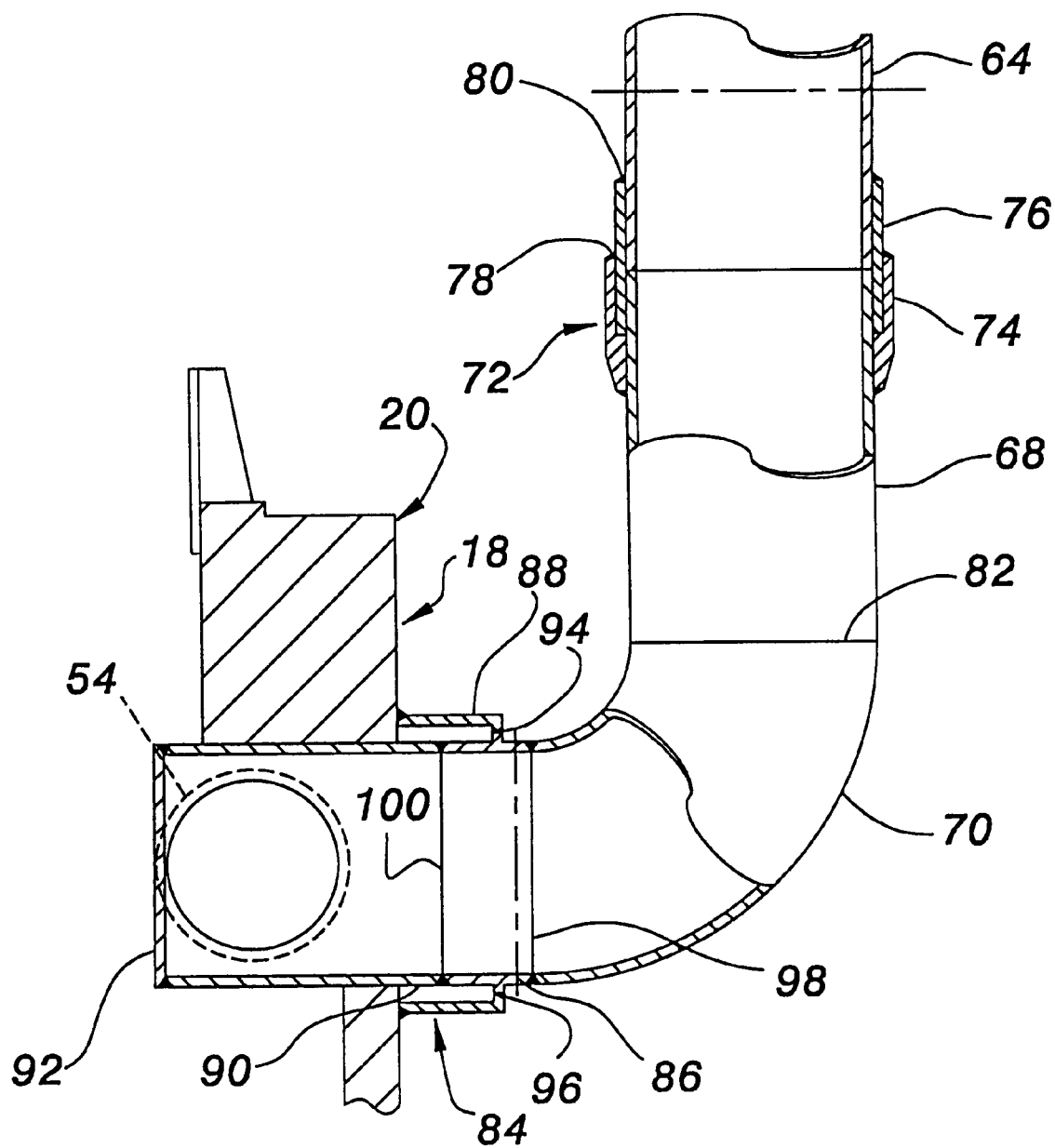
FIG. 4 is an enlarged fragmentary side view, partly in section, of the existing lower elbow of the core spray supply piping illustrating the location of the cuts made in accordance with the method of the present invention.

In accordance with a first aspect of the present invention, illustrated in FIGS. 3–11, a lower elbow 66 of the core spray supply piping 56 is removed from the reactor vessel and replaced with an elbow assembly configured to couple with existing components of the core spray supply piping without welding. As best seen in FIGS. 3 and 4, lower elbow 66 includes a straight portion 68 extending downwardly from vertical pipe section 64 and a curved portion 70 bending inwardly from the bottom of the straight portion to connect with a core spray sparger 54 in the upper cylindrical section 20 of shroud 18. A coupling 72 is welded near the top of straight elbow portion 68 and includes a hollow, cylindrical cuff 74 extending upwardly in radially spaced relation to the straight portion of the elbow to define an annular recess therebetween and a cylindrical sleeve 76 which sits within the annular recess and extends upwardly to receive vertical pipe section 64 in telescoping relation. Cuff 74 is connected to sleeve 76 by a weld 78 formed at the junction between the top of the hollow, cylindrical cuff and a medial portion of the sleeve. Sleeve 76 is connected to vertical pipe section 64 by a weld 80 formed at the junction between the top of the sleeve and a portion of the vertical pipe section adjacent the bottom. Welds 78 and 80 are typically made in the field after the shroud assembly has been lowered into the reactor vessel and are thus referred to as "field" welds. Similarly, coupling 72 is often referred to as a "field weld" coupling.

The bottom of straight elbow portion 68 is connected to an upper end of curved elbow portion 70 at a weld 82. Curved elbow portion 70 bends inwardly, or in the inboard direction, about 90° from the bottom of straight elbow portion 68 to connect with core spray sparger 54 via a feed-through assembly 84 which extends through shroud 18. Assembly 84 includes a hollow, cylindrical insert 86 disposed concentrically within a cylindrical collar 88 on the exterior surface of shroud 18 and a hollow, cylindrical sleeve 90 which extends inwardly from the insert to a flow divider or T-box 92 within the shroud. A round flange 94 extends radially outward from a medial portion of insert 86 and is connected to an outer end of collar 88 by a weld 96. Insert 86 protrudes from collar 88 in the outboard direction (i.e., away from the center of vessel) to connect with elbow 66 at a weld 98. The insert and sleeve are connected by a weld outside the shroud.

Over time, cracks can develop in the field weld coupling and along the welds joining the curved portion of the elbow with the straight portion of the elbow and the shroud feed-through assembly as a result of corrosion, radiation and stress. As mentioned above, such cracking can lead to crack opening widths which permit significant leakage of coolant water from the core spray supply piping. Since the elbow is located outside the shroud, significant leakage cannot be tolerated so the elbow must either be replaced or repaired. As explained above, weld repairs are only practical for pipe cracking above the field weld coupling because of limited accessibility, increased radiation exposure, and questions of weld adequacy due to helium cracking as a result of prior radiation damage to existing parts near the fuel. Other types of repairs, such as mechanical clamps, are particularly well suited for locations above the field weld coupling because of better accessibility and less complex piping configurations.

The elbow replacement method according to the present invention includes shutting down the reactor and removing any reactor internals which may impede access to the core spray supply piping. It is not necessary to drain reactor water below the elbow. This minimizes radiation exposure to personnel by maintaining a sufficient water level for shielding above the more highly radioactive areas of the reactor (i.e., nearest the reactor fuel).

Elbow 66 is removed by cutting the core spray supply piping above field weld coupling 72 and between welds 94 and 98, for example at the locations indicated by broken lines in FIGS. 3 and 4. The cutting operation can be performed in any suitable manner but is preferably performed remotely using conventional long-handled tools operated from the refuel bridge above the reactor vessel. The cuts are preferably oriented perpendicular to the longitudinal axes of vertical pipe section 64 and insert 86, respectively, but can be made at any angle relative to the longitudinal axes of the piping components dependent upon the design of the replacement elbow assembly. Elbow 66 is preferably held while the cuts are made so that, when both cuts extend completely about the circumference of the piping, the elbow can be lifted out of the reactor vessel. Once elbow 66 is removed, the cut end 102 of vertical piping section 64 can be pushed outwardly, away from shroud 18, and in the direction of reactor vessel 12, as shown in FIG. 5, to provide clearance for the replacement elbow assembly. The cut end 104 of insert 86 can be substantially flush with the outboard end of collar 88, as shown by solid lines in FIG. 6, or the cut end of the insert 86 can protrude outwardly from the collar a predetermined distance, as shown by broken lines in FIG. 6, dependent upon the design of the replacement elbow assembly.

A replacement elbow assembly 106 according to the present invention, as illustrated in FIG. 7, includes a straight length of piping 108 extending upwardly from one end of a 90° elbow 110 to receive the vertical piping section and a coupling 112 mounted on the other end of the elbow to receive the collar on the exterior surface of the shroud. The straight length of piping 108 defines a coupling member in the form of a socket 113 having a first cylindrical inner surface 114 which extends downwardly from the top of the straight length of piping. A second cylindrical inner surface 116 of greater diameter than the first cylindrical inner surface extends upwardly from the bottom of the straight length of piping to a frustoconical inner surface 118 of decreasing diameter in the upward direction which connects the second cylindrical inner surface with the first cylindrical inner surface. The first cylindrical inner surface 114 is configured to receive the cut end of the vertical pipe section in telescoping relation for a close sliding fit. A boss 120 of generally rectangular configuration is mounted on an outer surface of the straight length of piping 108 in juxtaposition to the first inner cylindrical surface 114 to define a recess or bore 122 in communication with a hole 124 in the piping to receive a pin 126 for reasons that will be explained below. An annular groove 128 is formed about the circumference of the first cylindrical inner surface 114 between the top of the straight length of piping and boss 120 to hold a piston ring 130 of conventional configuration.

Elbow 110 has an inner diameter about the same as the second cylindrical surface of the straight length of piping 108. Coupling 112 at the bottom end of elbow 110 includes a hollow, cylindrical skirt 132 configured to receive collar 88 in telescoping relation for a close sliding fit, a first annular flange 134 extending radially outward from an inboard end of the skirt to fit against shroud 18, and a second annular flange 136 extending radially inward from an outboard end of the skirt to connect with the bottom end of elbow 110 and to define an internal shelf or shoulder 138 for abutting the cut end of the safe end or collar. An O-ring 140 is held within an annular recess or groove 142 formed in an inboard facing surface 144 of the first flange 134 to seal against the shroud when the replacement elbow assembly is installed. If desired, inboard face or surface 144 of the coupling can have a concave curvature conforming to the curvature of the shroud.

Pin 126 includes an externally threaded shank 146 of cylindrical configuration extending from a head or cap 148 of greater diameter than the shank to a smooth-sided cylindrical plug 150 of smaller diameter than the shank. The bore 122 of boss 120 has a generally cylindrical outer portion or recess configured to receive the head 148 of pin 126 and extending inwardly from an outer end of the boss to an intermediate portion of smaller diameter than the outer portion, the intermediate portion being threaded to receive shank 146 of the pin. The threaded intermediate bore portion extends inwardly, in the direction of the piping, from the outer bore portion to a smooth-sided cylindrical inner portion or hole 124 of smaller diameter than the intermediate portion.

Figure 8:
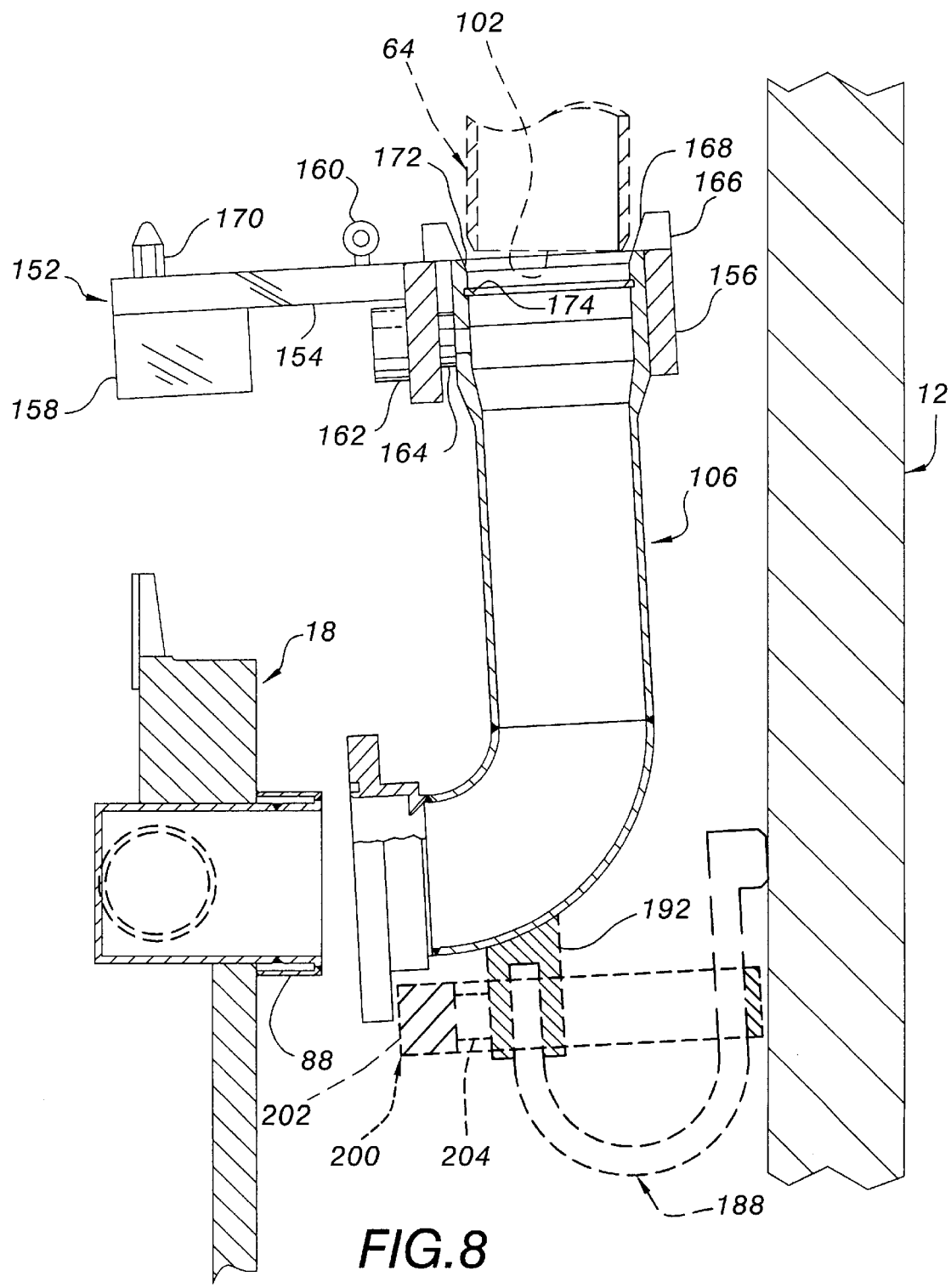
FIG. 8 is a side view, partly in section, of a tool for installing a replacement lower elbow assembly according to the present invention.

With vertical piping section 64 pushed toward or against the inner surface of reactor vessel 12, replacement elbow assembly 106 is lowered into the reactor vessel, for example using the installation tool 152 illustrated in FIG. 8. Installation tool 152 includes a flat bar or platform 154 with a cylindrical ring 156 at one end for receiving the upper portion of replacement elbow assembly 106 and a counterweight 158 at the opposite end of the platform to maintain the tool in a generally horizontal orientation when the tool is lifted using a centrally located lifting attachment 160 such as a ring or eye-bolt, so that the replacement elbow assembly is positioned to engage existing core spray supply piping without the need for tilting the tool. A hydraulic cylinder 162 is mounted on one side of the cylindrical ring and includes a piston 164 extending through a hole in the ring to push the top end of the elbow assembly against the diametrically opposed side of the ring such that the tool is securely attached to the replacement elbow assembly. A circular guide 166 with an inwardly tapered aperture 168 is positioned eccentrically over cylindrical ring 156 to be centered with the replacement elbow assembly and function as a lead-in to ease insertion of the vertical piping section into the replacement elbow assembly. The installation tool can be rotated and manipulated in other ways using a lug 170 which extends upwardly from the platform above counterweight 158.

Elbow assembly 106 is lowered into the annular space between shroud 18 and reactor vessel 12 as shown in FIGS. 8 and 9 until installation tool 152 is below the bottom or cut end 102 of vertical piping section 64, after which circular guide 166 is positioned directly beneath the vertical piping section and the tool is lifted to cause the bottom end of the vertical piping section to slide into the top end of replacement elbow assembly 106. Any slight misalignment of installation tool 152 and vertical piping section 64 is accommodated by the generous lead-in chamfers 168 and 172 provided at the top of the tool and the upper end of the elbow assembly which tend to center the bottom of the vertical piping section in the socket at the top end of the elbow assembly. As the bottom end of vertical piping section 64 slides into socket 113 at the top end of replacement elbow assembly 106, it contacts the chamfered inner edge 174 of piston ring 130 causing the piston ring to expand while maintaining a close sliding fit or seal with the vertical piping section. Tool 152 is lifted until the coupling 112 at the bottom end of the elbow assembly is at about the same elevation as collar 88, at which point the bottom end of the vertical piping section is spaced vertically below boss 120 on the replacement lower elbow assembly. With coupling 112 centered on collar 88, vertical piping section 64 is allowed to spring back to its original or rest position thereby drawing the coupling over the collar as shown in FIG. 10. If necessary, lateral forces may be applied to elbow assembly 106, for example using lug 170 on top of tool 152, to overcome frictional forces so that coupling 112 will slide over collar 88 until shoulder 138 abuts the cut end 104 of insert 86 as shown in FIG. 11, thereby signaling sufficient compression of O-ring 140 to create a seal. With elbow assembly 106 being maintained in the position shown, a hole 176 is formed in the vertical piping section 64 using the bore defined by boss 120 as a guide for the hole-forming tool (e.g., a mechanical drill or EDM device). Pin 126 is then inserted into the bore until the threaded shank 146 engages the threaded portion of the bore, after which the pin is screwed in as shown in FIG. 11. The smooth-sided cylindrical plug 150 of pin 126 is longer than the inner portion of bore 124 formed through the replacement elbow assembly such that, when the pin is threadedly engaged in the bore, a tip or inner end of the plug will protrude from the inner surface of the piping into the hole 176 formed in vertical piping section 64 to carry full axial design loads without reliance on friction; however, the pin will preferably not protrude inwardly beyond the inner diameter of the vertical piping section to minimize flow obstruction. The hole 176 can be formed prior to positioning elbow assembly 106, in which case the plug portion of pin 126 is preferably of smaller cross-sectional dimension than the hole to allow for machining tolerances in the hole and the lug pin and to provide clearance during installation. For example, if the plug and the hole are circular, the plug could have a diameter of about 1.0 inches with the hole being formed with a diameter of about 1.5 inches or any other suitable diameter equal to or greater than the diameter of the plug. It will be appreciated that forming the hole in the vertical piping section after the joint is assembled allows the replacement method to accommodate a wide range of elevation tolerance effects (e.g., up to about 1 inch).

The replacement lower elbow assembly 106 provides a simple and rugged, low leakage connection between existing vertical piping and core spray spargers with little or no reduction in core spray flow. The connections between the replacement lower elbow assembly and existing components of the core spray supply piping have a greater degree of flexibility as compared with welded joints and may therefore reduce normal operating and accident loads on the newly installed elbow assembly. For example, the vertical piping section 64 may rock somewhat within the socket at the top end of elbow assembly 106 without causing significant leakage and, if a larger hole is formed in the vertical piping section, there will be some axial compliance as well. Similarly, coupling 112 at the bottom end of elbow assembly 106 can slide relative to collar 88 a predetermined distance dependent upon the configuration of the O-ring 140 and the tightness of the fit between the coupling and the collar. The replacement method allows existing piping supports to be used since loads on the supports are expected to be reduced due to the added piping flexibility. If desired, replacement of the lower elbow can be used as the first step for a complete core spray supply piping replacement as described below.

Pin 126 can be modified to push vertical piping section 64 laterally within the socket 113 defined at the top of elbow assembly 106 to achieve a close diametrical fit on the side of the piston ring 130 which has the gap. For example, in FIG. 12, a modified pin 126 is shown having a threaded shank 146 extending from the head 148 of the pin to a radial step or shoulder 178 connecting the threaded shank with a smooth-sided plug 150 of smaller diameter than the shank. Plug 150 of the modified pin 126 has a length about the same as the wall thickness of vertical piping section 64, and the threaded portion of the bore formed in boss 120 is extended through the elbow assembly so that shoulder 178 connecting threaded shank 146 with the plug abuts the vertical piping section when the plug is received within the hole formed therein. Tightening pin 126 causes shoulder 178 to push vertical piping section 64 laterally within socket 113 at the upper end of elbow assembly 106. If gap 180 of the piston ring 130 is positioned on the side of the socket opposite pin 126, tightening of the pin will push the piston ring gap into annular groove 128 thereby minimizing leakage through the piston ring gap, which may be relatively large due to the need to accommodate diametrical tolerance variations in the piping (e.g., up to about 0.09 inch variations in outer diameter). Also shown in FIG. 12 is a modification of the top end of elbow assembly 106 wherein socket 113 is threaded and the lead-in chamfer 172 is defined by a circular cap or ring nut 182 threadedly engaging the socket. In the embodiment shown, socket 113 is provided with internal threads 184 above annular piston groove 128 and a lower end of ring nut 182 is provided with external threads 186 which are received within the open top end of the socket thereby defining an upper wall for the annular piston groove. It will be appreciated, however, that the ring nut can be internally threaded to receive external threads formed about the exterior of the socket. The use of threaded ring nut 182 facilitates installation of piston ring 130 by permitting the piston ring to be placed directly into annular piston groove 128 when the ring nut is not attached to the elbow assembly. Ring nut 182 is then threaded into socket 113 at the top end of elbow assembly 106 to retain piston ring 130 within annular groove 128 as well as to define a lead-in chamfer 172 which centers vertical piping section 64 relative to the socket during installation of the elbow assembly in the reactor vessel. Use of a removable ring nut allows the piston ring to be installed in a substantially undeformed condition thereby assuring a tight fit between the piston ring and a desired range of piping diameters by preventing undesirable permanent deformation of the ring.

Figure 13:
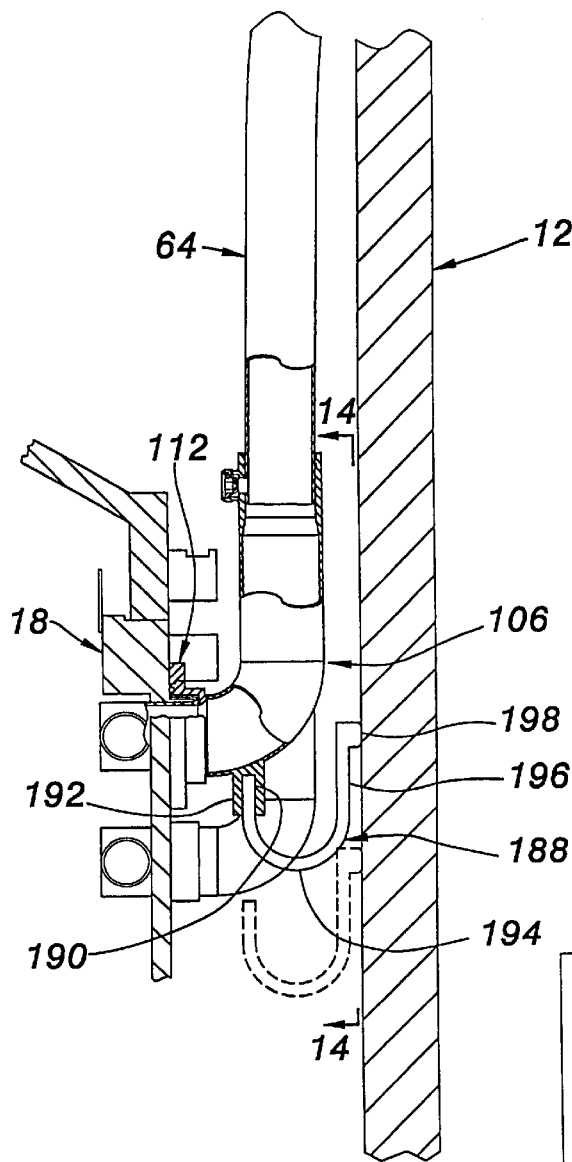
FIG. 13 is a fragmentary side view, partly in section, of another modification of a replacement lower elbow assembly installed in accordance with the present invention.
Figure 14:
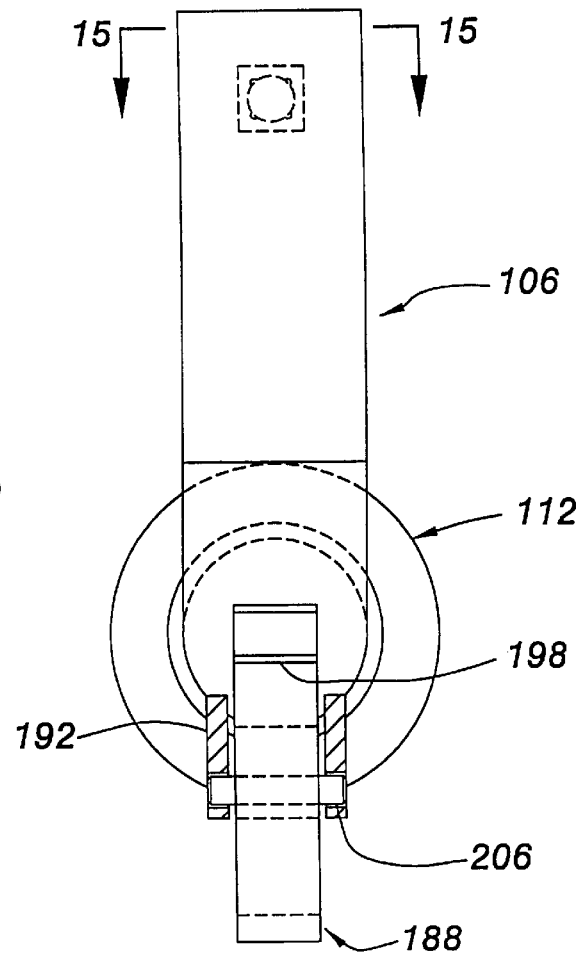
FIG. 14 is a view of the modified lower elbow assembly of FIG. 13 taken through line 14—14.
Figure 15:
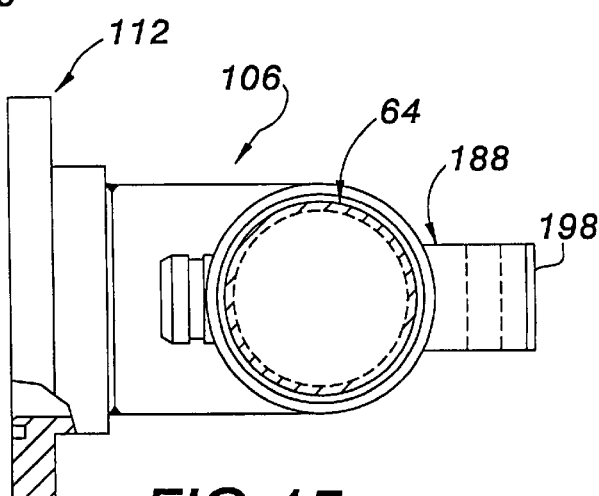
FIG. 15 is a view of the modified lower elbow assembly of FIG. 14 taken through line 15—15.

A modification of the lower elbow replacement method according to the present invention, illustrated in FIGS. 13–15, utilizes a replacement elbow assembly 106 similar to that described above but with a bias member 188 held in compression between the replacement elbow assembly and reactor vessel 12 to bias the coupling inwardly in the direction of shroud 18. Bias member 188 is shown as a generally U-shaped spring having a first leg 190 extending downwardly from a bracket 192 on the lower elbow assembly to a convexly curved portion 194 connecting first leg 190 with a second leg 196 disposed adjacent the inner or inboard surface of the reactor vessel. Second leg 196 of the spring extends upwardly from curved spring portion 194 to a foot 198 extending perpendicularly from the top of the second leg in the outboard direction to abut the inner surface of the reactor vessel. The replacement method of FIGS. 13–15 proceeds essentially as described above; however, spring 188 is preferably held in a compressed condition during installation, for example using a C-clamp as shown by broken lines at 200 in FIG. 8. Clamp 200 fits around first and second legs 190 and 196 of spring 188 and includes a hydraulic cylinder 202 with a piston 204 which pushes against bracket 192 to move the clamp in an inboard direction such that the second leg is moved toward the first leg to compress the spring. Replacement elbow assembly 106 is lowered with clamp 200 in place around spring 188 and, once the lower elbow coupling 112 is placed over collar 88 on shroud 18, the spring is released by retracting piston 204 so that the coupling is biased inwardly, in the direction of the shroud, to maintain an essentially leak-free seal without relying on tight tolerances for a friction fit or welding. The spring can be made of any resilient material suitable for use in a reactor vessel such as, for example, Inconel X-750. The first leg of spring 188 can be attached to elbow assembly 106 at any location but is preferably held within a bracket extending downwardly from the curved portion of the elbow assembly as shown. The first leg of spring 188 can be held within the bracket by a pin, e.g., as shown by broken lines at 206 in FIG. 14, or the first leg of the spring can be attached directly to the elbow using other types of mechanical fasteners or by welding. While a bias member in the form of a U-shaped compression spring is shown, it will be appreciated that other types of bias members can be used including, but not limited to, generally V-shaped springs, coil springs, pan springs, leaf springs, Belleville springs, tension springs, and fluid-damped piston cylinders. In addition, it will be appreciated that other devices can be used to hold the spring in a compressed condition during installation including, but not limited to, removable straps which wrap around the legs of the spring, clamps with threaded pistons, bolts which extend through the legs of the spring, etc.

Yet another modification of the lower elbow replacement method according to the present invention, illustrated in FIGS. 16–18, utilizes a replacement elbow assembly 106 similar to the one shown in FIG. 7 but with a pair of bosses 208 mounted on coupling 112 at diametrically opposed locations on the outboard side of flange 134 facing away from shroud 18. Bosses 208 are similar to boss 120 described above in overall shape and size, and each boss 208 defines a first cylindrical recess 210 extending inwardly, in the direction of shroud 18, from an open end to a radial step or shoulder 212 connecting the first cylindrical recess with a cylindrical bore 214 of smaller diameter. The replacement method of FIGS. 16–18 proceeds essentially as described above; however, once the replacement elbow assembly 106 has been installed, bosses 208 can be used as guides to form threaded holes in shroud 18. Standard cap screws 216 are then inserted into bosses 208 and threaded into the holes formed in shroud 18 to secure coupling 112 against the shroud thereby compressing O-ring 140 to create an essentially leak-free seal between the bottom end of the elbow and the shroud without welding.

A further modification of the lower elbow replacement method according to the present invention, illustrated in FIGS. 19–21, utilizes a replacement elbow assembly 106 similar to the one shown in FIG. 7 but with a clamping mechanism 218 engaging the core spray sparger inside shroud 18. Clamping mechanism 218 includes a clamping plate or cap 220 with a semicircular rim, lip or flange 222 configured to fit over the cylindrical T-box 92 inside shroud 18 and a screw or bolt 224 extending through the plate into a threaded receptacle 226 defined in replacement elbow 106. Preferably, the head 228 of bolt 224 is received within a boss 230 protruding inwardly, toward the center of the shroud, from clamping plate 220, the boss being similar to those described above so that it can be used as a guide to drill or form a hole in the T-box for receiving the bolt. Threaded receptacle 226 is formed along a bottom surface of lower elbow assembly 106 and is oriented to be in coaxial alignment with the hole in clamping plate 220 when the lower elbow assembly is coupled with the collar on shroud 18. The replacement method using the elbow assembly shown in FIGS. 19–21 proceeds essentially as described above; however, the shroud sealing lid 231 is removed to provide access to T-box 92 within shroud 18, and a hole is formed in the T-box to receive bolt 224, for example using boss 230 on clamping plate 220 as a drill guide. Once the replacement elbow assembly 106 has been installed, bolt 224 is inserted through clamping plate 220 and the hole in T-box 92 and threaded into receptacle 226 in the lower elbow assembly to secure coupling 112 against shroud 18 to compress O-ring 140 thereby achieving an essentially leak-free seal between the lower end of the elbow assembly and the shroud without welding. This arrangement can also hold the T-box together in the event of cracking. If desired, an O-ring can be provided around the hole formed in the T-box to minimize leakage. Also, the lower elbow assembly can be configured to permit insertion of the screw from outside the shroud with the clamping plate being used to define a threaded receptacle.

Figure 22:
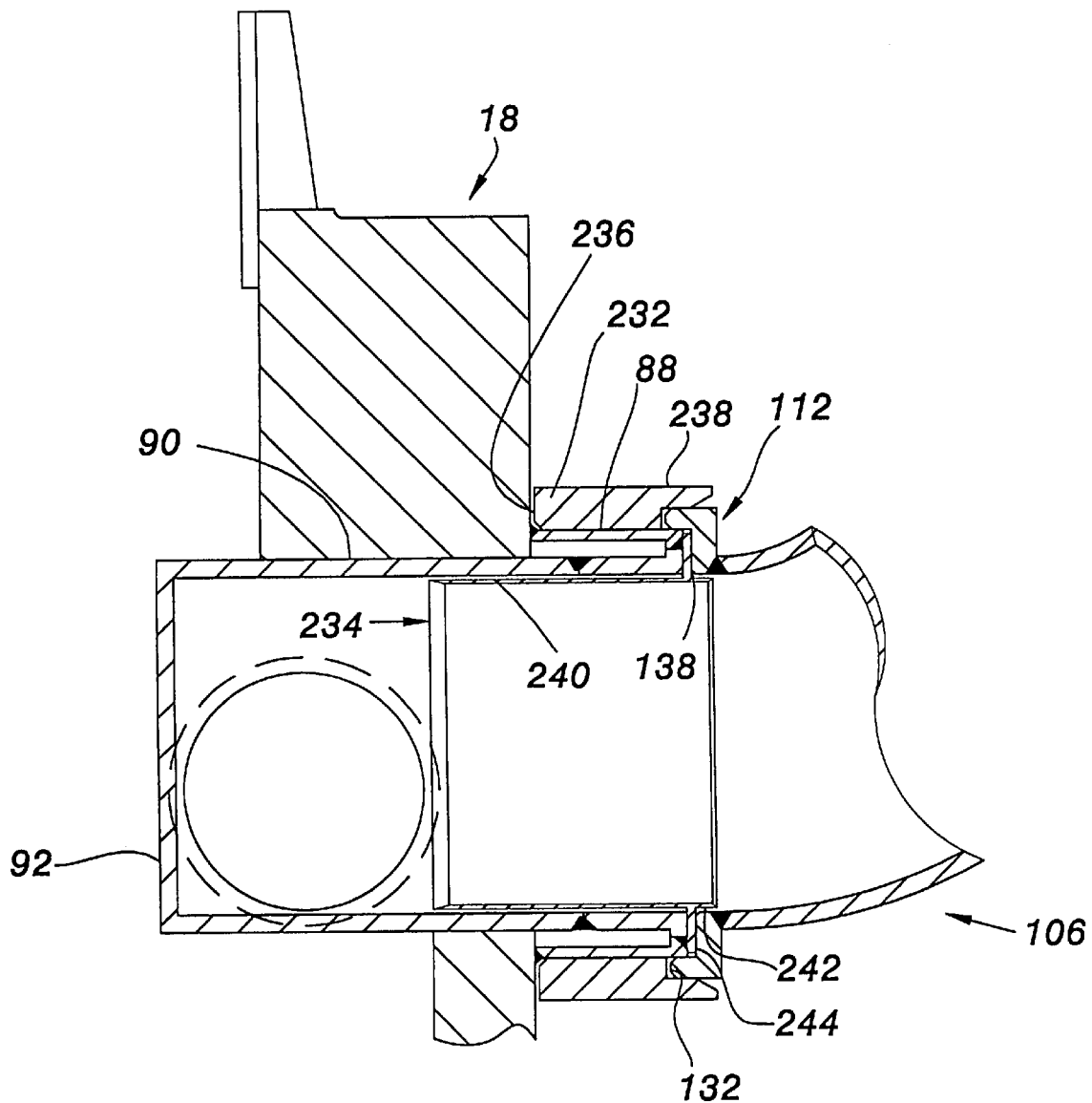
FIG. 22 is a fragmentary side view, partly in section, of the bottom end of a further modification of a replacement lower elbow assembly installed in accordance with the present invention.

Another modification of a lower elbow replacement according to the present invention, illustrated in FIG. 22, utilizes a replacement elbow assembly 106 having a lower coupling 112 similar to that shown in FIGS. 7 or 13 but with a shorter cylindrical skirt 132 and no inboard flange. The modified replacement elbow assembly 106 shown in FIG. 22 further includes a generally cylindrical ring 232 configured to fit around collar 88 on the outer surface of shroud 18 and a generally cylindrical insert 234 configured to fit telescopically within sleeve 90. Ring 232 includes an inboard end 236 telescopically fitted around collar 88 adjacent shroud 18 and a cylindrical rim 238 at an outboard end radially spaced from the collar to define an annular space therebetween for receiving cylindrical skirt 132 of lower elbow coupling 112. Insert 234 includes an inboard end 240 disposed telescopically within sleeve 90, an outboard end 242 protruding from the sleeve toward reactor vessel 12, and an annular flange 244 extending radially outward from between the inboard and outboard ends of the insert to abut the severed end of collar 88 thereby retaining the insert in a fixed position within the sleeve and presenting a suitably flat surface to create a seal with the lower elbow assembly. The replacement method using the elbow assembly shown in FIG. 22 proceeds in essentially the same manner as described above in connection with FIGS. 7 or 13; however, prior to installing replacement elbow assembly 106, ring 232 is placed around collar 88 and insert 234 is inserted into sleeve 90 until flange 244 abuts the collar. The top of replacement elbow assembly 106 (not shown) can be secured to vertical piping section 64 in any of the ways described herein. Once the top of replacement elbow assembly 106 has been secured, cylindrical skirt 132 at the bottom of the replacement lower elbow assembly is inserted into the annular space between ring 232 and collar remnant 88 until the radial step or shoulder 138 connecting the skirt with the lower elbow abuts annular flange 244 of insert 234. The presence of ring 232 around collar 88 prevents lateral expansion or bursting of the collar and the portion of the thermal sleeve protruding outwardly from shroud 18 in the event of cracking in either or both of these existing components, thereby maintaining a leak-free seal between the replacement lower elbow assembly and the existing core spray supply components adjacent the shroud. If desired, the insert can be provided with a piston ring about its circumference to seal against the inner surface of the feed-through sleeve.

Figure 23:
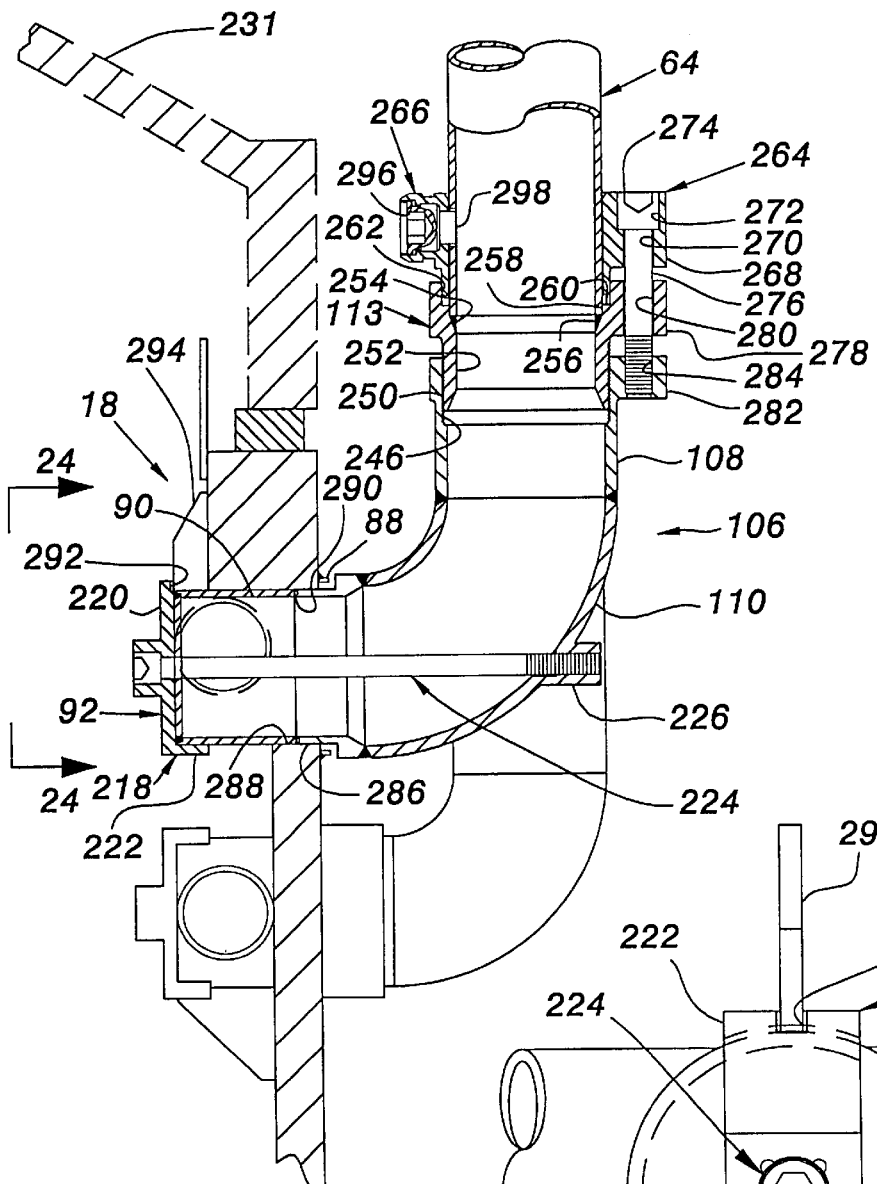
FIG. 23 is a fragmentary side view, partly in section, of yet another modification of a replacement lower elbow assembly installed in accordance with the present invention.
Figure 24:
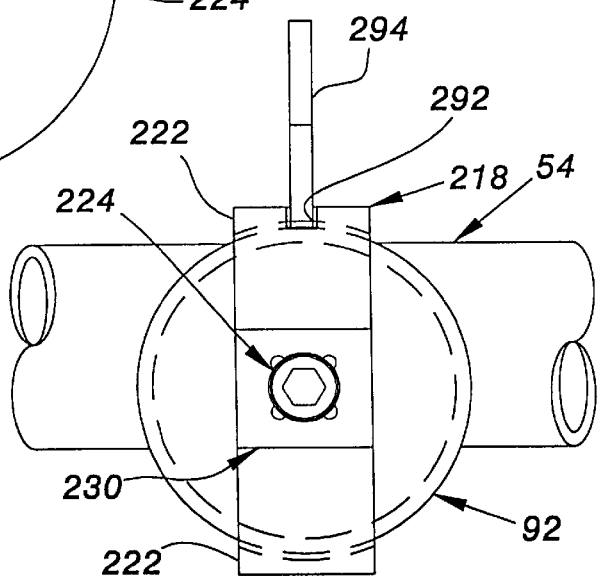
FIG. 24 is a view of the replacement lower elbow assembly of FIG. 23 taken through line 24—24.

Still another modification of a lower elbow replacement according to the present invention, illustrated in FIGS. 23 and 24, utilizes a clamping mechanism 218 similar to that shown in FIG. 19 and modified connections between the replacement elbow assembly and existing core spray supply piping components. Replacement elbow assembly 106 is similar to those described above; however, the straight length of piping 108 at the top of the elbow assembly has an internally threaded portion 246 at an upper end configured to threadedly receive a coupling member in the form of a separate socket 113 to permit height adjustment of the elbow assembly so that variations in the length of vertical piping section 64 can be accommodated. Socket 113 includes an externally threaded lower portion 250 defining a lower cylindrical inner surface 252 extending upwardly from the open bottom of the socket to a frustoconical shoulder 254 of increasing diameter in the upward direction looking at FIG. 23 for holding a tapered seal ring 256. An intermediate cylindrical inner surface 258 of the socket extends upwardly from shoulder 254 to receive the bottom end of vertical pipe section 64 in telescoping relation. A step or shelf 260 extends radially outward from the top of intermediate inner surface 258 to connect with an upper cylindrical inner surface 262 of the socket thereby defining an annular space between the vertical piping section and the upper portion of the socket for receiving a cylindrical gland ring 264. Gland ring 264 is configured to slide over the lower end of vertical piping section 64 in telescoping relation and includes a boss 266 on one side similar to those described above and an outwardly extending flange 268 with a bore 270 extending downwardly from a recess 272 of larger diameter configured to receive the head 274 of a screw 276. Socket 113 includes a flange 278 with a through-hole 280 formed therein for alignment with bore 270 in gland ring flange 268. A flange 282 also extends outwardly from the top end of straight elbow portion 108 and defines a threaded hole 284 for receiving the threaded end of a screw 276 when the screw is inserted through the gland ring and socket flanges 268 and 272, respectively. For purposes of illustration, all of the flanges are shown rotated 90° counterclockwise, looking downwardly, from their preferred position.

The bottom end of elbow assembly 106 carries a reduced diameter neck 286 configured to fit telescopically within the existing opening 288 formed through shroud 18 for feed-through sleeve 90. An annular groove is formed on the inboard face of neck 286 to hold an O-ring 290 such that the ring will engage a cut end of feed-through sleeve 90 in sealing relation. The elbow portion 110 of the replacement lower elbow assembly also includes a threaded receptacle 226 as described above and a clamping plate 220 with a lip, rim or flange 222 configured to fit around T-box 92; however, the clamping plate is generally rectangular and extends diametrically across the T-box to carry a pair of flanges 222 which engage opposite sides of the T-box. The uppermost flange is also shown with a slot 292 configured to receive a gusset 294 extending between T-box 92 and an inner surface of shroud 18.

The replacement method proceeds essentially as described above with respect to FIG. 19; however, collar 88 is cut close to shroud 18 to provide additional clearance for maneuvering neck 286 at the bottom of elbow assembly 106, and sleeve 90 is cut about midway through the shroud thickness in preparation for receiving the neck. Replacement elbow assembly 106 can be assembled prior to being lowered into the reactor vessel or the elbow assembly components can be lowered individually and assembled in the reactor vessel. Installation of the replacement elbow assembly involves sliding gland ring 264 over vertical piping section 64 until the bottom end of the vertical piping section abuts tapered seal ring 256 resting on frustoconical shoulder 254 midway through socket 113. If neck 286 at the bottom of elbow assembly 106 is not centered on hole or opening 288 in shroud 18, the height of socket 248 can be adjusted by removing screw 276 (if already assembled) and turning the socket within the threaded portion 246 at the top end of the elbow assembly until a proper height is achieved, after which flanges 268, 278 and 282 are aligned to permit insertion of screw 276 through the holes in the flanges. Neck 286 at the bottom of elbow assembly 106 is then inserted into opening 288 in shroud 18 until it abuts the cut end of sleeve 90 with O-ring 290 disposed therebetween. Once the replacement elbow assembly has been installed, a hole is formed in T-box 92 and screw 224 is inserted through clamping plate 220 and the hole in the T-box so that it can be threaded into receptacle 226 in elbow portion 110 of the lower elbow assembly to secure the neck of the elbow assembly against the thermal sleeve by compressing O-ring 290 to create an essentially leak-free seal without welding. As mentioned above, this arrangement can hold the T-box together as well in the event of cracking. Boss 226 on gland ring 264 can be used as a guide to form a hole in vertical piping section 64 so that a threaded pin 296 can be inserted through the boss and tightened to position a plug 298 in the hole to take up axial loads. Screw 276 can then be tightened to draw the vertical piping section downwardly within socket 113 to form a seal with tapered O-ring 256.

The foregoing lower elbow replacements are configured to permit replacement of the vertical piping section concurrently with or at any time following replacement of the lower elbow. In FIGS. 25–27, for example, a replacement vertical piping section 300 is shown installed with a replacement lower elbow assembly 106. The replacement lower elbow assembly 106 is similar to the elbow assembly shown in FIG. 13, however, socket portion 113 of the elbow assembly shown in FIGS. 25–27 defines a cylindrical recess 114 which extends downwardly from the upper end of the elbow to a frustoconical shoulder 118 of decreasing diameter in the downward direction. A boss 120 is mounted on one side of socket 113 and is similar to the bosses described above. Replacement vertical piping section 300 includes a main length of piping 302 having an outer diameter about the same as the existing vertical piping section, however, a lower end of the replacement vertical piping section is configured to define a swivel joint 304 having a generally spherical or rounded outer surface of increasing diameter from the bottom 306 of the piping to a center of the joint and of decreasing diameter from the center of the joint to an annular groove 308 vertically spaced from the bottom of the piping. Swivel joint 304 fits telescopically within socket 113 at the upper end of elbow assembly 106 and provides a sealing surface over a range of angular orientations of the replacement vertical piping section relative to the vertical axis of the elbow assembly thereby simplifying installation. An upper end of replacement vertical piping section 300 defines a socket 310 similar to the socket at the upper end of elbow assembly 106 for receiving the bottom of an existing length of core spray supply piping or a replacement piping component 312 extending downwardly from a replacement upper elbow 314 as shown. For purposes of illustration, the replacement component 312 extending downwardly from upper elbow 314 includes a swivel joint 316 similar to joint 304 at the lower end of vertical pipe section 300. Swivel joint 316 extending downwardly from upper elbow is received within socket 310 defined at the upper end of replacement vertical piping section 300 and functions in the same manner to provide a sealing surface over a range of angular orientations of the mating piping components during installation. A boss 318 similar to the other bosses described herein is disposed on an accessible side of socket 310 at the upper end of replacement vertical piping section 300 for use as a guide to form a hole in component 312 for receiving a plug 320 carried by a pin 322 threadedly received within the boss.

Figure 1:
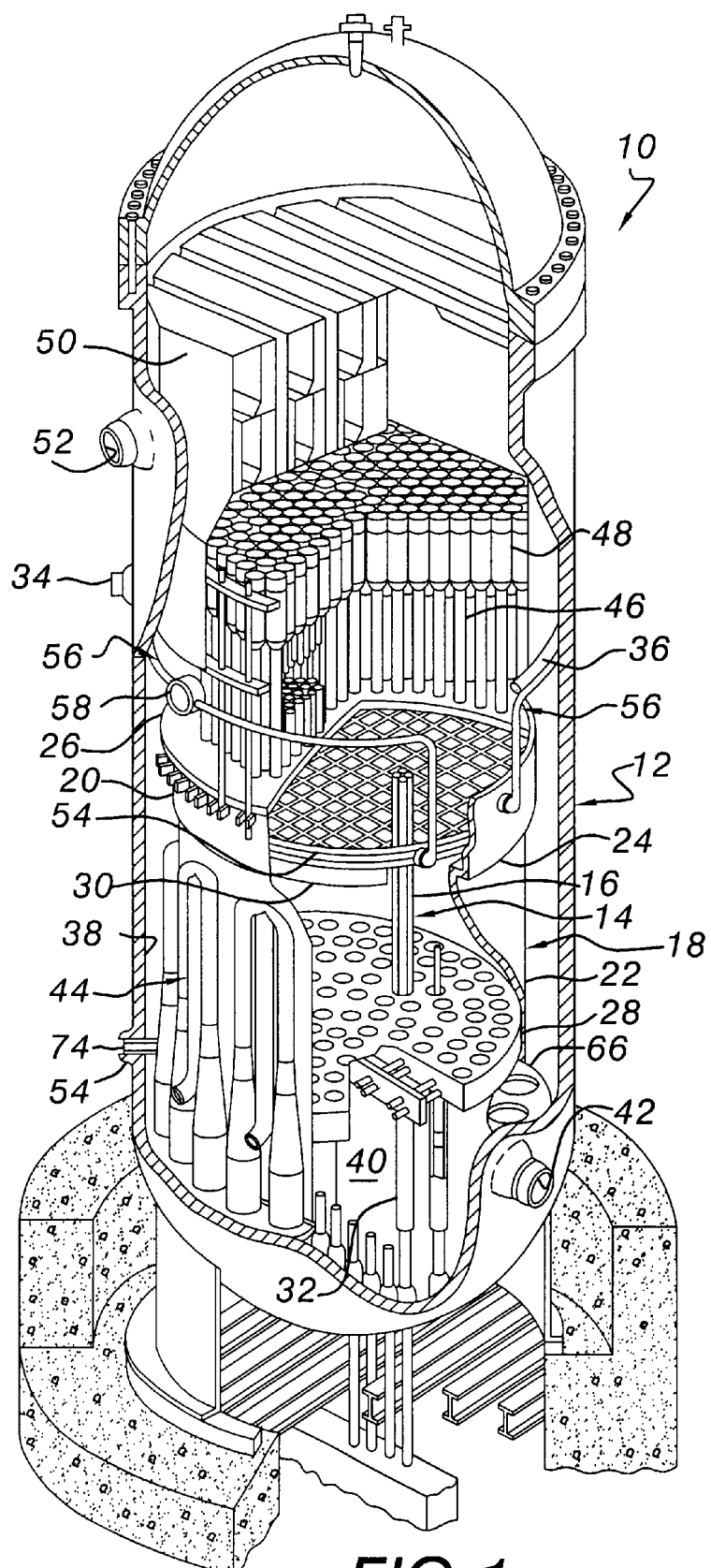
FIG. 1 is a cut away view in perspective of a boiling water reactor exemplifying a type of reactor suitable for repair by the method and apparatus of the present invention.
Figure 2:
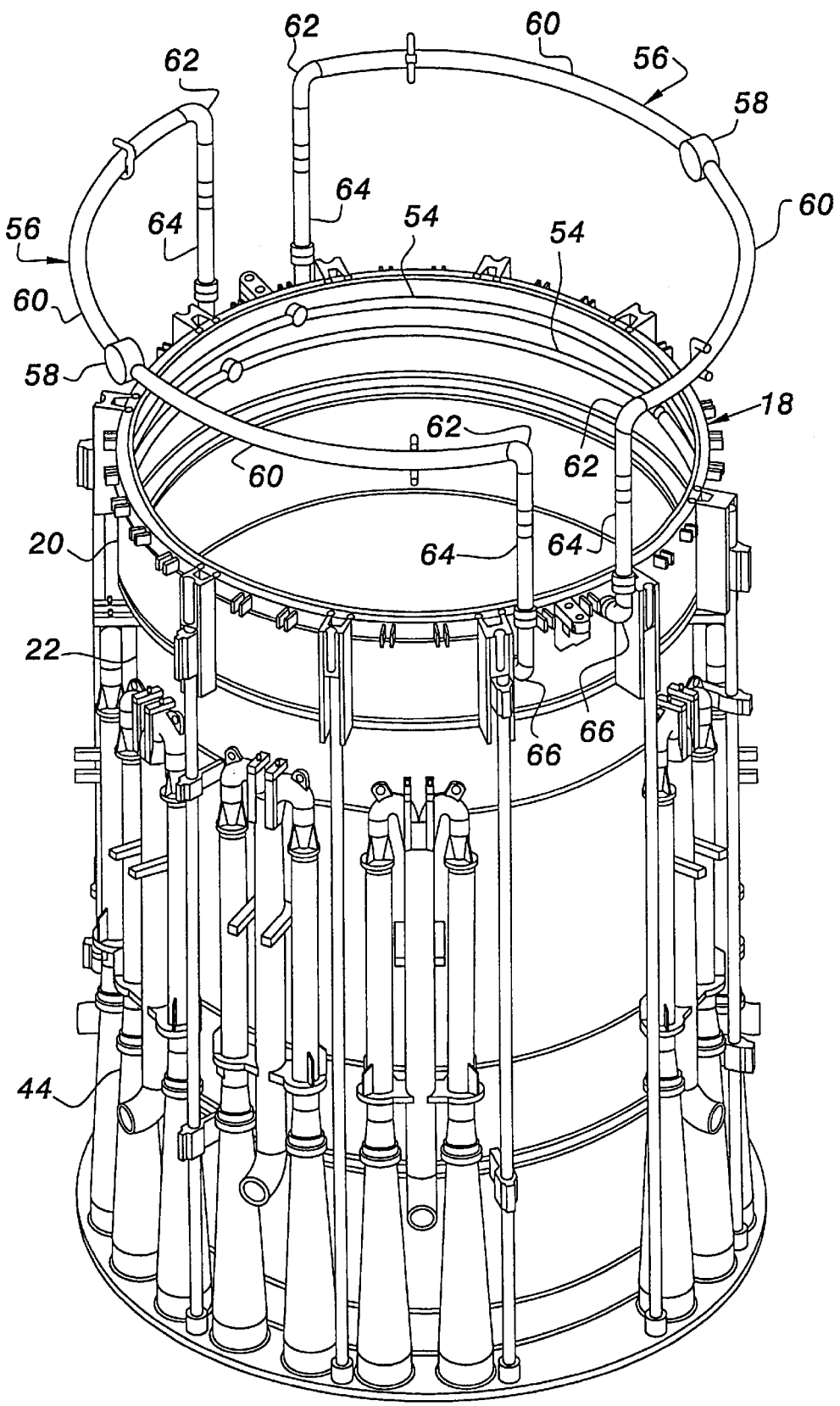
FIG. 2 is a perspective view of core spray supply piping and a cylindrical core shroud typical of a boiling water reactor.

As mentioned above, replacement vertical piping section 300 can be installed with replacement lower elbow assembly 106 as part of a complete replacement of the core spray supply piping or the replacement vertical piping section can be installed after the replacement lower elbow assembly has been installed as part of a partial replacement of the core spray supply piping. Referring to FIG. 2, installation of vertical piping section 300 involves removing all or most of the existing vertical piping section 64 with the existing lower elbow 66 by cutting the lower elbow adjacent shroud 18 and the vertical piping section adjacent the existing upper elbow 62. Referring again to FIG. 25, replacement vertical piping section 300 is lowered into reactor vessel 12 in a vertical orientation, positioned under the replacement piping component or remnant 312 extending downwardly from upper elbow 314 or 62, respectively, and lifted upwardly to receive the piping component within socket 310. Lower elbow assembly 106 is then installed essentially as described above in connection with FIG. 19; however, the vertical piping section 300 can be angled appropriately using swivel joints 304 and 316 to achieve a custom fit accounting for variations in elevational and other types of tolerances. Once positioned properly, bosses 120 and 318 on lower elbow assembly 106 and vertical piping section 300, respectively, can be used as guides to form holes in the respective swivel joints to receive pins 126 and 322, respectively.

Figure 28:
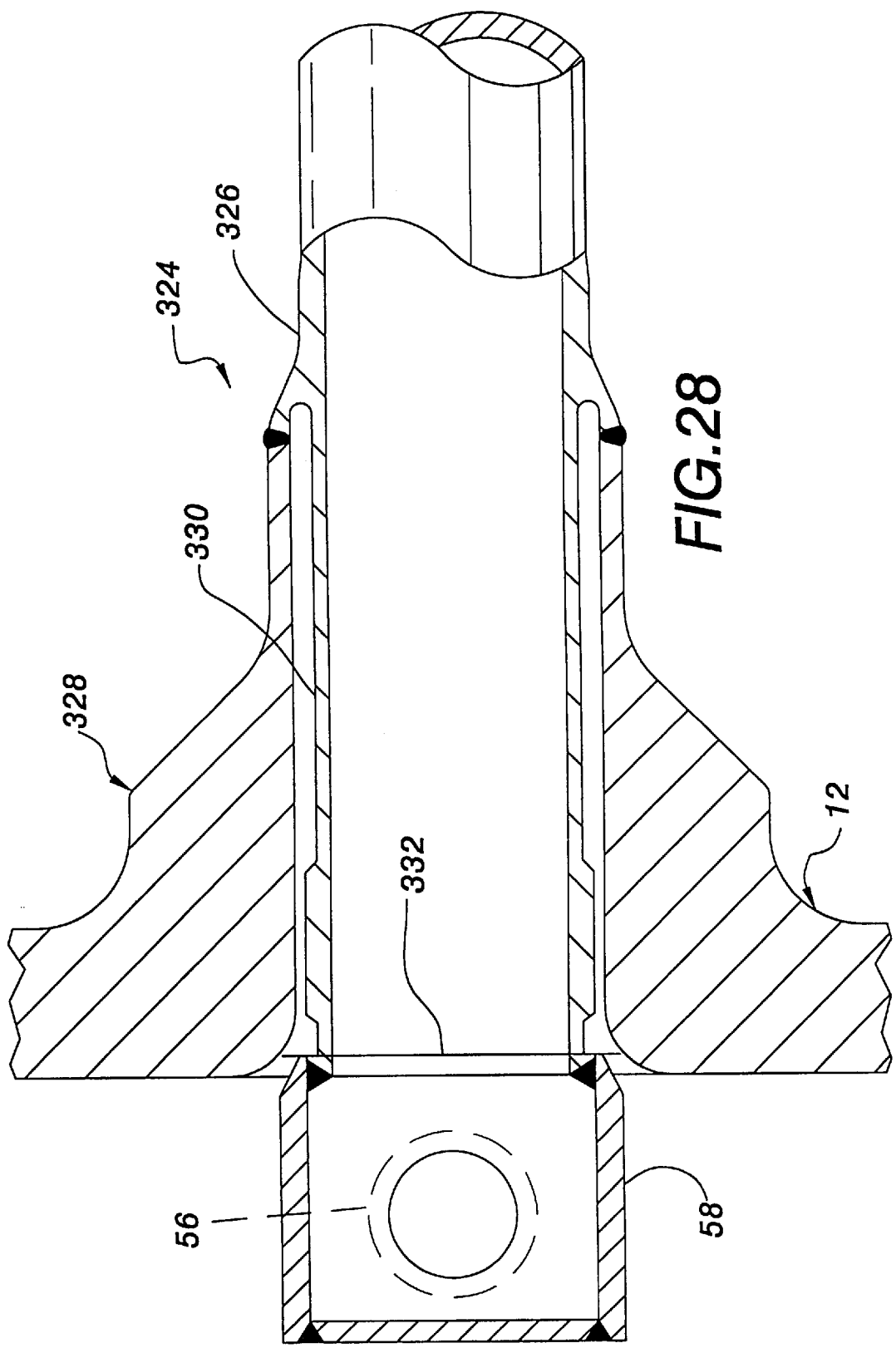
FIG. 28 is an enlarged fragmentary view, partly in section, of an existing safe end assembly connecting the core spray supply piping with the core spray nozzle outside the reactor vessel.
Figure 29:
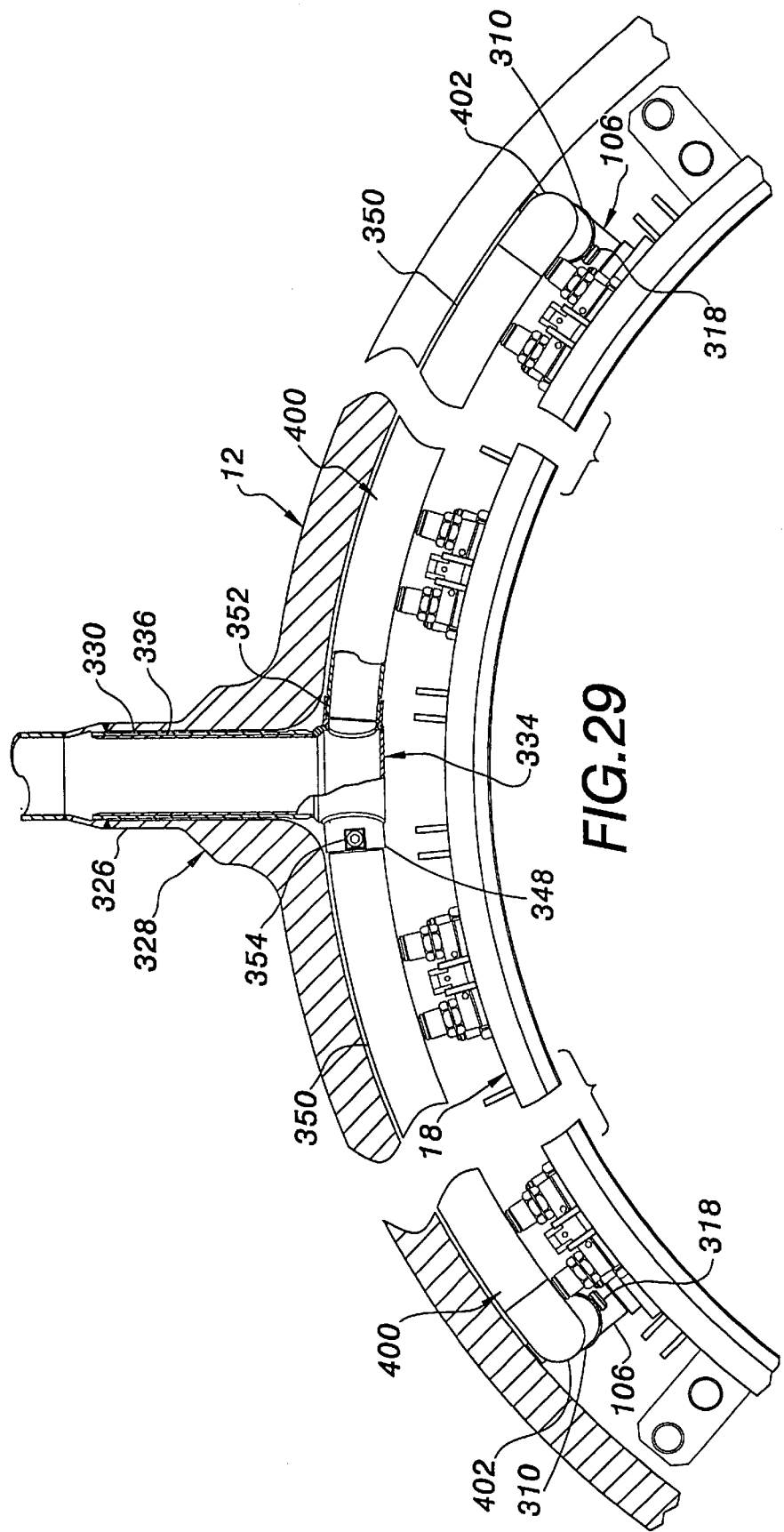
FIG. 29 is a fragmentary top view, partly in section, of a reactor vessel illustrating a replacement T-box assembly and core spray supply piping installed in accordance with the present invention.
Figure 30:
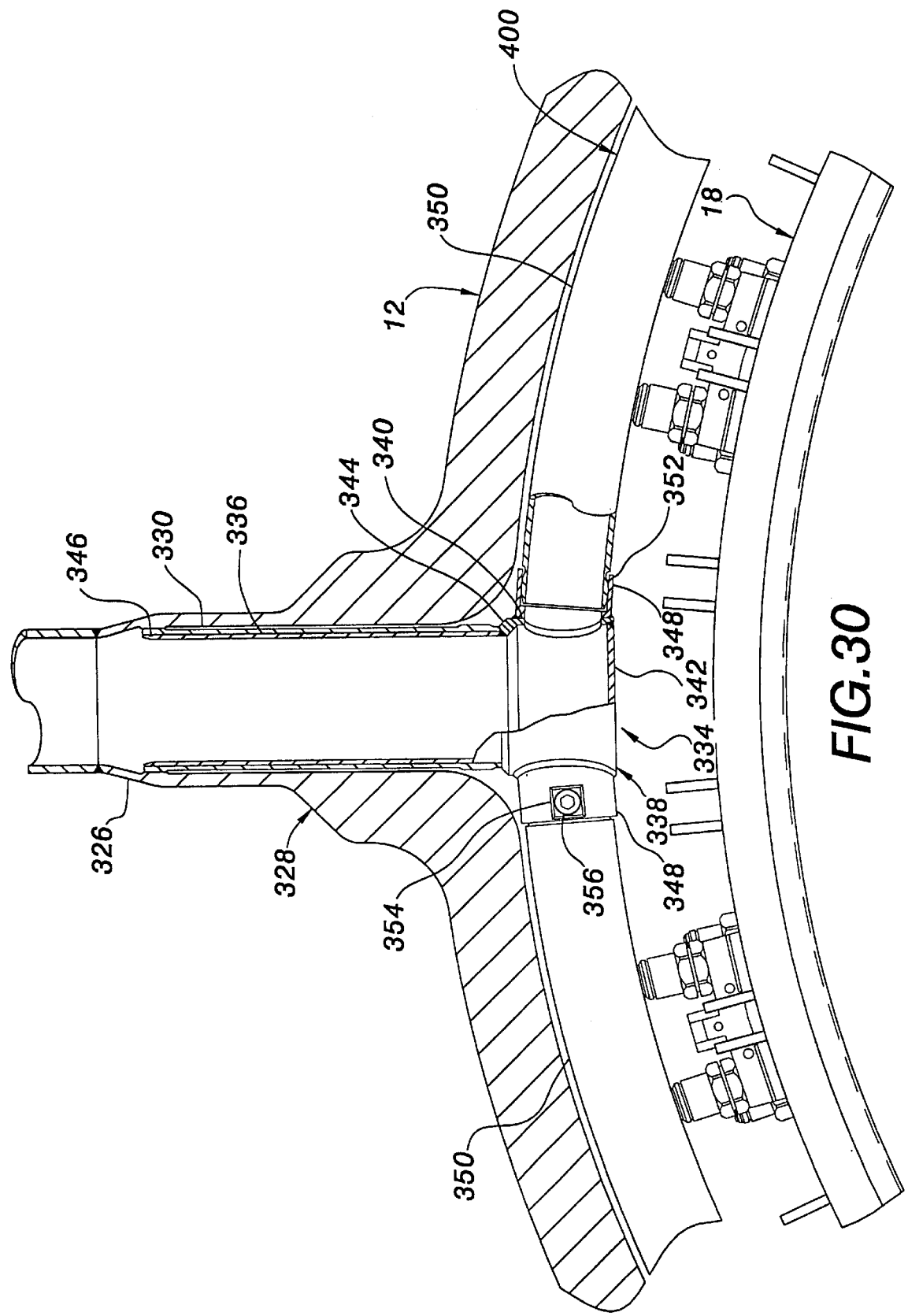
FIG. 30 is an enlarged fragmentary view of the reactor vessel shown in FIG. 29 illustrating details of the replacement T-box assembly and core spray supply piping according to the present invention.
Figure 31:
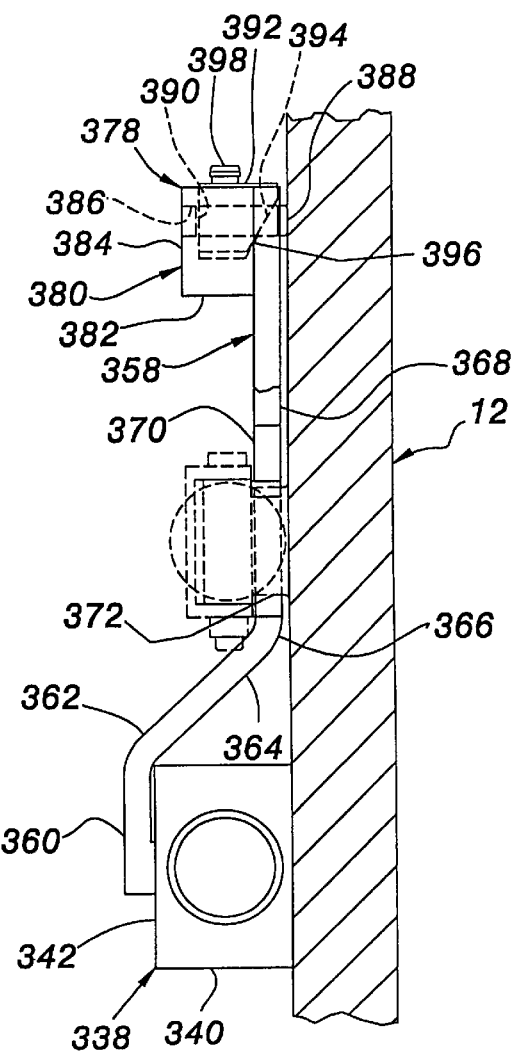
FIG. 31 is a side view, partly in section, of the replacement T-box assembly shown in FIGS. 29 and 30 held in place with a backing bar according to the present invention.
Figure 32:
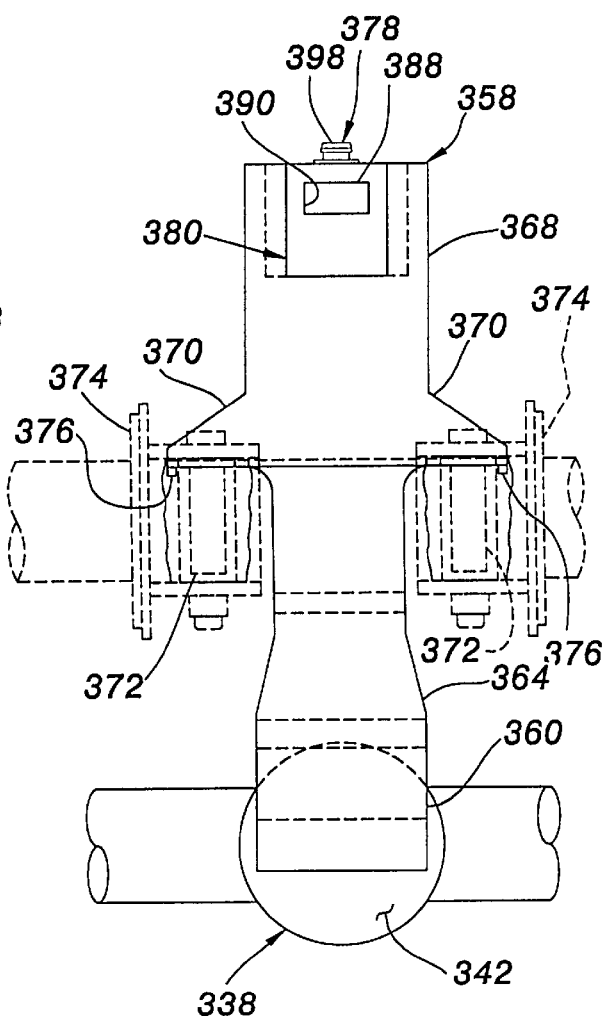
FIG. 32 is an outboard view of the backing bar engaging the replacement T-box assembly in accordance with the present invention.

A complete replacement of the core spray supply piping in accordance with the present invention preferably includes replacement of the lower elbow, the core spray supply piping above the lower elbow, and all or part of the safe end assembly connecting the core spray supply piping with the core spray nozzle on the exterior of the reactor vessel. As mentioned above, and illustrated in greater detail in FIG. 28, safe end assembly 324 typically includes a hollow, cylindrical safe end 326 welded to the core spray nozzle 328 externally of the reactor vessel 12 and a thermal sleeve 330 which extends inwardly, toward the interior of the reactor vessel, from the safe end to a flow divider or T-box 58 disposed in the reactor vessel above shroud 18. A first method of replacing the existing safe end assembly 324 according to the present invention includes cutting thermal sleeve 330 from the inside reactor vessel so that it is substantially flush with an interior surface of reactor vessel 12, for example as shown by the broken line at 332 in FIG. 28, removing the existing core spray supply piping, and installing a replacement T-box assembly 334 with a thermal sleeve insert 336 as shown in FIGS. 29–32. As best seen in FIGS. 30–32, replacement T-box assembly 334 includes a T-box 338 having a hollow, cylindrical housing 340 oriented to extend in the outboard direction, relative to a central vertical axis of the reactor vessel, from a circular end cap 342 to a frustoconical shoulder 344 of decreasing diameter in the outboard direction. Frustoconical shoulder 344 connects T-box 338 with an elongate cylindrical sleeve or insert 336 of smaller diameter than the T-box, the cylindrical sleeve extending coaxially from the T-box to fit telescopically within thermal sleeve 330. An annular groove is formed near the terminal end of cylindrical sleeve 336 adjacent safe end 326 to hold a piston ring 346 in sealing relation with thermal sleeve 330. T-box assembly 334 further includes a pair of hollow, cylindrical arm sockets 348 extending outwardly from diametrically opposed sides of the cylindrical T-box housing 340 at a slight inboard angle toward the center of the reactor vessel to receive horizontal arms 350 of the replacement core spray supply piping which extend circumferentially about the interior of reactor vessel 12. Horizontal arms 350 of the replacement core spray supply piping are each configured to define a swivel joint 352 similar to those described above and having a generally spherical or rounded outer surface of increasing diameter from a terminal end of the piping to a center of the joint and of decreasing diameter from the center of the joint to an annular groove axially spaced from the terminal end of the piping. Each swivel joint 352 fits telescopically within a socket 350 on one side of T-box 338 and provides a sealing surface over a range of angular orientations of the horizontal arms relative to the T-box thereby simplifying installation. Bosses 354 on the top of sockets 348 are similar to the bosses described above and can be used as guides to form holes in the portions of the horizontal piping sections disposed within the sockets to receive pins 356 which secure the replacement piping sections to the replacement T-box.

Installation of replacement T-box assembly 334 shown in FIGS. 29–32 is preferably performed prior to installing horizontal arms 350 and includes lowering the T-box assembly into reactor vessel 12 above shroud 18 and orienting the T-box assembly so that cylindrical sleeve 336 faces in the outboard direction, away from the shroud, and in the direction of existing thermal sleeve 330. Cylindrical sleeve 336 is then inserted into thermal sleeve 330 and moved axially therein until the cut end of the thermal sleeve abuts frustoconical shoulder 344 at the outboard end of T-box housing 340. As cylindrical sleeve 336 slides into thermal sleeve 330, piston ring 346 at the end of the cylindrical sleeve is placed in compression between the sleeves to create an essentially leak-free joint therebetween. To overcome fluid forces which would tend to expel the T-box assembly from the thermal sleeve, a backing bar 358 can be installed inside the reactor vessel, as illustrated in FIGS. 31 and 32, to exert a radially compressive force or preload on T-box assembly 334 in the direction of thermal sleeve 330. Backing bar 358 is similar to the backing bar shown and described in application Ser. No. 08/758,056, filed on Nov. 27, 1996, and includes a lower portion 360 abutting the circular end cap 342 of T-box 338 and extending upwardly from the circular end cap to a first bend 362 connecting the lower portion with an angled portion 364. Angled portion 364 extends upwardly from the first bend at an angle toward the inner surface of reactor vessel 12 to a second bend 366 connecting the angled portion with an upper portion 368 oriented substantially parallel to the inner surface of the reactor vessel. A pair of transverse members or arms 370 extend outwardly from upper portion 368 of the bar near the second bend to pivot on studs or lugs 372 extending radially inward from the reactor vessel to support the feedwater sparger mounting brackets 374, respectively. Arms 370 terminate in a pair of downwardly extending fingers 376 disposed on opposite sides of the studs to locate the backing bar between the feedwater sparger mounting brackets. A pivoting mechanism 378 for pivoting the upper end of backing bar 358 away from reactor vessel 12 includes an L-shaped bracket 380 having a first leg 382 extending perpendicularly in the inboard direction from a position near the top of bar 358 and a second leg 384 extending perpendicularly upward from the end of the first plate to form a generally U-shaped cradle at the top of the bar. An elongate channel or passage 386 of generally rectangular configuration is formed horizontally through the second leg of bracket 380 and the upper end of backing bar 358. An elongate bar 388 extends horizontally through channel 386 and includes a slotted opening 390 formed vertically therethrough within the U-shaped cradle for receiving a wedge-shaped block 392 therein, the slotted opening having an angled edge 394 on the side closest the reactor vessel wall. Wedge-shaped block 392 is slidingly received within slotted opening 390 and includes an angled cam surface 396 oriented to slide against the angled edge of the slotted opening. A tightening bolt 398 extends vertically through the wedge-shaped block to be threadedly received within an opening formed through the first leg of L-shaped bracket 380 extending inwardly from backing bar 358.

Backing bar 358 is preferably installed after T-box assembly 334 with tightening bolt 398 in a loosely threaded condition or state. The backing bar is preferably lowered into reactor vessel 12 using long-handled tools and is manipulated to position the lower portion of the bar between feedwater sparger mounting brackets 374 such that arms 370 of the bar rest on studs 372. Tightening bolt 398 is then tightened to cause wedge 392 to move vertically downward within opening 390 such that an angled or beveled edge 396 of the wedge forces sliding bar 388 to move outwardly into contact with the inner surface of the reactor vessel thereby rotating the portion of the backing bar above the studs 372 away from the reactor vessel about the pivot established at the studs. Pivotal movement of the upper end of backing bar 358 away from reactor vessel 12 causes the lower end of the bar to pivot outwardly, towards the reactor vessel, and into contact with T-box 338 to exert an axially compressive force or preload on the T-box resisting flow forces which might otherwise unseat or expel the replacement T-box assembly from the existing thermal sleeve. While the preloading mechanism described above is advantageous in that it can be operated using only vertical operations, it will be appreciated that a threaded opening can be formed horizontally through the upper end of backing bar and a threaded screw or bolt inserted through the threaded opening using right-angled tools to pivot the upper end of the backing bar away from the reactor vessel.

Horizontal piping sections 400 are lowered into the reactor vessel and positioned in the space between the vertical piping sections and the T-box assembly. As best seen in FIGS. 29 and 30, horizontal piping sections 400 each include a horizontal arm 350 extending circumferentially about 80° around the inner surface of the reactor vessel from one of the T-box sockets 348 to an upper elbow 402. Upper elbow 402 bends downwardly about 90° from the horizontal arm 350 to a swivel joint 316 as described above. Swivel joint 316 is inserted into socket 310 at the upper end of replacement vertical piping section 300, as shown in FIG. 27, and the horizontal piping manipulated such that swivel joint 352 at the opposite end of the piping can be inserted into socket 348 on one side of T-box 338. Swivel joints 316 and 352 are then secured by forming holes in the replacement piping using bosses 318 and 354, respectively, as guides for the hole-forming tools and then inserting pins 322 and 356, respectively, through the bosses such that plugs at the respective ends of the pins fit into the holes. As mentioned above, the use swivel joints simplifies installation by maintaining a seal through a wide range of axial and angular deviations thereby accommodating fit-up tolerances.

Figure 33:
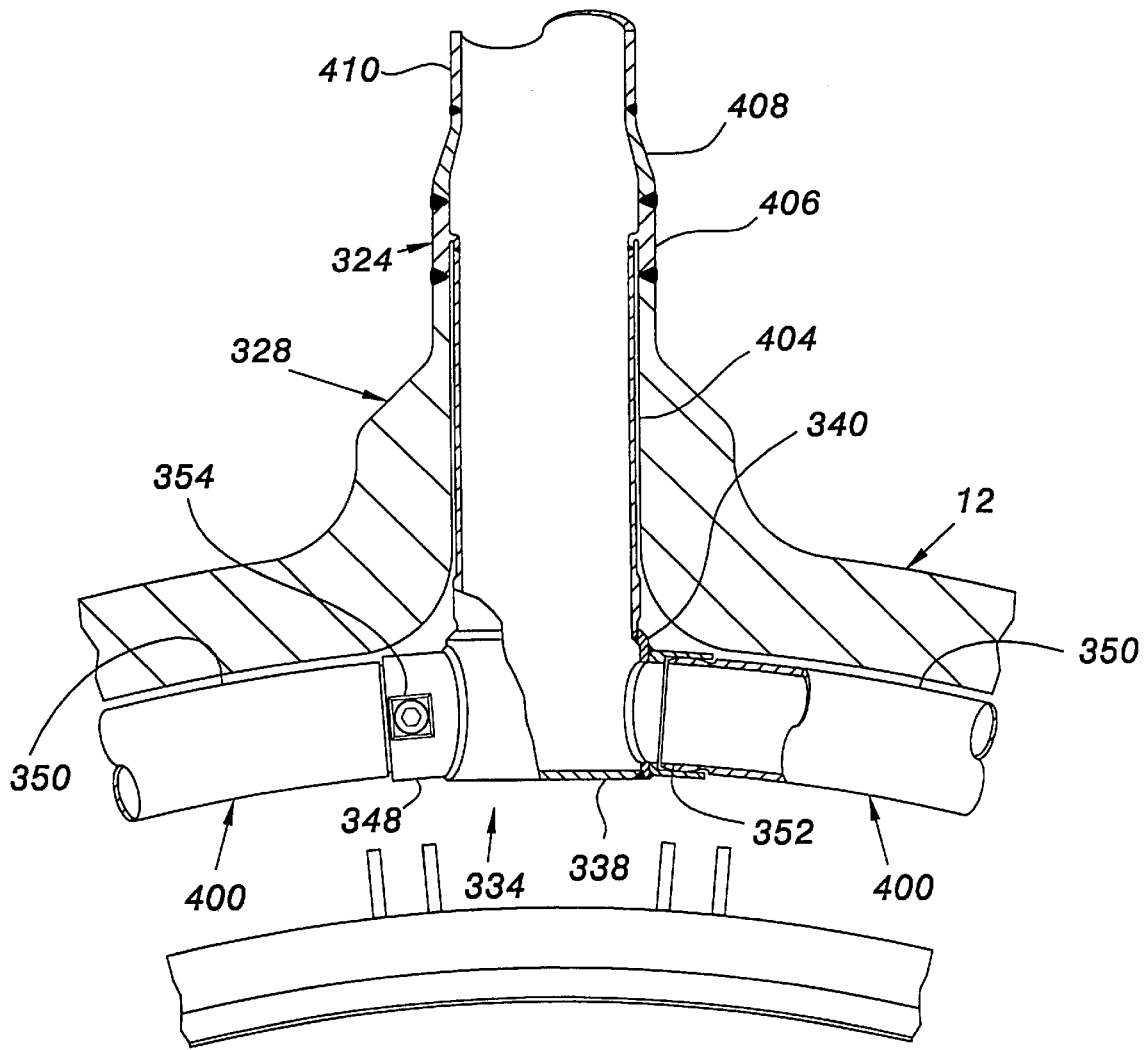
FIG. 33 is a fragmentary top view, partly in section, of a reactor vessel illustrating a modification of a replacement T-box assembly and core spray supply piping installed in accordance with the present invention.

The foregoing replacement utilizes most of the existing safe end assembly and requires only one cut to be made in the safe end assembly as part of the installation. Another method of replacing a safe end assembly as part of a core spray supply piping replacement according to the present invention, illustrated in FIG. 33, utilizes a replacement T-box assembly 334 similar to that described above in connection with FIGS. 29–32 but welded to a replacement thermal sleeve 404 which extends coaxially through core spray nozzle 328 in radially spaced relation to connect with a replacement safe end 406 outside reactor vessel 12. The method includes cutting the existing safe end from the core spray nozzle outside the reactor vessel, removing the existing safe end and thermal sleeve, and welding replacement safe end 406 to nozzle 328. The new thermal sleeve 404 can be welded to safe end 406 or T-box assembly 334 prior to being lowered into reactor vessel 12. If welded to safe end 406, the inboard end of thermal sleeve 404 can be inserted into the open end of T-box 338 and welded to cylindrical housing 340 from within reactor vessel 12 prior to closing the T-box with end plate 342. If provided as part of T-box assembly 334, the outboard end of thermal sleeve 404 can be inserted through nozzle 328 and welded to safe end 406 from outside reactor vessel 12. In either case, a short length of piping is preferably removed with the existing safe end assembly to provide clearance for tooling and the replacement safe end. After the replacement safe end 406 has been installed, a replacement length of piping 408 can be welded in place between the safe end and the severed end of the core spray supply piping 410 outside the reactor vessel to complete the flow path.

FIGS. 34–41 illustrate another method of replacing a safe end assembly as part of a core spray supply piping replacement according to the present invention wherein the existing safe end assembly 324 includes a thermal sleeve 330 defining an inner surface having a first frustoconical portion 412 of increasing diameter in the inboard direction, an intermediate portion 414 of cylindrical configuration extending from the first frustoconical portion in the inboard direction, and a second frustoconical portion 416 of decreasing diameter in the inboard direction extending from the intermediate portion to a terminal portion 418 of cylindrical configuration connecting the second frustoconical portion with T-box 58. A cylindrical insert or sleeve 420 includes a radial flange 422 which abuts the junction between the thermal sleeve and the safe end and extends in the inboard direction therefrom to contact a conical sealing ring 424 seated against the second frustoconical portion 416 of thermal sleeve 330. A second sealing ring 426 is seated against the outboard end of the insert and is held in compression with a threaded retaining ring 428 engaging internal threads formed on an inner surface of safe end 326.

In accordance with the present invention, safe end insert 420 is cut at the safe end junction as shown by broken lines at 430 in FIG. 34, and thermal sleeve 330 is cut slightly inboard of the safe end weld 432 as shown by broken lines at 434 in the same figure. Safe end insert 420 and thermal sleeve 330 are removed from inside reactor vessel 12 and replaced with a new thermal sleeve assembly 404 carried by a replacement T-box assembly 334. As best seen in FIGS. 35 and 36, the new thermal sleeve assembly 404 includes an inner cylindrical member or sleeve 436 disposed telescopically within an intermediate cylindrical member or sleeve 438 which is, in turn, disposed telescopically within an outer cylindrical member or sleeve 440. Intermediate sleeve 438 has an inboard end welded to T-box 338 and four circumferentially spaced longitudinal slots 442 at an outboard end defining a pair of resilient fingers 444 in diametrically opposed relation. Fingers 444 each carry a wedge-shaped protrusion or detent 446 having a trailing edge 448 extending radially outward from the finger to a tapered leading edge 450 of decreasing radial dimension in the outboard direction. Referring to FIG. 37, it can be seen that the wedge-shaped protrusions 446 are curved or rounded in transverse cross-section. Referring again to FIGS. 35 and 36, outer sleeve 440 includes an inboard portion 452 disposed telescopically around intermediate sleeve 438 in axially movable relation thereto and a thin walled (e.g., about 0.125 inch thick) cylindrical seal member 454 extending from the inboard portion in radially spaced relation to the outboard portion of the intermediate sleeve. A flange or ear 456 extends radially outward from the inboard portion 452 of outer sleeve 440 to define an inboard-facing recess 458 in alignment with a bore 460 formed through T-box 338. A piston ring 462 is carried in a groove formed about the inner circumference of outer sleeve 440 adjacent the inboard end of intermediate sleeve 438 to create an essentially leak-free seal between the intermediate and outer sleeves. Inner sleeve 436 is shorter than intermediate sleeve 438 (e.g., about one-half the length of the intermediate sleeve) and is axially movable within the intermediate sleeve between a retracted position disposed at least partly within T-box 338 and an extended position adjacent the fingers 444 at the outboard end of the intermediate sleeve. A slot 464 extends longitudinally from the inboard end of inner sleeve 436 to a threaded receptacle 466 carried on an inner surface of the inner sleeve in parallel relation to the slot, the slot providing clearance for structure within the T-box (such as the first mounting lug described below) when the inner sleeve is in the retracted position.

T-box 338 is similar to those described above but is modified to couple with thermal sleeve assembly 404 and with horizontal core spray supply arms 350 having threaded ends 468. Specifically, a first mounting lug 470 extends longitudinally along an interior of the cylindrical T-box housing 340 to define a bolt head recess 472 in communication with a smooth-sided bore 474, and a second mounting lug 476 extends longitudinally along an exterior of the cylindrical housing to define a bolt head recess 478 in communication with threaded bore 460. The bore defined by first lug 470 is aligned with threaded receptacle 466 carried on the inner surface of inner sleeve 436 such that an elongate bolt 480 can be inserted through T-box 338 and threaded into receptacle 466. The bore defined by second lug 476 is aligned with the recess 458 formed in flange 458 extending outwardly from outer sleeve 440 such that a bolt 482 can be inserted through the lug and tightened to bear against the flange.

Figure 38:
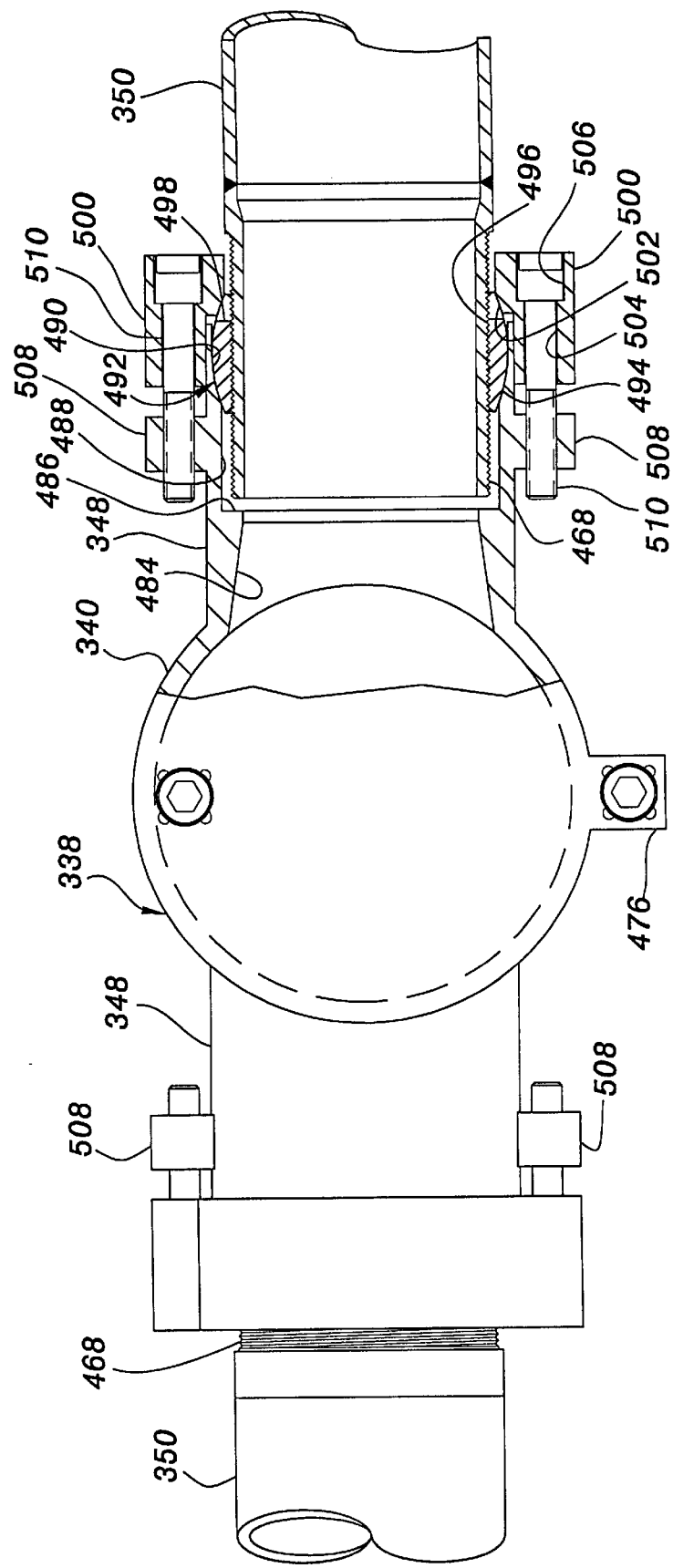
FIG. 38 is an outboard view of the replacement T-box assembly and horizontal core spray supply arms of FIG. 35 taken along line 38—38.
Figure 39:
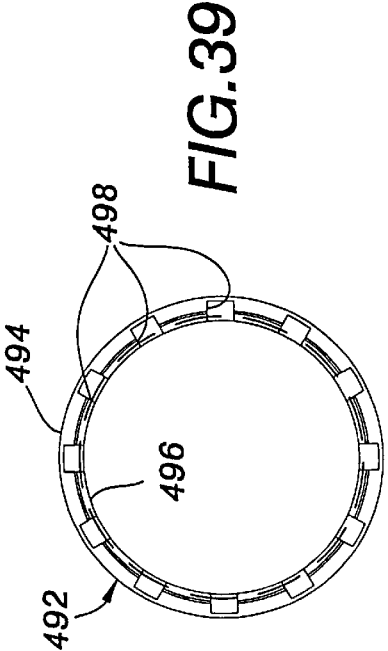
FIG. 39 is an axial end view of the ferrule shown in FIG. 38.

T-box sockets 348, shown in detail in FIG. 38, are coupling members that extend circumferentially outward in opposite directions from T-box 338 like the sockets described above in connection with FIG. 30 but are modified to couple with threaded ends 468 of the horizontal core spray supply arms 350. Each socket 348 defines a generally cylindrical channel 484 extending outwardly from an opening in the T-box housing 340 to a radial step or shoulder 486 connecting the channel with a cylindrical recess 488 of greater diameter than the channel. Cylindrical recess 488 extends circumferentially outward from shoulder 486 to a truncated spherical recess 490 extending circumferentially around the inner surface of socket 348, the spherical recess having a diameter greater than the cylindrical recess to receive a coupling member in the form of a ferrule 492 with a truncated spherical outer surface 494 and a threaded bore or aperture 496 configured to mate cooperatively with a threaded end 468 of one of the horizontal core spray supply arms 350. A truncated face of ferrule 492 protrudes outwardly from socket 348 and is provided with circumferentially spaced notches 498 which allow the ferrule to be turned using conventional tools such as, for example, a spanner wrench. A gland, ring or clamp 500 of annular configuration includes an opening or aperture and a truncated spherical recess 502 along an inner peripheral edge of the opening which fits against the protruding portion of ferrule 492 to define a housing or cage preventing the ferrule from moving axially relative to the socket. Gland 500 further includes a pair of relatively narrow, curved slots 504 which extend circumferentially through the gland in a clockwise direction, looking at FIG. 40, from relatively large throughholes 506 on opposite sides of the annular opening. A pair of threaded receptacles 508 protrude outwardly from opposite sides of the socket to receive a pair of fasteners in the form of bolts 510 which extend through slots 504 in the gland to fix the position of the piping components relative to one another.

Once the existing T-box 58 and portions of the existing insert 420 and thermal sleeve 330 have been removed, a pair of diametrically opposed notches 512 of generally wedge-shaped configuration are formed along the inner surface of the existing safe end assembly 324 adjacent the junction between the safe end and the thermal sleeve remnant, for example using EDM tooling inserted into the core spray nozzle from inside the reactor vessel. The replacement T-box assembly 334 is preferably lowered into the reactor vessel with inner sleeve 436 in the retracted position shown by broken lines in FIGS. 34 and 35 so that, when the sleeve assembly 404 is inserted through core spray nozzle 378, fingers 444 at the outboard end of the intermediate sleeve 438 are permitted to bend radially inward toward the central longitudinal axis of the sleeve assembly as detents 446 slide along the first frustoconical portion 412 of the thermal sleeve remnant. When detents 446 are longitudinally aligned with notches 512 in safe end assembly 324, fingers 444 spring radially outward in a resilient manner such that the detents are received within the cooperatively configured notches to prevent axial movement of the T-box assembly in the inboard direction. Lead screw 480 is turned to cause inner sleeve 436 to advance axially in the outboard direction until it is located between fingers 444 at the outboard end of intermediate sleeve 438, as shown by solid lines in FIGS. 34 and 35, thereby preventing inward flexing of the fingers which might cause detents 446 to slip out of notches 512. A seal is formed between the sleeve assembly and the thermal sleeve remnant by tightening bolt 482 such that the tip of the bolt pushes against flange 456 on outer sleeve 440, thereby causing the cylindrical seal member 454 to move axially along intermediate member 438 in the outboard direction until it contacts first frustoconical portion 412 of the inner surface of the thermal sleeve remnant. The radial gap between seal member 454 and intermediate sleeve 438 allows the seal member to deform slightly to accommodate variations in cylindrical tolerance of the thermal sleeve remnant so that a seal can be maintained about the inner circumference of the thermal sleeve.

Figure 40:
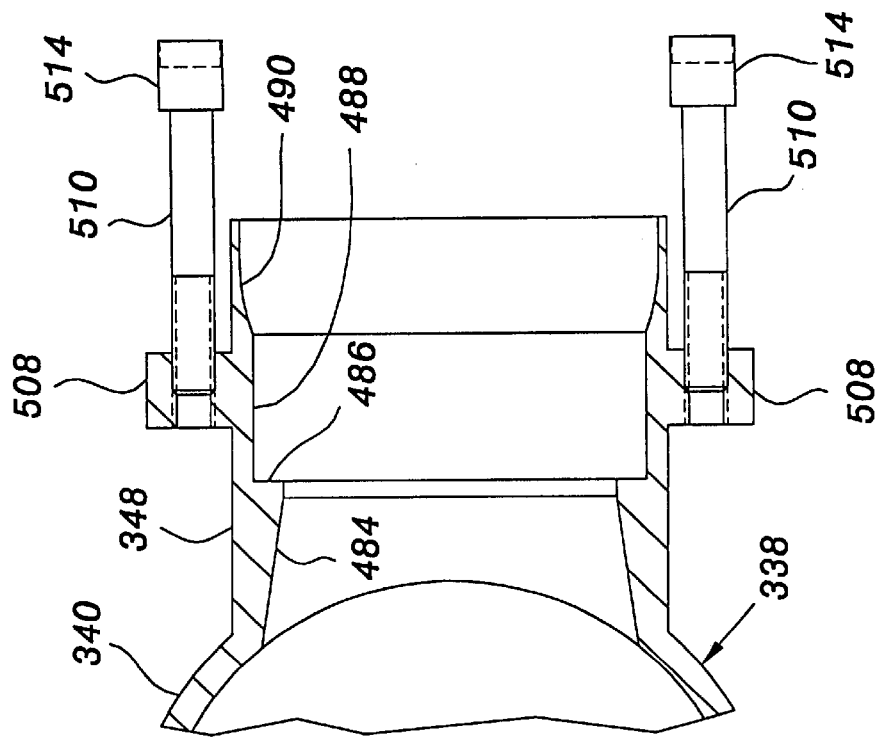
FIG. 40 is an enlarged side view, partly in section, of a socket on one side of the replacement T-box assembly shown in FIG. 35.
Figure 41:
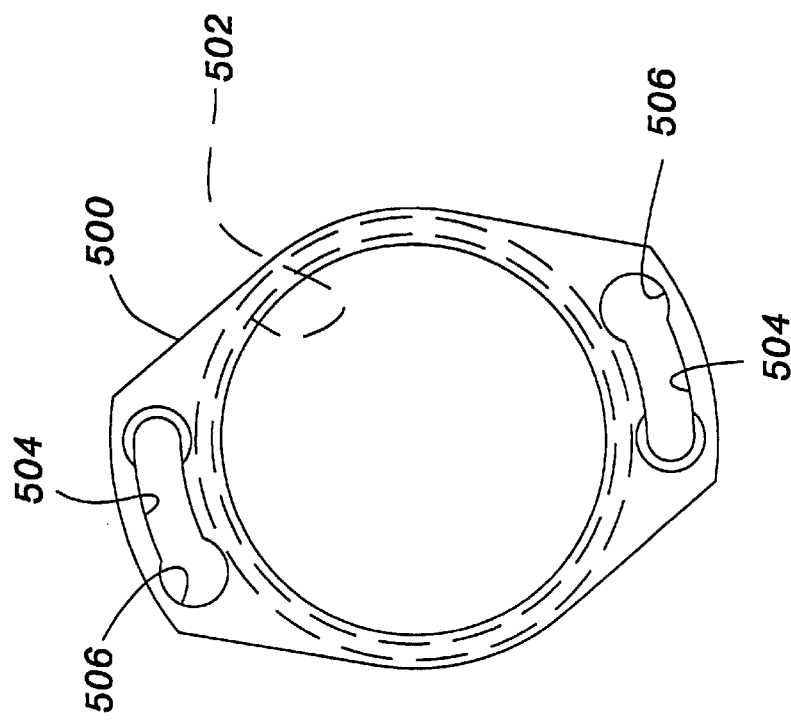
FIG. 41 is a plan view of a gland for use in clamping the ferrule within the socket extending out of the replacement T-box assembly shown in FIG. 35.

Horizontal core spray supply arms 350 are secured to modified T-box assembly 334 by loosely threading bolts 510 into flanges 508 on opposite sides of T-box sockets 348 so that bolt heads 514 protrude outwardly as shown in FIG. 40, placing a gland ring 500 around the externally threaded end 468 of each arm 350, threading a ferrule 492 onto the threaded end of each arm below the gland ring, inserting the threaded end of each arm into a corresponding socket 348 until the ferrule is seated within the truncated spherical recess 490 as shown in FIG. 38, and securing the gland ring. If for some reason the length of the horizontal piping 350 is such that ferrule 492 cannot initially be seated within spherical recess 490, it is possible to adjust the position of the ferrule by using the circumferentially spaced notches 498 to turn the ferrule, for example with a spanner wrench, thereby causing the ferrule to move axially along the piping until it can be properly seated. Once ferrule 492 is seated, gland ring 500 is installed by positioning clearance holes 506 over bolt heads 514, sliding the gland ring along the bolts until the bolt heads pass through the clearance holes, twisting the gland ring to receive shanks of the bolts within the narrow slots 504 formed therein, and tightening the bolts to cause the truncated spherical recess 502 of the gland ring to retain the protruding portion of the ferrule. Since bolt heads 514 are too large to fit through slots 504, gland ring 500 is securely held in place against the ferrule.

Figure 42:
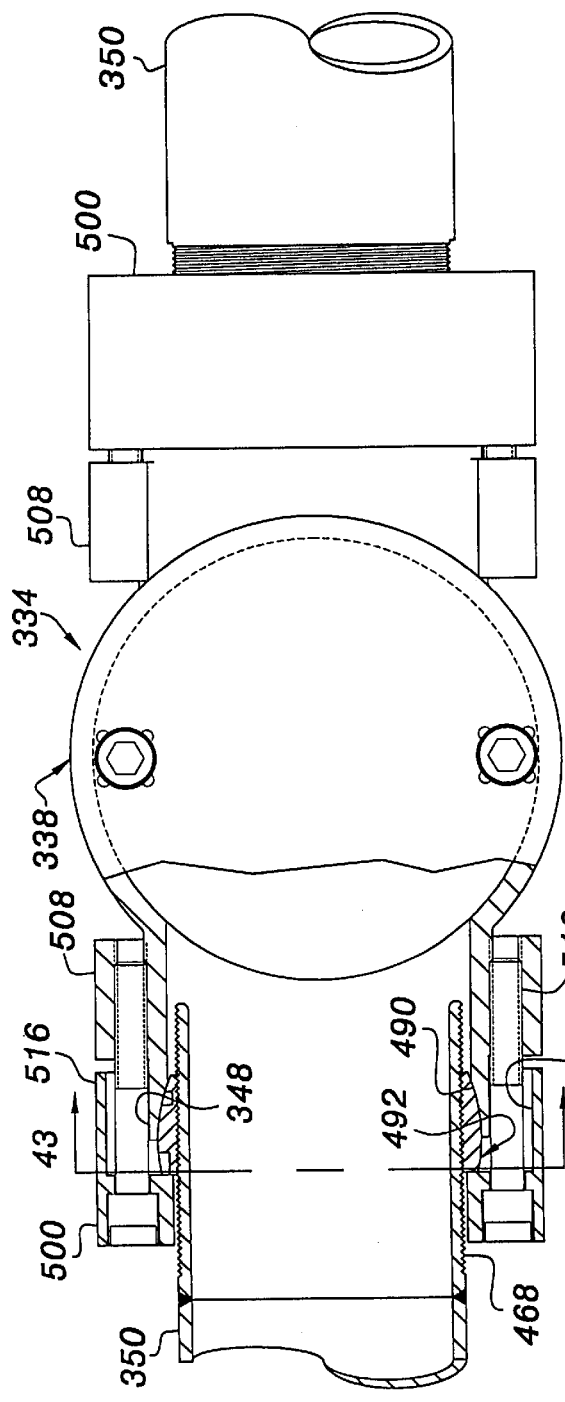
FIG. 42 is a fragmentary outboard view, partly in section, of another T-box assembly for use in the replacement method according to the present invention.
Figure 44:
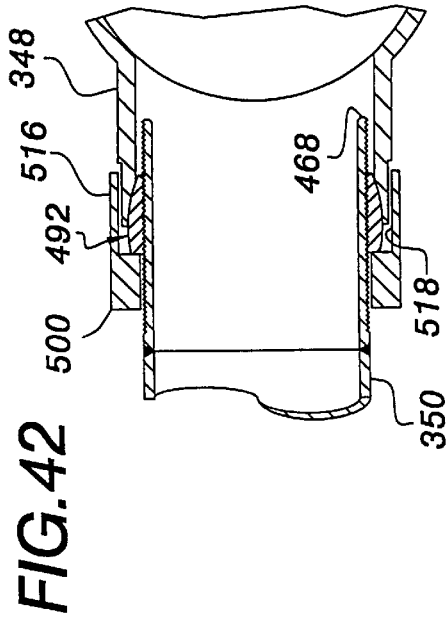
FIG. 44 is a fragmentary sectional view of the coupling between the T-box and a horizontal core spray supply arm taken through line 44—44 in FIG. 43.
Figure 43:
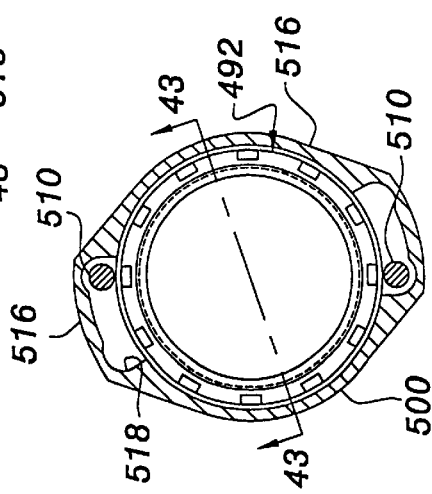
FIG. 43 is a sectional view taken through line 43—43 in FIG. 42.

As mentioned above, during a loss of coolant accident, relatively cold (e.g., about 50° F.) core spray water flows through the core spray supply piping at relatively high pressure (e.g., about 250 psig). Since the reactor water around the core spray supply piping is relatively hot (e.g., about 370° F. at about 150 psig), thermal gradients can occur which may cause the bolted couplings to loosen and leak. In FIGS. 42–44, a replacement T-box assembly 334 is shown coupled with replacement horizontal core spray supply arms 350 in a manner which compensates for thermal transients by channeling cold water leaking from the piping along the bolts to limit or prevent differential thermal expansion thereof. The modified coupling is similar to the coupling shown in FIG. 38 and includes a spherical nut or ferrule 492 mounted on a threaded end 468 of a horizontal core spray supply arm 350 and received within a recess 490 formed by one of the T-box sockets 348. The coupling further includes receptacles 508 formed or mounted about the exterior of the socket, and bolts 510 extending through a gland ring 500 into the receptacles to hold the ferrule in the socket recess. Unlike the coupling shown in FIG. 38, however, the gland ring 500 in FIGS. 42–44 includes a hollow cylindrical portion or skirt 516 which extends circumferentially around the open end of T-box socket 348 in radially spaced relation to define an annular space or cavity 518 through which bolts 510 extend. Skirt 516 is open at one end so that cold water leaking from the core spray supply piping will flow outwardly from the piping via the cavity 518 due to the difference in pressure between the water inside the core spray supply piping and the reactor water outside the core spray supply piping. The skirt functions as a thermal barrier which is heated by the reactor water but does not transmit the heat to the bolts due to the gap established therebetween. Meanwhile, cold water leaking from the core spray supply piping flows through cavity 518 along the length of bolts 510, preventing significant expansion of the bolts relative to the other components of the coupling so that leakage from the coupling is minimized. The coupling is thus self-compensated in that greater leakage causes increased cooling of the bolts which in turn increases the tightness of the bolts thereby reducing leakage. Following a thermal transient, the coupling stabilizes at an equilibrium value where leakage is minimized or tolerable.

The temperature compensating coupling described above can be used to connect piping components anywhere along the core spray supply piping system. For example, in FIGS. 45 and 46, a modification of a replacement lower elbow assembly 106 is shown having an upper end coupled with vertical core spray supply piping 64 in a manner similar to that described above and shown in FIGS. 42–44. More specifically, the upper end of replacement elbow assembly 106 defines a coupling member in the form of a socket 520 for receiving the lower end 522 of the vertical piping component 64, which is threaded in order to carry a coupling member in the form of a nut or ferrule 524. Threaded receptacles 526 are formed at spaced locations about the outer circumference of the replacement elbow socket to receive the threaded ends of bolts 528 extending through a gland ring 530 carried on the vertical piping component. Like gland ring 500 in FIG. 42, gland ring 530 in FIG. 45 includes a hollow cylindrical portion or skirt 532 which extends downwardly, looking at FIG. 45, in spaced relation to the socket 520 at the upper end of the replacement elbow assembly to define a cavity 534 through which cold core spray supply water can flow to cool bolts 528. Unlike the coupling described above, however, the socket 520 defined at the upper end of the replacement elbow assembly of FIG. 45 defines a tapered inner surface or recess 536 of generally frustoconical configuration which is of decreasing inner diameter in the downward direction looking at FIG. 45. Ferrule 524 has a generally frustoconical outer surface configured to seat against the tapered socket recess 536 when appropriately positioned along the axial length of vertical piping component 64. The conical connection between the ferrule and socket allows the length of the vertical piping component to be adjusted during installation of the replacement elbow assembly while also ensuring a rigid connection during normal operating conditions of the reactor. An optional sealing ring 537 is shown mounted about the outer circumference of ferrule 524 to seal against the tapered inner surface of socket 520.

Figure 45:
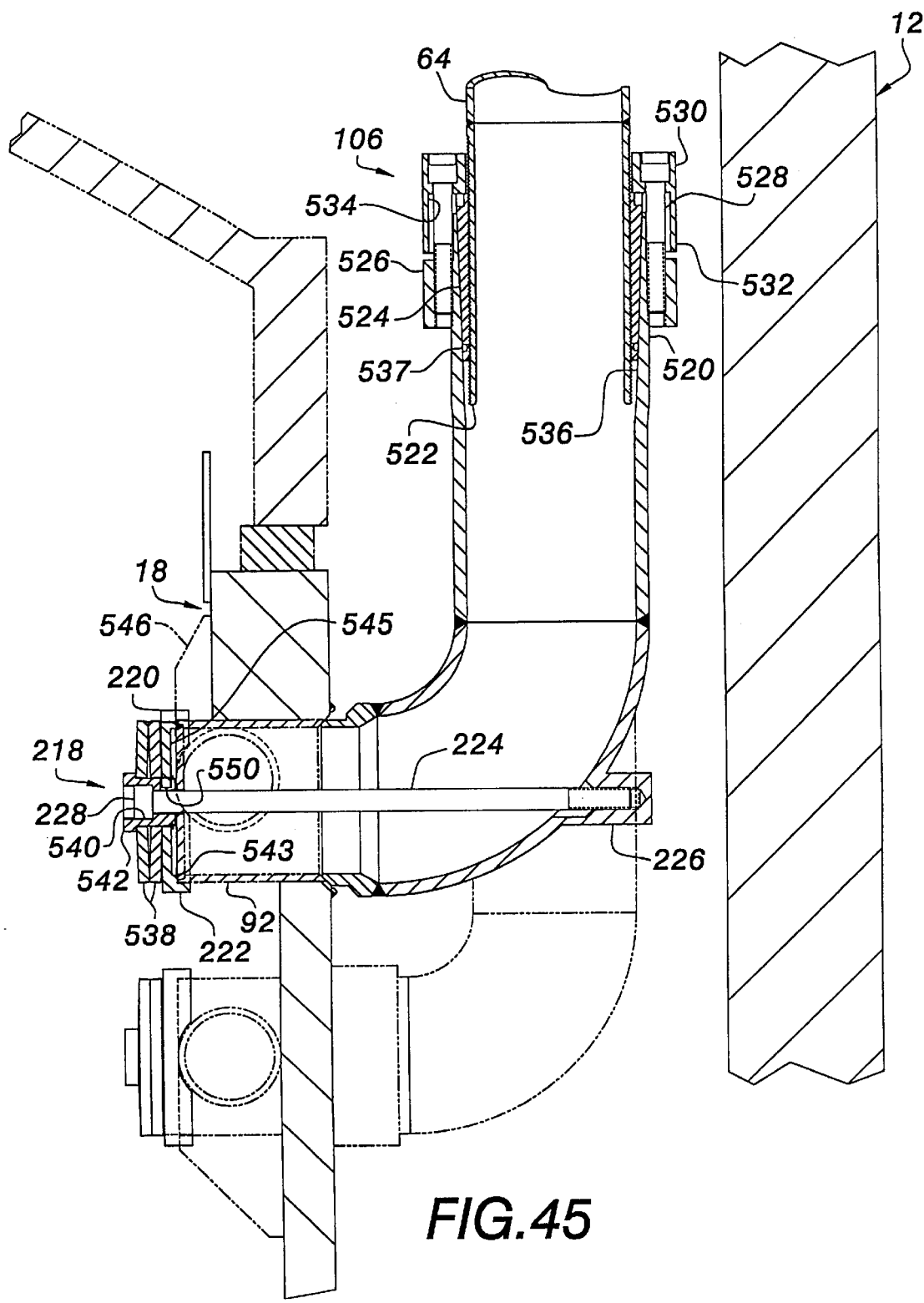
FIG. 45 is a fragmentary side view, partly in section, of yet another modification of a replacement lower elbow assembly installed in accordance with the present invention.

The clamping mechanism 218 used to secure the replacement elbow assembly of FIG. 45 to the core spray sparger inside the shroud is similar to the clamping mechanism shown in FIG. 19 but with elastic members 538 disposed between the bolt 224 and the shroud 18 for added elastic compliance. In the embodiment shown in FIGS. 45 and 46, a clamping plate 220 with a cylindrical lip or rim 222 fits over the core spray T-box 92 within shroud 18, and the head 228 of bolt 224 is received within a cylindrical recess 540 formed in a retaining member or spool piece 542 protruding in an inboard direction from the clamping plate. Clamping plate 220 is similar to the plate shown in FIG. 19 but is circular and includes an annular shoulder 543 which defines a generally cylindrical recess 545 on an outboard face such that the plate seats against peripheral edges of the T-box end cap without contacting the central portion thereof. As best seen in FIGS. 46–48, the cylindrical rim 222 of clamping plate 220 includes a slot 544 to receive a gusset 546 connected between the shroud and the T-box such that the clamping plate is prevented from rotating, and spool piece 542 includes an axial slot or keyway 548 to receive a finger or key 550 extending radially inward from an opening in the clamping plate such that the spool piece can move axially relative to the clamping plate but not rotate. A retaining ring 552 extends radially outward from the outboard end of spool piece 542 between clamping plate 22 and T-box 92 to prevent the spool piece from becoming dislodged from the clamping plate during installation. A flange 554 extends radially outward from the inboard end of spool piece 542, and elastic members 538, shown in FIG. 45 as a pair of Belleville washers arranged back-to-back, extend around the spool piece between the flange and an inboard face of clamping plate 220 to bias the spool piece in an inboard direction relative to the T-box. Referring still to FIG. 45, it can be seen that bolt 224 extends from spool piece 542 through holes in the clamping plate and T-box and is received within a threaded receptacle 226 formed in the replacement elbow. Spool piece 542 is also shown with optional axial slots 555 formed about recess 540 at circumferentially spaced locations to permit the head of bolt 224 to be crimped in a conventional manner. It will be appreciated that any of the bolt head recesses described herein may optionally be provided with such slots to allow the bolts to be locked by crimping.

The upper end of replacement elbow assembly 106 is installed in a manner similar to that described above in connection with FIG. 38. The lower end of the replacement elbow assembly is installed in a manner similar to that described in connection with FIG. 19, however, it will be appreciated that rotational forces applied to bolt 224 when installing the lower elbow will not cause spool piece 542 or clamping plate 220 to rotate by virtue of the slotted connections between the spool piece, the clamping plate and the gusset 546 between the existing T-box and the shroud. Once installed, the elastic members 538 will ensure that the connections remain tight during thermal transients even with substantial differential thermal expansion by maintaining a suitable preload and providing elastic compliance.

Figure 49:
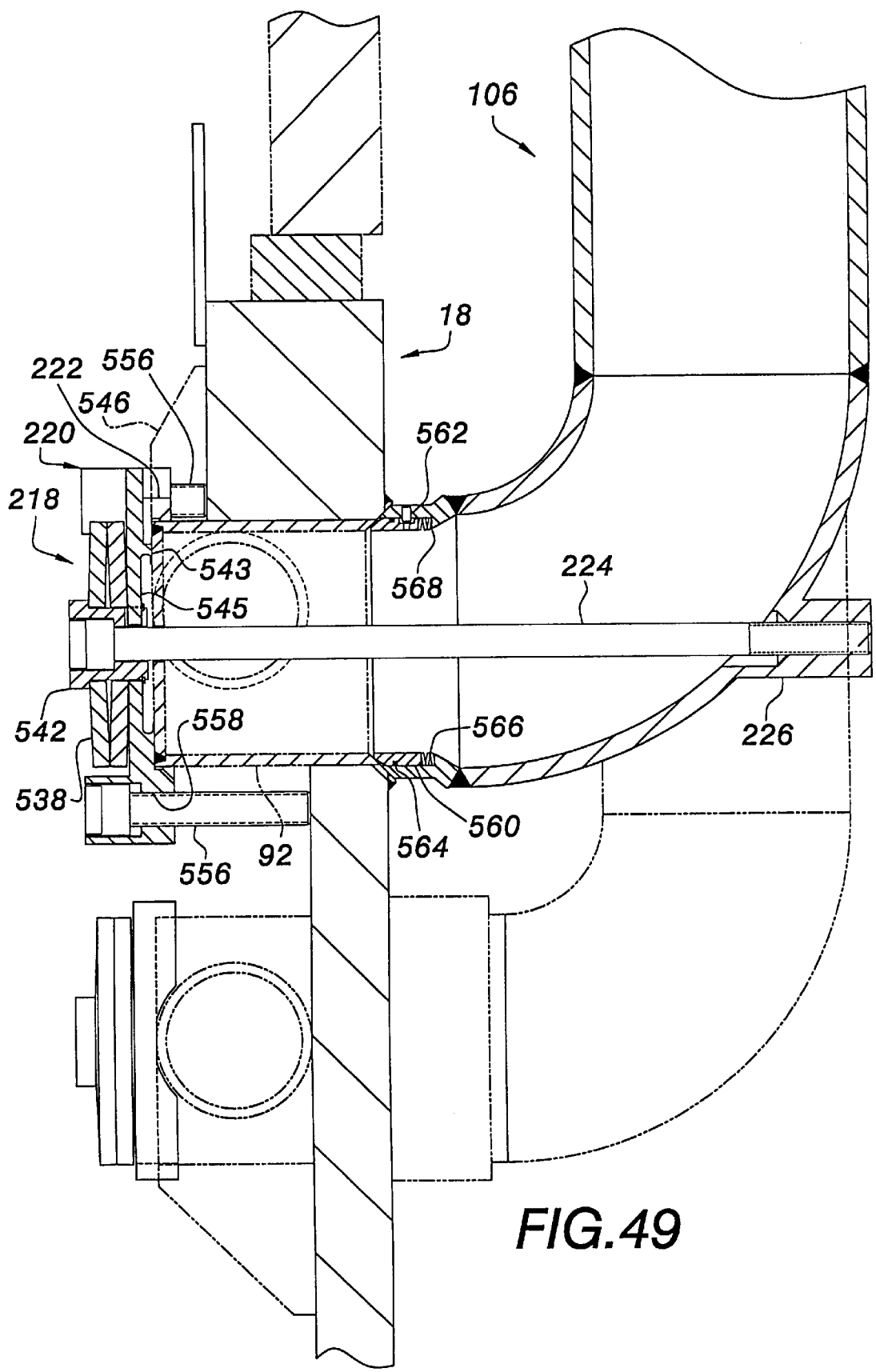
FIG. 49 is a fragmentary side view, partly in section, of a further modification of a replacement lower elbow assembly installed in accordance with the present invention.
Figure 50:
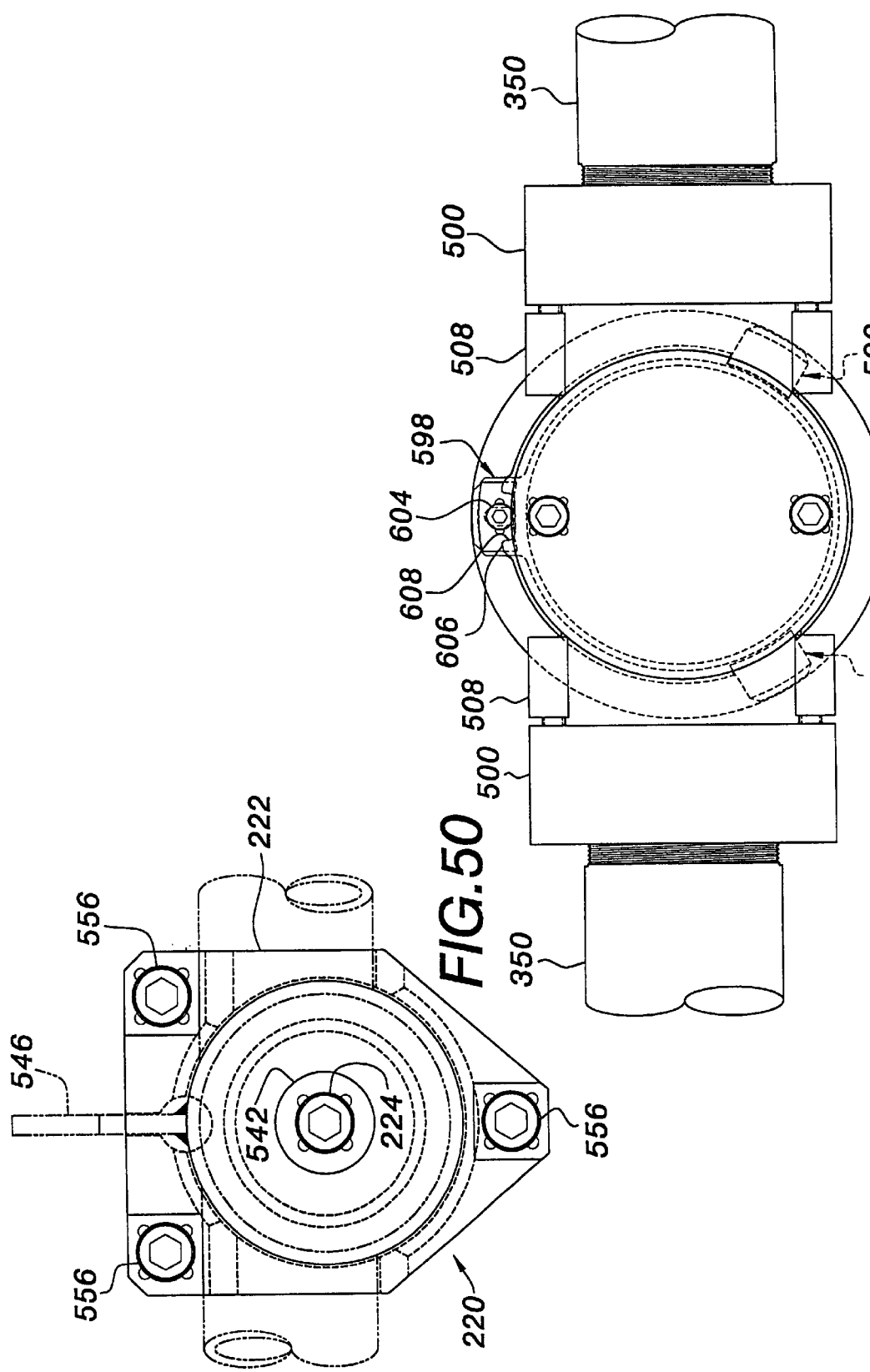
FIG. 50 is an outboard view of the replacement lower elbow assembly of FIG. 49.

A further modification of a replacement lower elbow assembly, illustrated at 106 in FIG. 49, includes a lower end clamping mechanism 218 similar to that shown in FIG. 45 but with set screws 556 extending from the clamping plate 220 to the shroud 18 to prevent damage to the existing T-box 92 which may be caused by overtightening the bolt 224. Clamping plate 220 includes an annular shoulder 543 which engages a peripheral portion of the T-box endcap and defines a generally cylindrical recess or cavity 545 between a central portion of the endcap and the clamping plate, and a rim 222 which extends telescopically around the T-box. Clamping plate 220 extends laterally outward from rim 222 and includes a plurality of threaded openings 558 formed therethrough to receive set screws 556. As best seen in FIG. 50, rim 222 is generally pentagonal in configuration with a pair of the set screw openings being formed above the T-box on opposite sides of gusset 546 and another set screw opening being formed below the T-box near the apex of the pentagon. Set screws 556 extend through threaded openings 558 formed in the clamping plate and contact shroud 18, the length of the screws protruding from the clamping plate being adjustable simply by tightening or loosening the screws within the openings. When the clamping bolt 224 is tightened, compressive forces are applied to the clamping plate via the elastic members 538 but are not transmitted to the T-box due to the set screws 556. Instead, the forces ordinarily carried by the existing T-box are redirected to the shroud. Thus, if the existing T-box is cracked or otherwise structurally compromised, installation of the replacement lower elbow will not further damage the existing T-box or require further repair.

Installation of the replacement lower elbows illustrated in FIGS. 45 and 49 involve removal of the existing lower elbow and formation of a 45° counter sink at the elbow shroud interface. It will be appreciated, however, that countersinks at other angles as well as counterbores or any of the other methods described herein can be used to prepare the shroud for receiving a replacement lower elbow. In FIG. 45, the lower end of the replacement elbow is formed with a chamfer to seat against the countersink formed at the shroud interface. In FIG. 49, a cylindrical member 560 is disposed telescopically in the lower end of the replacement elbow and held in place by a pin 562 extending through the elbow into an axial groove formed in the tubular member. A piston ring 564 is carried in an annular groove on an outer surface of the tubular member to seal against an inner surface of the elbow, and elastic members 566, shown as Belleville washers, are held in compression between the cylindrical member and an internal shoulder 568 in the elbow to bias a chamfered end of the cylindrical member into sealing contact with the thermal sleeve remnant extending through the shroud.

Figure 51:
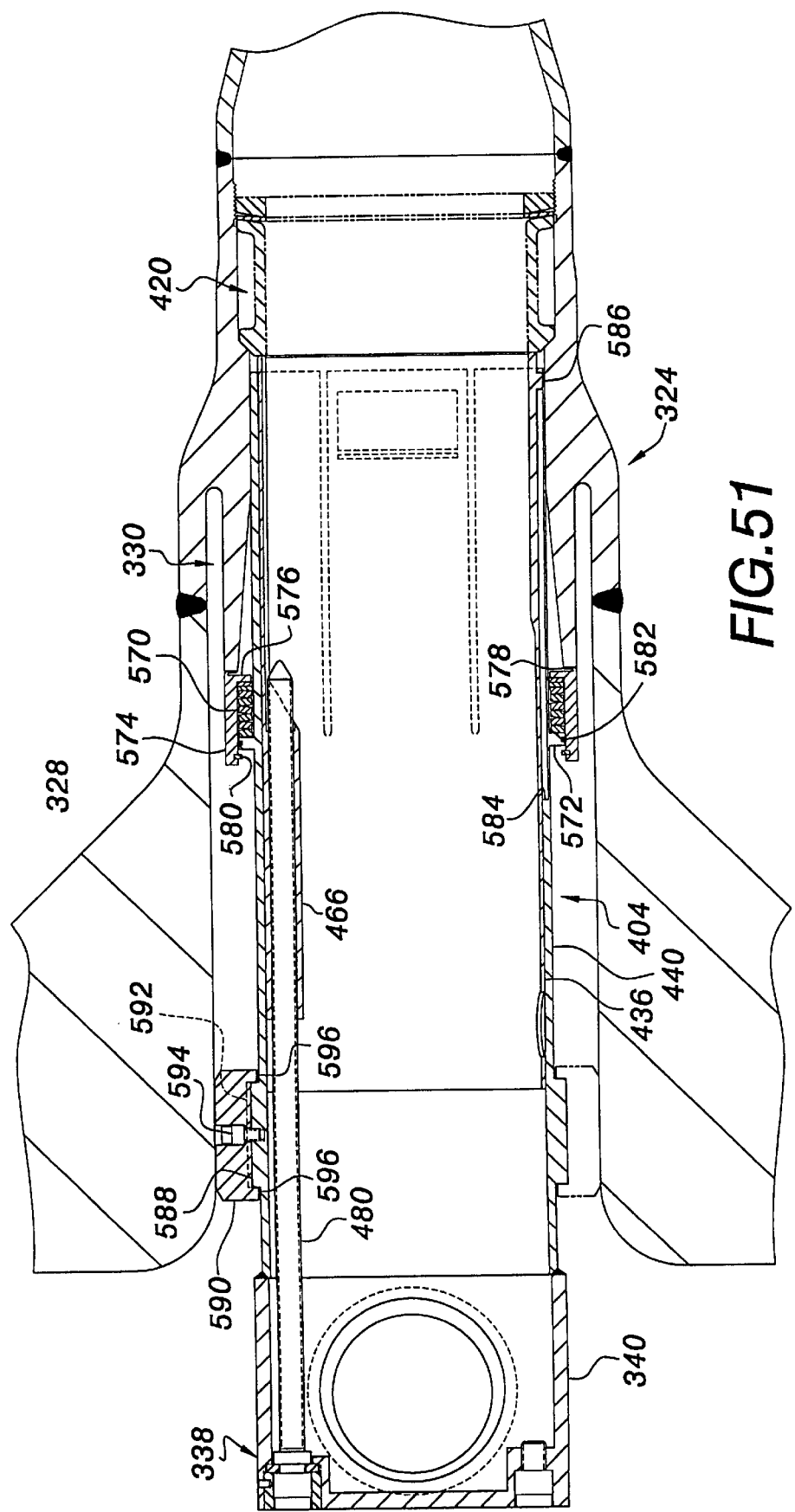
FIG. 51 is a fragmentary side view, partly in section, of a replacement safe end assembly installed in accordance with the present invention.

Elastic members such as Belleville washers can be utilized at a number of locations in the replacement core spray supply piping system to add elastic compliance allowing components to expand and contract while maintaining tight connections during thermal transients. In FIG. 51, for example, a modification of a replacement thermal sleeve is shown wherein a plurality of elastic members 570 in the form of Belleville washers are employed at the connection between the replacement thermal sleeve 404 and the thermal sleeve remnant 330. Replacement thermal sleeve 404 is similar to the thermal sleeve shown in FIGS. 35 and 36 but with an outwardly protruding radial flange 572 extending circumferentially around the sleeve and a cylindrical tube or collar 574 disposed around the flange 572 and including an inwardly protruding radial flange 576 at an outboard end to define an annular space between the collar and the thermal sleeve flange. A plurality of elastic members 570, shown as Belleville washers, are disposed in the annular space between the collar and the thermal sleeve flange to provide elastic compliance. The collar also includes an annular lip 578 which engages the thermal sleeve remnant 330 to form a seal therewith and a retaining ring 580 disposed in a groove on an inboard side of flange 572 to function as a stop preventing the collar from sliding off during installation. Flange 572 is also shown with a piston ring 582 mounted thereon in sealing relation with collar 574. Another difference between the replacement thermal sleeve shown in FIG. 51 and that described above in connection with FIGS. 35 and 36 is the provision of a keyway or slot 584 in the outer tubular member 440 of the sleeve 404 and a key 586 extending from the inner tubular member or sleeve into the slot to permit axial movement of the inner sleeve while preventing rotation of the replacement thermal sleeve when bolt 480 is turned.

If existing pads are not available at the inboard end of the core spray inlet nozzle 328, replacement pads can be provided. The replacement pads can be mounted about the interior surface of the inlet nozzle or carried by the replacement thermal sleeve. In FIG. 51, the replacement thermal sleeve 404 includes a radial flange 588 adjacent an inboard end of the core spray supply inlet nozzle 328 and a plurality of pads 590 mounted within axial slots 592 formed at angularly spaced locations about the circumference of the flange. Pads 590 are attached to the flange with bolts 594 and include feet 596 which extend downwardly at opposite axial ends of the flange to carry axial loads. Typically, such pads are machined prior to installation after taking measurements in the nozzle.

Another modification of a replacement thermal sleeve, illustrated at 404 in FIG. 52, is similar to the replacement thermal sleeve shown in FIG. 51 but with an adjustable pad 598 at one location allowing the thermal sleeve to be installed without the need of having to take measurements and machine the pads prior to installation. The adjustable pad 598 is made up of a trapezoidal protrusion or flange 600 which extends outwardly from the outer sleeve 440 of the thermal sleeve and a pair of wedge members 602 disposed on opposite tapered sides of the trapezoidal flange. A bolt 604 extends through a smooth opening in the inboard wedge member 602 and an oversized opening in trapezoidal flange 600 and is threadedly received in a threaded opening in the outboard wedge member 602 to control the axial distance between the wedge members. As the bolt is tightened, the wedge members slide along tapered sides of the trapezoidal flange in the direction of decreasing width and, as a result, move toward one and other. Conversely, as the bolt loosened, the wedge members move apart. The oversized opening in flange 600 allows the bolt to move radially along the height of the flange as the bolt is tightened or loosened. The axial spacing between the wedge members determines their radial location along the height of the flange such that the height of the pad is adjustable. A pair of retaining members 606 extend outwardly from the thermal sleeve on opposite sides of pad 598 to retain wedge members 602 in an assembled condition as bolt 604 is loosened. As best seen in FIG. 53, a clearance opening 608 is formed through the inboard retaining member to permit tools to access the bolt head, which is pinned in place relative to the inboard wedge member to permit only rotational movement of the bolt relative to the inboard wedge member. While only one adjustable pad is needed, it will be appreciated that any number of adjustable pads can be mounted about the circumference of the replacement thermal sleeve.

Figure 54:
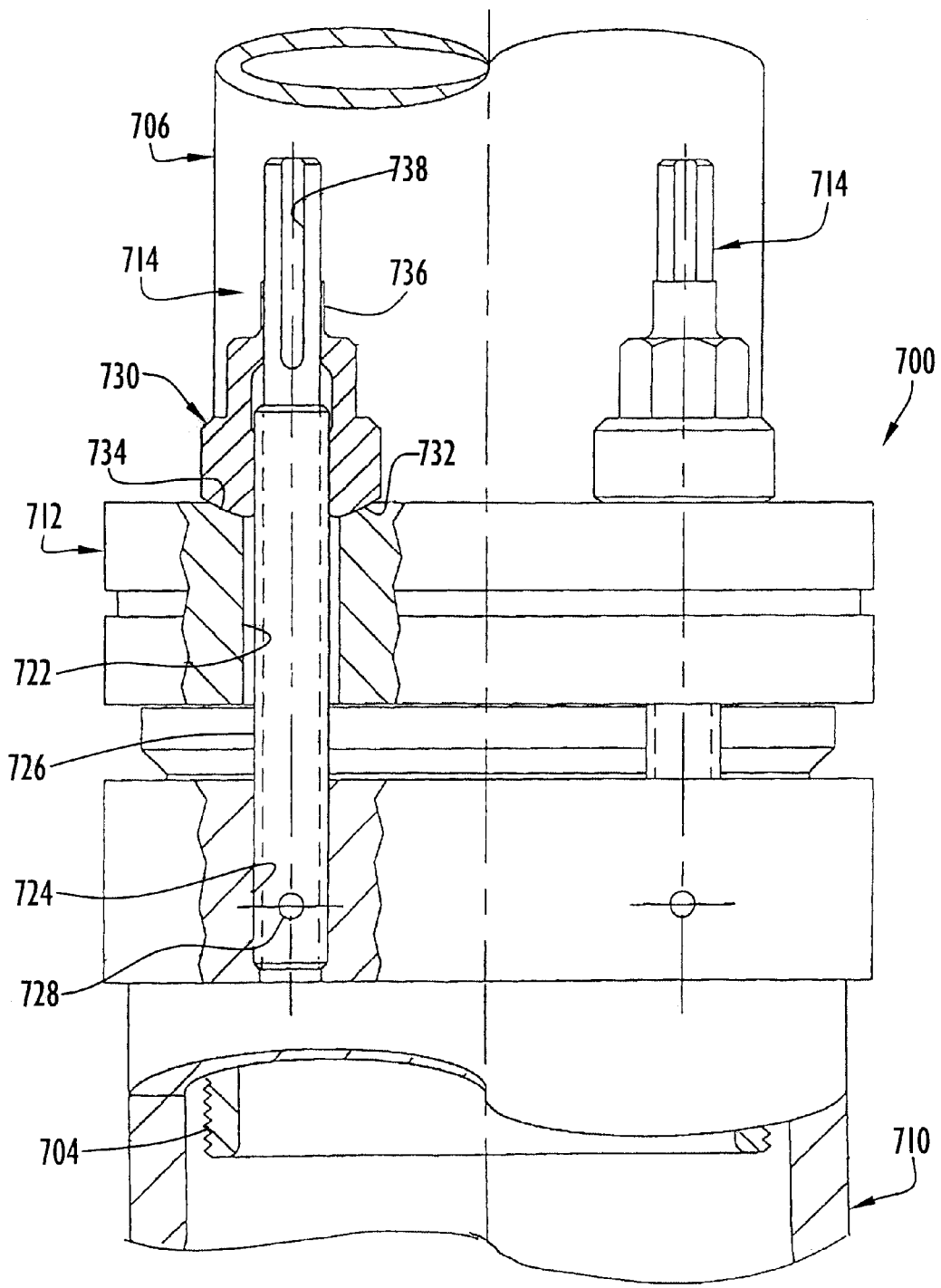
FIG. 54 is an enlarged fragmentary view, partly in section, of still another modification of a coupling for use in replacing core spray supply piping in accordance with the present invention.
Figure 55:
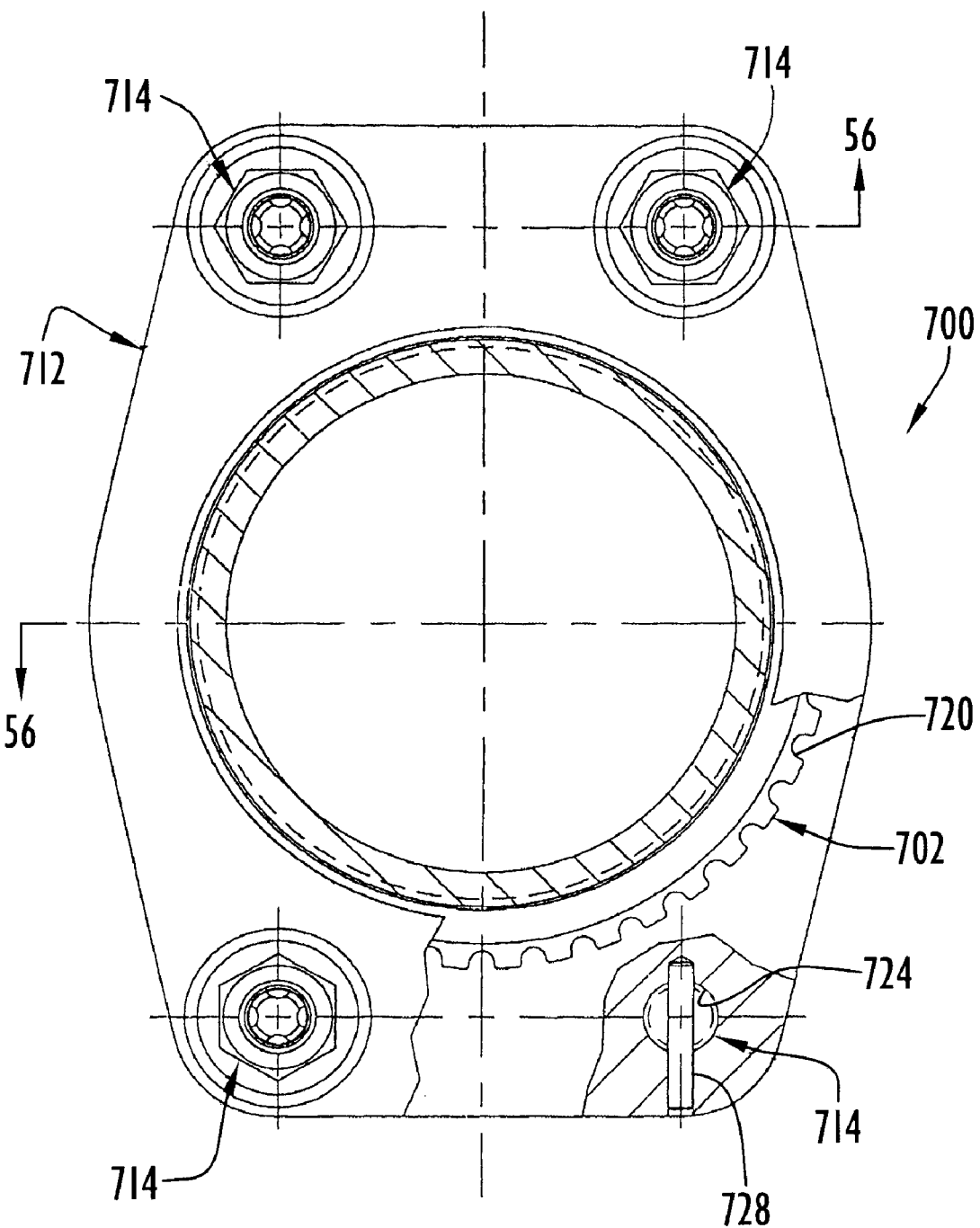
FIG. 55 is a top view, partly in section, of the coupling shown in FIG. 54.
Figure 56:
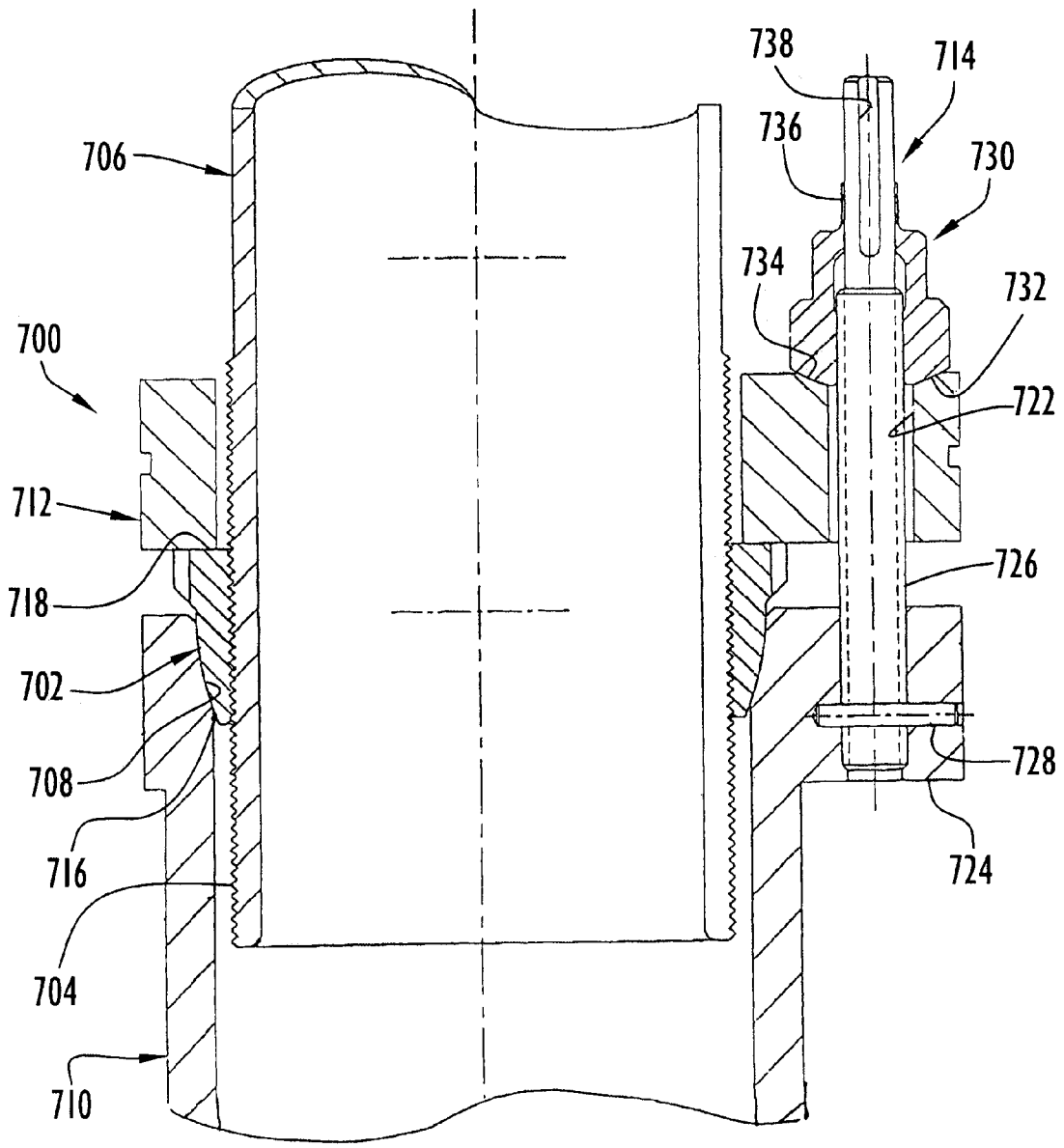
FIG. 56 is a sectional view taken through line 56—56 in FIG. 55.

Various joints or couplings can be used to connect piping components anywhere along the core spray supply piping system in accordance with the present invention. For example, in FIGS. 54–56, a modified coupling 700 is shown which is similar to the coupling shown in FIG. 38 but with a different type of fastener. The modified coupling 700 includes a first coupling member in the form of a ferrule 702 mounted on the threaded end 704 of a first piping component 706, a second coupling member in the form of a recess or socket 708 formed by a second piping component 710 to receive the ferrule, and a gland ring 712 held against the ferrule by a plurality of fasteners 714. Ferrule 702 is of annular configuration with a spherical outer surface 716 at one end that seats within socket 708 and a truncated flat surface or shoulder 718 at an opposite end that bears against ring 712. Notches 720 are formed at spaced locations about the circumference of the ferrule to permit the ferrule to be turned so that its location along the length of the first piping component can be adjusted to change the effective length of the piping component thereby ensuring that the ferrule can be properly seated within the socket. Ring 712 is a generally rectangular plate with four clearance holes 722 formed therein in alignment with threaded receptacles 724 formed about the periphery of the second piping component. Fasteners 714 each include a threaded stud 726 that extends through one of the clearance holes 722 in ring 712 into a threaded opening in a corresponding receptacle 724. A pin 728 extends through the receptacle and the stud to prevent the stud from loosening or becoming separated from the second piping component during installation. A nut 730 is threaded onto the opposite end of each stud 726 and tightened to place the ferrule in compression between the ring and the socket formed by the second piping component to prevent movement of the piping components relative to one another during normal operating conditions so that the sealing surfaces of the coupling members are not degraded over time. Bottoms 732 of the nuts are also spherically shaped to seat within respective spherical recesses 734 formed in a top surface of the ring around clearance holes 722 such that the fasteners can tilt somewhat during installation to accommodate angular misalignment of the piping components. A deformable sleeve 736 extends upwardly from the nut in juxtaposed relation to a plurality of longitudinal grooves 738 in the stud to permit the nut to be crimped after it has been tightened.

Installation of piping components using the modified coupling 700 is similar to that described above in connection with the coupling shown in FIG. 38. Briefly, gland ring 721 is inserted over threaded end 704 of first piping component 706 and prevented from falling off the component by threading ferrule 702 onto the threaded end of the first piping component. Studs 726 are threaded into receptacles 724 on second piping component 710 such that they protrude upwardly therefrom and are fixed in place using pins 728. The above steps are preferably carried out at a location outside the reactor vessel but can be performed in the reactor vessel if necessary. Once positioned in the reactor vessel, the location of ferrule 702 along the threaded portion of first piping component 706 can be adjusted to change the effective length of the piping component thereby ensuring that the ferrule is firmly seated within the socket defined by second piping component 710. Adjustment of ferrule 702 can be carried out by turning the ferrule using notches 720, for example with a rotating device (not shown) that engages or meshes with the ferrule like a gear. Gland ring 712 is then moved toward ferrule 602 and positioned such that clearance holes 722 are aligned with studs 726 protruding from the second piping component. The studs are made to pass through the clearance holes to receive nuts 730 which are tightened against the top surface of ring 712 to compressively seat ferrule 702 in socket 708 and can then be crimped to prevent loosening.

From the above, it will be appreciated that the replacement method and apparatus according to the present invention permits partial or complete replacement of cracked core spray supply piping and the like in a boiling water reactor, where by "core spray supply piping" is meant in-vessel piping components of the core spray supply system including, but not limited to, the core spray spargers within the core shroud and the piping connecting the core spray spargers with nozzles in the reactor vessel. When portions of the core spray supply piping are replaced in accordance with the present invention, the replacement components for those portions of the piping are configured to couple with replacement components for other portions of the piping if a complete replacement of the core spray supply piping is desired at a later time. The replacement can be performed in situ during scheduled outages, when the reactor is normally shut down, and does not require any in-vessel welding. The replacement method and apparatus minimizes reactor down time and reduces exposure of personnel to potentially hazardous levels of radiation within the reactor vessel by permitting complete installation of the replacement piping from outside the vessel using long-handled tools and remote cameras.

The replacement piping is preferably installed at the first scheduled outage following detection of cracking in the core spray supply piping; however, there may be circumstances where repairs are undertaken before any cracks have been detected or during outages scheduled specifically to allow for installation of the replacement piping. The screws and bolts used to connect piping components as part of the replacement are preferably locked in place after being tightened, for example using crimp locks or any other suitable bolt locking device or technique. Bias members, such as springs, can be held in compression between respective heads of the bolts and one or more of the bolted components to maintain the bolts in tension during thermal transients such as would occur, for example, when cold core spray water is pumped through hot core spray supply piping in response to a LOCA.

When the replacement piping includes bosses with holes formed therethrough for guiding hole drilling tools and receiving screws and threaded pins, the bosses can have any configuration to mate with the tools in a cooperative manner so that precise machining operations can be performed remotely. The bosses can be located anywhere about the circumference of the piping but are preferably oriented to permit unobstructed access when using long-handled tools.

Any suitable materials can be used for the replacement components; however, Series 300 (e.g., Type 304 or 316) stainless steel is preferably used for the piping, and Inconel X-750 is preferred for any backing bars or springs that may be used with the replacement piping. Piston rings and seals are preferably made of XM-19 but can be made of any corrosion-resistant high strength materials such as, for example, Inconel X-750.

The procedural steps of the foregoing core spray supply piping replacement can be performed in any order dependent upon reactor design and the configuration of the replacement components. Replacement components (e.g., the T-box and horizontal arms) can be preassembled prior to being lowered into the reactor vessel.

The various methods of connecting the replacement lower elbow assembly with the core spray sparger and vertical piping section can be combined in any manner desired dependent upon reactor design, the condition of the existing piping components, and the desirability of performing operations inside the shroud. Similarly, the various methods of connecting a replacement T-box to the core spray nozzle and horizontal piping sections can be combined in any manner desired. It will also be appreciated that any one of the various methods of joining abutting pipes can be used at the junction between the T-box and horizontal piping sections, at the junction between the upper elbow and vertical piping section, at the junction between the vertical piping section and the lower elbow, or anywhere else in the core spray supply system. Fit-up tolerances can be accommodated by use of piping components with threaded coupling members that allow adjustment of the effective length of the components. When ball and socket type joints are used, the coupling member defining the ball and/or the socket can be threaded onto a piping component to facilitate a length adjustment. The backing bar can be used with the existing T-box or with any of the replacement T-box assemblies described herein.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method of replacing core spray supply piping in a boiling water reactor having a core shroud disposed within a reactor vessel and a core spray supply system including core spray supply piping connecting a nozzle in the reactor vessel with core spray spargers in the core shroud, said method comprising the steps of removing at least a portion of the core spray supply piping from the core spray supply system;

positioning first and second replacement piping components between remaining portions of the core spray supply system; and adjusting the effective length of the first replacement piping component by moving a first coupling member along the length of the first replacement piping component such that the first coupling member is seated within a second coupling member carried by the second replacement piping component.

2. A method of replacing core spray supply piping as recited in claim 1 wherein the first coupling member includes a ferrule threaded onto an end of the first replacement piping component and said adjusting step includes the step of rotating the ferrule to change the effective length of the first replacement piping component.

3. A method of replacing core spray supply piping as recited in claim 2 wherein notches are formed about a periphery of the ferrule and said rotating step includes the step of using at least one of the notches to turn the ferrule.

4. A method of replacing core spray supply piping as recited in claim 1 and further comprising the step of fixing the position of the first and second replacement piping components relative to one another using at least one fastener.

5. A method of replacing core spray supply piping as recited in claim 4 wherein the at least one fastener includes a threaded stud and said fixing step includes threading a first end of the stud into a receptacle on the second replacement piping component and threading a nut onto the second end of the stud against a ring, the first coupling member being disposed between the second coupling member and the ring.

6. A method of replacing core spray supply piping as recited in claim 5 wherein the stud passes through a clearance hole in the ring and a bottom of the nut is generally spherically shaped, and further comprising the steps of orienting the first and second replacement piping components at an angle relative to one another, and tightening the nut into a spherically shaped recess formed about the clearance hole in the ring.

7. A method of replacing core spray supply piping as recited in claim 5 and further comprising the step of pinning the first end of the stud relative to the second replacement piping component.

8. A method of replacing core spray supply piping as recited in claim 5 and further comprising the step of crimping the nut to prevent loosening of the fastener.

9. A method of replacing core spray supply piping as recited in claim 1 wherein said removing step includes the step of removing a lower elbow from the core spray supply piping, wherein the first replacement piping component is a vertical pipe and the second replacement piping component is an elbow, and further comprising the step of attaching a lower end of the elbow to the a remaining portion of the core spray supply system in the shroud.

10. A method of replacing core spray supply piping as recited in claim 9 wherein said attaching step includes bolting the lower end of the elbow to the remaining portion of the core spray supply system in the shroud.

11. A method of replacing core spray supply piping as recited in claim 10 wherein said bolting step includes the steps of placing a cap over a T-box inside the core shroud and inserting a bolt through the cap into a receptacle formed in the elbow.

12. A method of replacing core spray supply piping as recited in claim 11 wherein said bolting step further includes the step of positioning a bias member between a head of the bolt and the remaining portion of the core spray supply system in the shroud.

13. A method of replacing core spray supply piping as recited in claim 1 wherein said removing step includes the step of removing the a T-box and the a thermal sleeve from the core spray nozzle of the reactor vessel, and further comprising the step of attaching a replacement T-box assembly to the core spray inlet nozzle, the second piping component being an arm of the T-box assembly and the first piping component being arranged horizontally within the reactor vessel to couple with the first piping component.

14. A method of replacing core spray supply piping as recited in claim 13 wherein the T-box assembly includes a replacement thermal sleeve and said attaching step includes the steps of forming a recess in a wall of the core spray nozzle and moving a latch member relative to the thermal sleeve such that the latch member engages the recess to lock the thermal sleeve in place within the nozzle.

15. A method of replacing core spray supply piping as recited in claim 14 wherein the latching member includes an inner sleeve with a threaded receptacle therein and said moving step includes the steps of inserting a bolt through the T-box into the receptacle and turning the bolt from inside the reactor vessel.

16. A method of replacing core spray supply piping as recited in claim 15 wherein an outboard end of the inner sleeve is slotted to form a resilient finger with a latching protrusion and said moving step further includes moving the sleeve axially from a retracted position where the finger is cammed radially inward to an extended position where the finger springs radially outward to place the latching protrusion in the recess.

17. A method of replacing core spray supply piping as recited in claim 13 wherein the T-box assembly includes a thermal sleeve extending into the nozzle and further comprising the step of positioning a bias member between the thermal sleeve and remaining portions of a safe end in the nozzle.

18. A method of replacing core spray supply piping as recited in claim 13 and further comprising the step of positioning a pad in the annular space between the replacement thermal sleeve and the nozzle.

19. A method of replacing core spray supply piping as recited in claim 18 wherein said positioning step includes the steps of mounting the pad on a flange extending outwardly from the thermal sleeve and pinning the pad to the thermal sleeve.

20. A method of replacing core spray supply piping as recited in claim 18 wherein the pad includes a first wedge member with a first angled surface and the thermal sleeve carries a second wedge member with a second angled surface abutting the first angled surface of the pad, and wherein said positioning step includes the steps of inserting a bolt through the wedge members and tightening the bolt to adjust the height of the pad.

\* \* \* \* \*